United States Patent
Kotzur et al.

(10) Patent No.: US 11,334,292 B2
(45) Date of Patent: May 17, 2022

(54) AUTONOMOUS RAID DATA STORAGE SYSTEM

(71) Applicant: Dell Products L.P., Round Rock, TX (US)

(72) Inventors: Gary Benedict Kotzur, Austin, TX (US); William Emmett Lynn, Round Rock, TX (US); Kevin Thomas Marks, Georgetown, TX (US); Chandrashekar Nelogal, Round Rock, TX (US); James Peter Giannoules, Round Rock, TX (US); Austin Patrick Bolen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 243 days.

(21) Appl. No.: 16/839,428

(22) Filed: Apr. 3, 2020

(65) Prior Publication Data

US 2021/0311663 A1    Oct. 7, 2021

(51) Int. Cl.
| | |
|---|---|
| *G06F 3/00* | (2006.01) |
| *G06F 3/06* | (2006.01) |
| *G06F 11/10* | (2006.01) |
| *G06F 9/30* | (2018.01) |

(52) U.S. Cl.
CPC .......... *G06F 3/0659* (2013.01); *G06F 3/0604* (2013.01); *G06F 3/0629* (2013.01); *G06F 3/0653* (2013.01); *G06F 3/0689* (2013.01); *G06F 9/30029* (2013.01); *G06F 11/1084* (2013.01)

(58) Field of Classification Search
None
See application file for complete search history.

(56) References Cited

U.S. PATENT DOCUMENTS

| | | | |
|---|---|---|---|
| 9,384,093 B1 | 7/2016 | Aiello | |
| 9,557,922 B2 | 1/2017 | McCambridge et al. | |
| 2021/0096780 A1* | 4/2021 | Kotzur | G06F 3/0656 |

\* cited by examiner

*Primary Examiner* — Midys Rojas
(74) *Attorney, Agent, or Firm* — Joseph Mencher

(57) ABSTRACT

An autonomous RAID data storage system includes a RAID storage controller device that communicates with RAID data storage devices in order to configure them to perform direct command operations with each other. A first RAID data storage device receives a multi-step command from the RAID storage controller device and performs a first subset of operations associated with the multi-step command, while also performing direct command operations with a second RAID data storage device in order to cause it to perform a second subset of operations associated with the multi-step command, When the first RAID data storage device completes the first subset of operations and receives a first completion communication from the second RAID data storage device that indicates that the second subset of operations are completed, it sends a second completion communication to the RAID storage controller device that indicates that the multi-step command is completed.

20 Claims, 43 Drawing Sheets

AUTONOMOUS RAID DATA STORAGE SYSTEM

BACKGROUND

The present disclosure relates generally to information handling systems, and more particularly to providing autonomous operations by RAID data storage devices in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems sometime utilize storage systems such as those provided by a Redundant Array of Independent Disks (RAID) storage system that includes a plurality of RAID data storage devices. As will be appreciated by one of skill in the art, RAID data storage systems are provided by a data storage virtualization technology that combines the physical RAID data storage devices into one or more logical storage units for the purposes of data redundancy, performance improvements, and/or other benefits known in the art. For example, data in a RAID data storage system may be distributed across the RAID data storage devices using several different techniques that are referred to as "RAID levels" that provide different levels of redundancy and performance (e.g., RAID 0, RAID 1, RAID 5, RAID 6, and so on), with each RAID level providing a different balance among goals that include reliability, availability, performance, and capacity.

The introduction of new storage technologies for use in RAID data storage systems has provided for performance and efficiency improvements in RAID data storage systems. For example, Non-Volatile Memory express (NVMe) storage devices (e.g., NVMe Solid State Drive (SSD) drives) utilize an open logical device interface specification for accessing its non-volatile storage media (e.g., provided by NAND flash memory devices) via a Peripheral Component Interconnect express (PCIe) bus to provide low latency, internal parallelism, and/or other benefits known in the art, and have begun to be implemented as the RAID data storage devices discussed above in order to assist in data update operations for the RAID data storage system. The inventors of the present disclosure describe some techniques for performing RAID storage-device-assisted data updates in U.S. patent application Ser. No. 16/586,445, filed on Sep. 27, 2019, and those RAID data storage systems may utilize NVMe storage devices to perform some or all of the data update operations that are traditionally performed by a RAID storage controller device in the RAID data storage system. However, the RAID storage-device-assisted data updates discussed above still require orchestration and tracking of RAID data transfer operations by the RAID storage controller device, thus opening up opportunities to further offload operations from RAID storage controller devices.

Accordingly, it would be desirable to provide a RAID data storage system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Redundant Array of Independent Disks (RAID) data storage engine that is configured to: receive a multi-step command from a RAID storage controller device; perform a first subset of operations associated with the multi-step command; perform direct command operations with a RAID data storage device in order to cause the RAID data storage device to perform a second subset of operations associated with the multi-step command; receive a first completion communication from the RAID data storage device that indicates that the second subset of operations associated with the multi-step command are completed; and transmit, in response to completing the first subset of operations associated with the multi-step command and receiving the first completion communication, a second completion communication to the RAID storage controller device that indicates that the multi-step command is completed.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
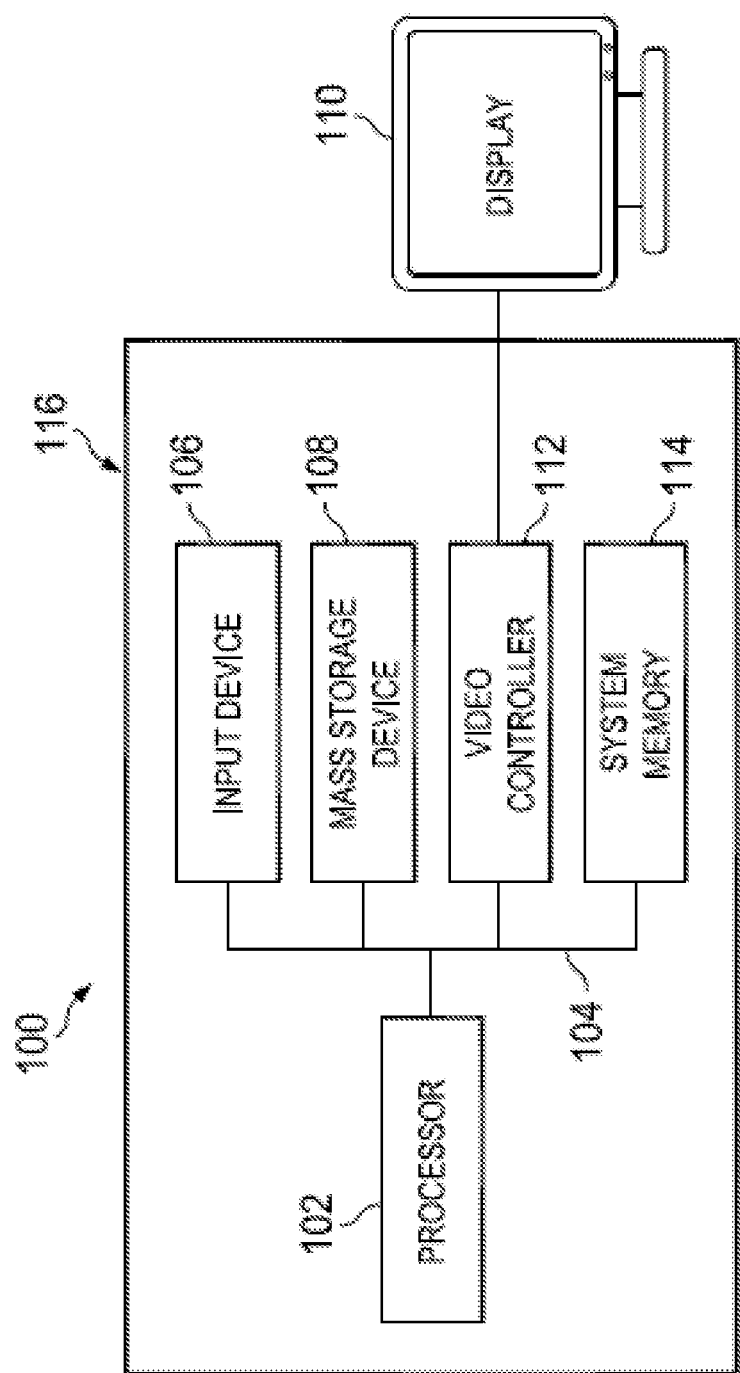
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
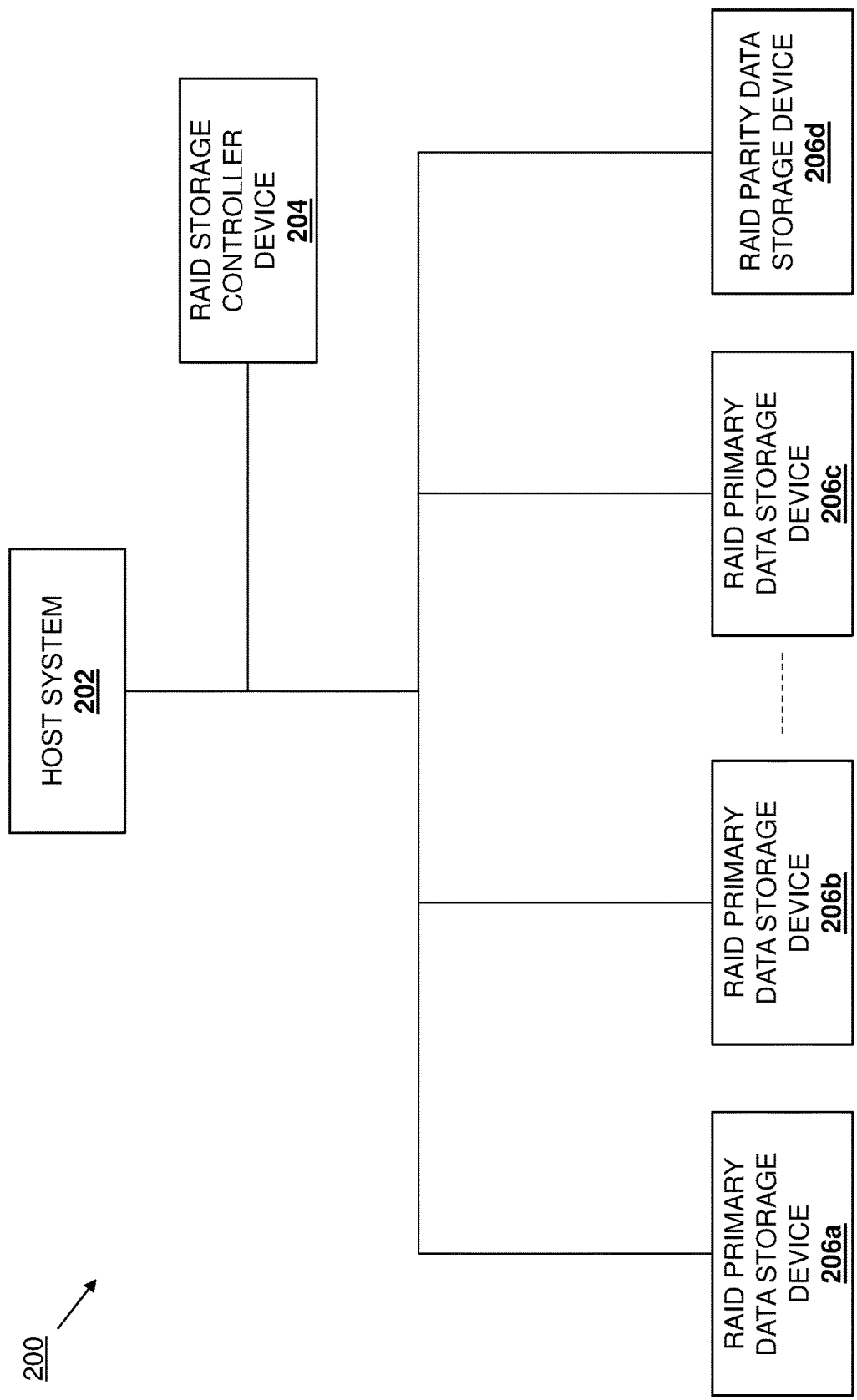
FIG. 2 is a schematic view illustrating an embodiment of a RAID data storage system.

Referring now to FIG. 2, an embodiment of a Redundant Array of Independent Disks (RAID) storage system 200 is illustrated. In the illustrated embodiment, the RAID data storage system 200 incudes a host system 202. In an embodiment, the host system 202 may be provided by the IHS 100 discussed above with reference to FIG. 1, and/or may include some or all of the components of the IHS 100. For example, the host system 202 may include server device(s), desktop computing device(s), a laptop/notebook computing device(s), tablet computing device(s), mobile phone(s), and/or any other host devices that one of skill in the art in possession of the present disclosure would recognize as operating similarly to the host system 202 discussed below. In the illustrated embodiment, the RAID data storage system 200 also includes a RAID storage controller device 204 that is coupled to the host system 202 and that may be provided by the IHS 100 discussed above with reference to FIG. 1, and/or may include some or all of the components of the IHS 100. For example, the RAID storage controller device 204 may include any storage device/disk array controller device that is configured to manage physical storage devices and present them to host systems as logical units. In the discussion below, the RAID storage controller device 204 includes a processing system, and a memory system that is coupled to the processing system and that includes instructions that, when executed by the processing system, cause the processing system to provide a RAID storage controller engine that is configured to perform the functions of the RAID storage controller engines and RIAD storage controller devices discussed below.

While a specific RAID storage controller device 204 has been illustrated in a particular configuration (e.g., a "lookaside" RAID storage controller device configuration where the RAID storage controller device 204 is coupled to each of the host system 202 and the RAID data storage devices 206a-206d, and with each of the RAID data storage device 206a-206d including a direct connection to the host system 202), one of skill in the art in possession of the present disclosure will recognize that RAID storage controller devices (or other devices operating according to the teachings of the present disclosure in a manner similar to that described below for the RAID storage controller device 204) may include a variety of components and/or component configurations for providing conventional RAID storage controller device functionality, as well as the functionality discussed below, while remaining within the scope of the present disclosure as well. For example, while one of skill in the art in possession of the present disclosure will recognize that the RAID storage controller device 204 is illustrated and described as a hardware RAID storage controller device provided in a chassis, in other embodiments the RAID storage controller device may be a software RAID storage controller device provided by software (e.g., instructions stored on a memory system) in the host system 202 that is executed by a processing system in the host system 202 while remaining within the scope of the present disclosure as well. As such, in some embodiments, the operations of the RAID storage controller device 204 discussed below may be performed via the processing system in the host system 202.

Furthermore, the RAID data storage system 200 also includes a plurality of RAID data storage devices that are illustrated in FIG. 2 as a plurality of RAID primary data storage devices 206a, 206b, and up to 206c, along with a RAID parity storage data device 206d, each of which is coupled to the host system 202 and the RAID storage controller system 204. However, as will be appreciated by one of skill in the art in possession of the present disclosure, any or all the plurality of RAID data storage devices in the RAID data storage system 200 illustrated in FIG. 2 may perform duals roles for different data stripes, with any particular RAID data storage device operating as a RAID primary data storage device for one data stripe and a RAID parity data storage device for another data stripe. As will be appreciated by one of skill in the art in possession of the present disclosure, the RAID data storage devices in the RAID data storage system 200 of FIG. 2 are described as operating in a RAID 5 configuration, with the RAID primary data storage devices configured to store primary data (e.g., provided by the host system 202), and the RAID parity data storage device configured to store parity data that may be utilized to recover primary data when that primary data becomes unavailable on one of the RAID primary data storage devices.

However, while a few RAID data storage devices in a particular configuration are illustrated, one of skill in the art in possession of the present disclosure will recognize that many more storage devices may (and typically will) be coupled to the RAID storage controller system 204 (e.g., in a datacenter) and may be provided in other RAID configurations while remaining within the scope of the present disclosure. In the embodiments discussed below, the RAID data storage devices 206a-206d are described as being provided by Non-Volatile Memory express (NVMe) Solid State Drive (SSD) drives, but one of skill in the art in possession of the present disclosure will recognize that other types of storage devices with similar functionality as the NVMe SSD drives (e.g., NVMe PCIe add-in cards, NVMe M.2 cards, etc.) may be implemented according to the teachings of the present disclosure and thus will fall within its scope as well. Furthermore, while a specific RAID data storage system 200 has been illustrated and described, one of skill in the art in possession of the present disclosure will recognize that the RAID data storage system of the present disclosure may include a variety of components and component configurations while remaining within the scope of the present disclosure as well.

Figure 3:
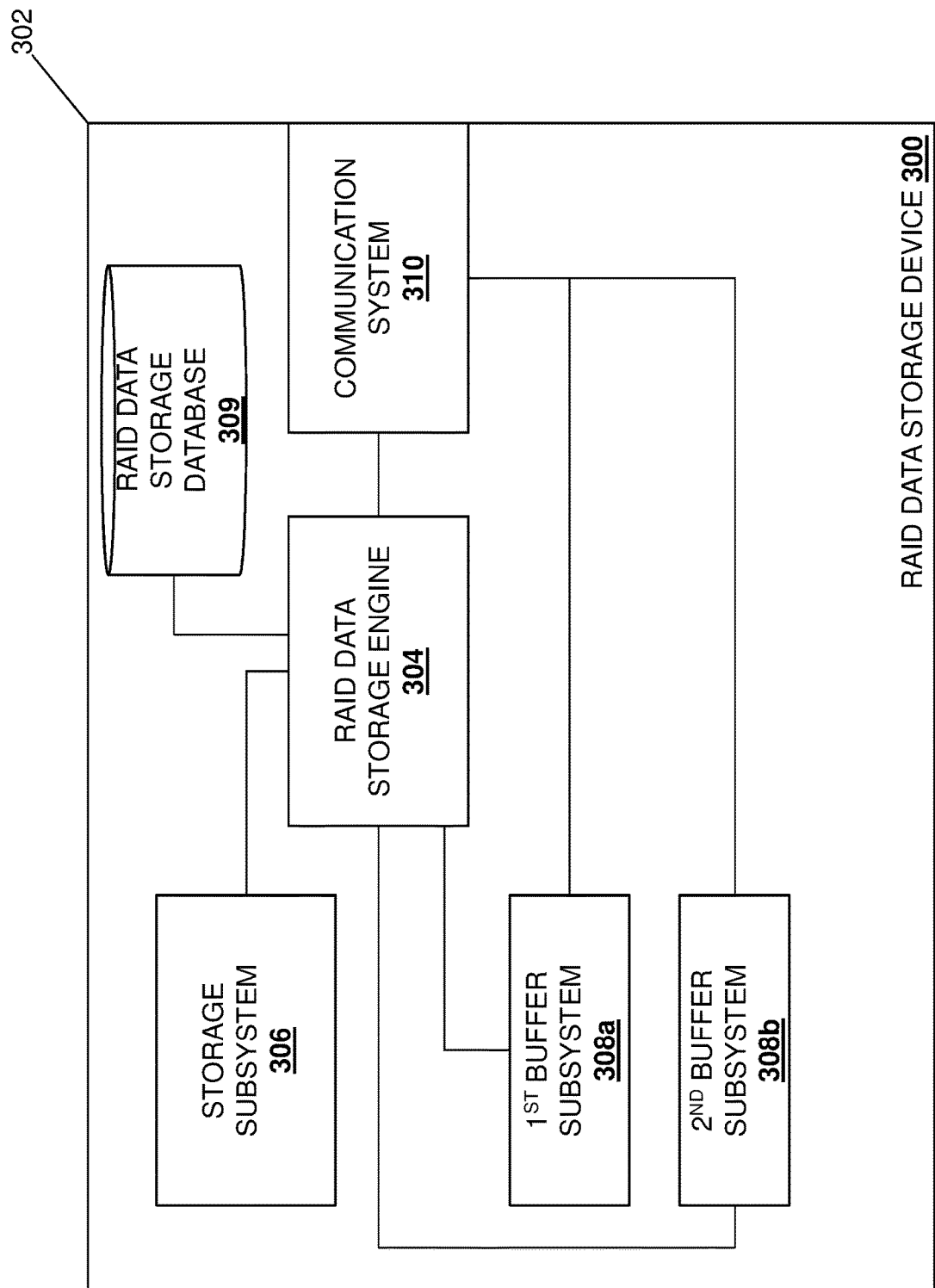
FIG. 3 is a schematic view illustrating an embodiment of a RAID data storage device that may be provided in the RAID data storage system of FIG. 2.

Referring now to FIG. 3, an embodiment of a RAID data storage device 300 is illustrated that may provide any or all of the RAID primary data storage devices and the RAID parity data storage device discussed above with reference to FIG. 2. As such, the RAID data storage device 300 may be provided by an NVMe SSD storage device, but one of skill in the art in possession of the present disclosure will recognize that other types of storage devices with similar functionality as the NVMe SSD storage devices (e.g., NVMe PCIe add-in cards, NVMe M.2 cards, etc.) may be provided according to the teachings of the present disclosure and thus will fall within its scope as well. In the illustrated embodiment, the RAID data storage device 300 includes a chassis 302 that houses the components of the RAID data storage device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a RAID storage engine 304 that is configured to perform the functionality of the RAID storage engines and/or RAID data storage devices discussed below. While not illustrated, one of skill in the art in possession of the present disclosure will recognize that the RAID storage engine 304 may include, or be coupled to, other components such as a queues (e.g., submission queues and completion queues) and/or RAID data storage device components that would be apparent to one of skill in the art in possession of the present disclosure.

The chassis 302 may also house a storage subsystem 306 that is coupled to the RAID storage engine 304 (e.g., via a coupling between the storage subsystem 306 and the processing system). Continuing with the example provided above in which the RAID data storage device 300 is an NVMe SSD storage device, the storage subsystem 306 may be provided by a flash memory array such as, for example, a plurality of NAND flash memory devices. However, one of skill in the art in possession of the present disclosure will recognize that the storage subsystem 306 may be provided using other storage technologies while remaining within the scope of the present disclosure as well. The chassis 302 may also house a first buffer subsystem 308a that is coupled to the RAID storage engine 304 (e.g., via a coupling between the first buffer subsystem 308a and the processing system). Continuing with the example provided above in which the RAID data storage device 300 is an NVMe SSD storage device, the first buffer subsystem 308a may be provided by device buffer that is internal to the NVMe SSD storage device, not accessible via a PCIe bus connected to the NVMe SSD storage device, and conventionally utilized to initially store data received via write commands before writing them to flash media (e.g., NAND flash memory devices) in the NVMe SSD storage device. However, one of skill in the art in possession of the present disclosure will recognize that the first buffer subsystem 308a may be provided using other buffer technologies while remaining within the scope of the present disclosure as well.

The chassis 302 may also house a second buffer subsystem 308b that is coupled to the RAID storage engine 304 (e.g., via a coupling between the second buffer subsystem 308b and the processing system). Continuing with the example provided above in which the RAID data storage device 300 is an NVMe SSD storage device, the second buffer subsystem 308b may be provided by a Controller Memory Buffer (CMB) subsystem. However, one of skill in the art in possession of the present disclosure will recognize that the second buffer subsystem 308b may be provided using other buffer technologies while remaining within the scope of the present disclosure as well. The chassis 302 may also house a storage system (not illustrated, but which may be provided by the storage device 108 discussed above with reference to FIG. 1) that is coupled to the RAID storage engine 304 (e.g., via a coupling between the storage system and the processing system) and that includes a RAID storage database 309 that is configured to store any of the information utilized by the RAID storage engine 304 as discussed below.

The chassis 302 may also house a communication system 310 that is coupled to the RAID storage engine 304 (e.g., via a coupling between the communication system 310 and the processing system), the first buffer subsystem 308a, and the second buffer subsystem 308b, and that may be provided by any of a variety of storage device communication technologies and/or any other communication components that would be apparent to one of skill in the art in possession of the present disclosure. Continuing with the example provided above in which the RAID data storage device 300 is an NVMe SSD storage device, the communication system 310 may include any NVMe SSD storage device communication component that enables the Direct Memory Access (DMA) operations described below, the submission and completion queues discussed below, as well as any other components that provide NVMe SDD storage device communication functionality that would be apparent to one of skill in the art in possession of the present disclosure. While a specific RAID data storage device 300 has been illustrated, one of skill in the art in possession of the present disclosure will recognize that RAID data storage devices (or other devices operating according to the teachings of the present disclosure in a manner similar to that described below for the RAID data storage device 300) may include a variety of components and/or component configurations for providing conventional RAID data storage device functionality, as well as the functionality discussed below, while remaining within the scope of the present disclosure as well.

Figure 4:
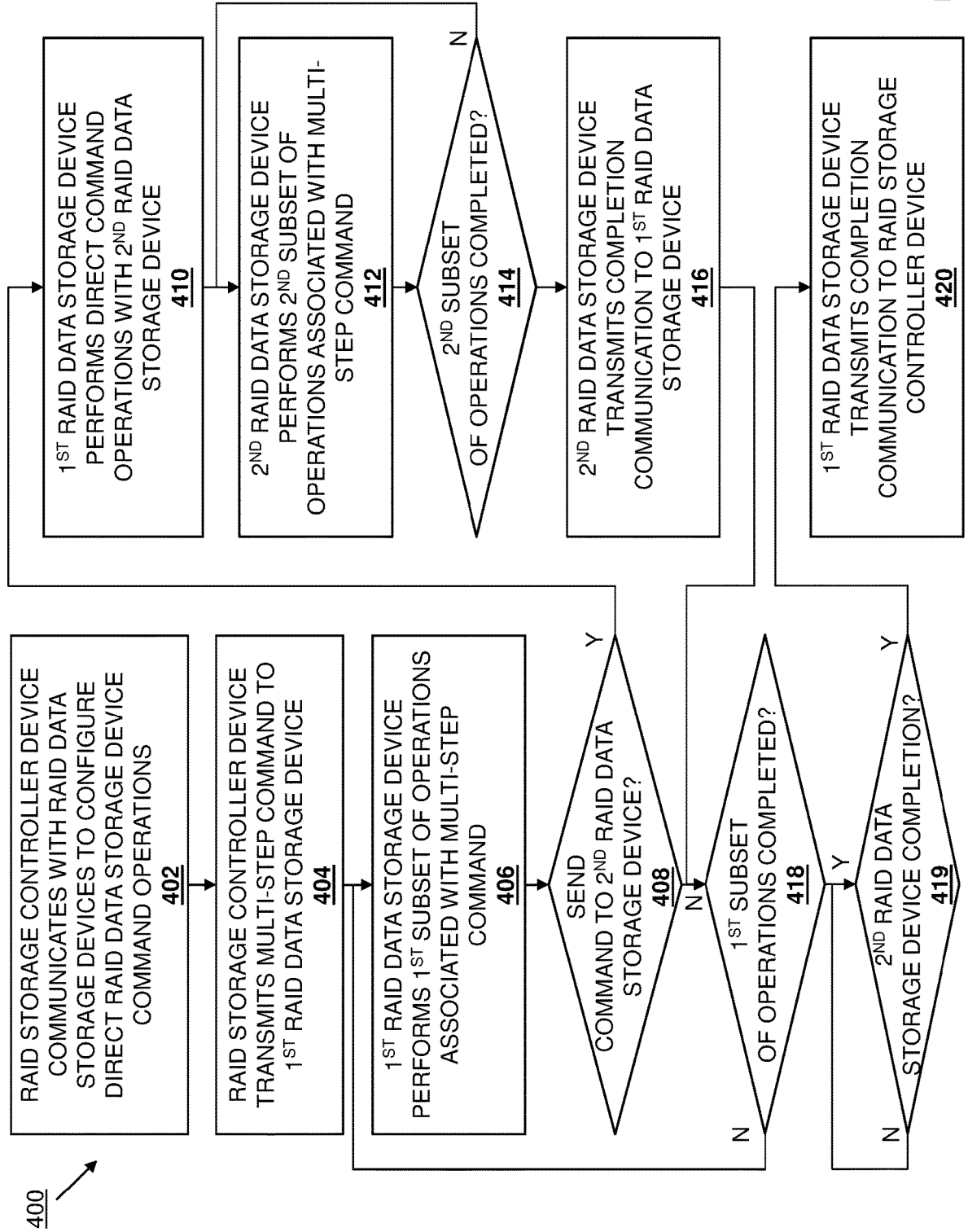
FIG. 4 is a flow chart illustrating an embodiment of a method for performing autonomous RAID data storage operations.

Referring now to FIG. 4, an embodiment of a method 400 for performing autonomous RAID data storage operation is illustrated. As discussed below, the systems and methods of the present disclosure provide for autonomous operations by RAID data storage devices in a RAID data storage system in order to allow a RAID storage controller device to issue a single command to a single RAID data storage device in the RAID data storage system that results in the performance of a plurality of complex operations by multiple RAID data storage devices that satisfy the command. For example, a RAID storage controller device may communicate with the RAID data storage devices in the RAID data storage system in order to configure each of the RAID data storage devices to perform direct command operations with each other. When the RAID storage controller device subsequently generates and transmits a multi-step command to a first RAID data storage device in the RAID data storage system, the first RAID data storage device will perform a first subset of operations associated with the multi-step command, and perform direct command operations with a second RAID data storage device in the RAID data storage system in order to cause the second RAID data storage device to perform a second subset of operations associated with the multi-step command. The first RAID data storage device may then receive a first completion communication from the second RAID data storage device that indicates that the second subset of operations associated with the multi-step command are completed and, in response to completing the first subset of operations associated with the multi-step command and receiving the first completion communication, the first RAID data storage device may transmit a second completion communication to the RAID storage controller device that indicates that the multi-step command is completed. As such, orchestration and tracking of RAID storage-device-assisted data updates by RAID storage controller devices is substantially reduced, allowing a single command from the RAID storage controller device to trigger the autonomous performance of any number of complex operations by the RAID data storage devices that satisfy the requirements of that command.

Figure 5:
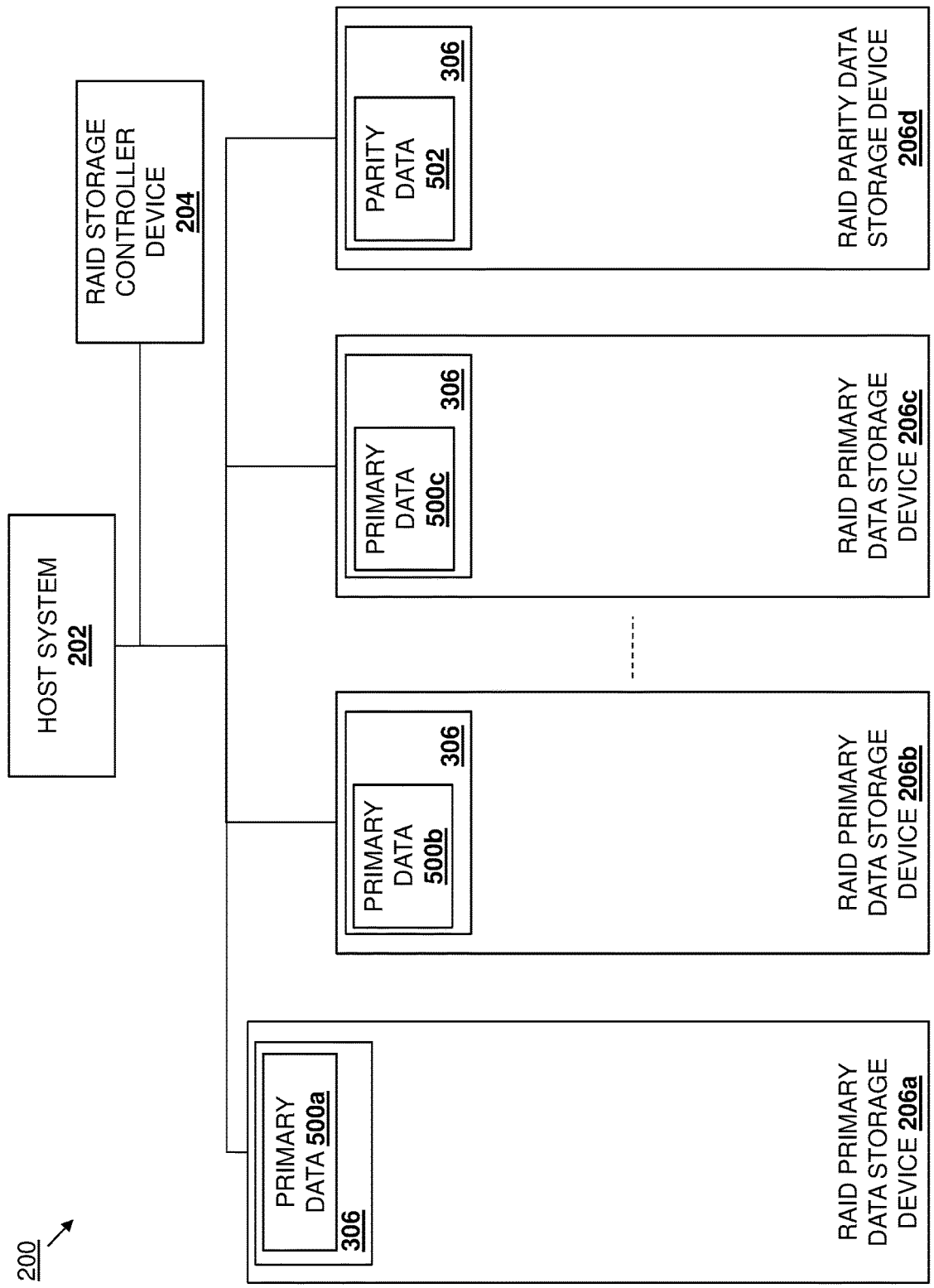
FIG. 5 is a schematic view illustrating an embodiment of the RAID data storage system of FIG. 2 operating during the method of FIG. 4.

With reference to FIG. 5, the RAID storage system 200 is illustrated with the RAID primary data storage device 206a storing primary data 500a in its storage subsystem 306, the RAID primary data storage device 206b storing primary data 500b in its storage subsystem 306, and the RAID primary data storage device 206c storing primary data 500c in its storage subsystem 306. While only three RAID primary data storage devices are illustrated and described in the examples provided below, one of skill in the art in possession of the present disclosure will recognize that any number of RAID primary data storage devices may store primary data while remaining within the scope of the present disclosure as well. In addition, the RAID storage system 200 is also illustrated with the RAID parity data storage device 206d storing parity data 502 in its storage subsystem 306, and one of skill in the art in possession of the present disclosure will recognize that the parity data 502 may have been generated via an XOR operation performed on the primary data 500a-500c in the RAID primary data storage devices 206a-206c, and allows for the rebuilding of any primary data stored on any one RAID primary data storage device in the event that primary data/RAID primary data storage device becomes unavailable.

As will also be appreciated by one of skill in the art in possession of the present disclosure, and as discussed in some of the examples provided below, the primary/parity data storage configuration illustrated in FIG. 5 provides primary/parity for a single data strip, and different data strips may have different primary/parity data storage configurations (e.g., in a plurality of RAID storage devices provided in a RAID storage system, a first data stripe may include primary data on first, second, and third RAID storage devices and parity data on a fourth RAID storage device; a second data stripe may include primary data on the second, third, and fourth RAID storage devices and parity data on the first RAID storage device, etc.) As such, while a particular RAID storage system device and data configuration is illustrated for purposes of the examples below, one of skill in the art in possession of the present disclosure will recognize that a variety of device and data configurations will fall within the scope of the present disclosure as well.

The method 400 begins at block 402 where a RAID storage controller device communicates with RAID data storage devices to configure direct RAID data storage device command operations. In an embodiment, at block 402, the RAID storage controller engine in the RAID storage controller device 204 may operate to communicate with the RAID data storage devices 206a-206d in order to configure the RAID data storage devices 206a-206d to perform the direct command operations with each other as discussed in further detail below. The inventors of the present disclosure have developed techniques for providing direct command operation between RAID data storage devices which are described in U.S. patent application Ser. No. 16/838,224, filed on Apr. 2, 2020, the disclosure of which is incorporated herein by reference in its entirety. As discussed in that application, for each pair of RAID data storage devices 206a-206d in the RAID data storage system 200, the RAID storage controller device 204 may communicate with those RAID data storage devices 206a-206d to configure submission and completion queue pairs that allow any RAID data storage device in the RAID data storage system 200 to provide commands directly to another RAID data storage device in the RAID data storage system 200 using virtual functions (Single Root Input/Output Virtualization (SR-IOV) virtual functions) in those RAID data storage devices 206a-206d, as well as to directly indicate to another RAID data storage device in the RAID data storage system 200 that a command received from that RAID data storage device has been completed (which may include the transmission of an interrupt directly between those RAID data storage devices.)

Figure 6A:
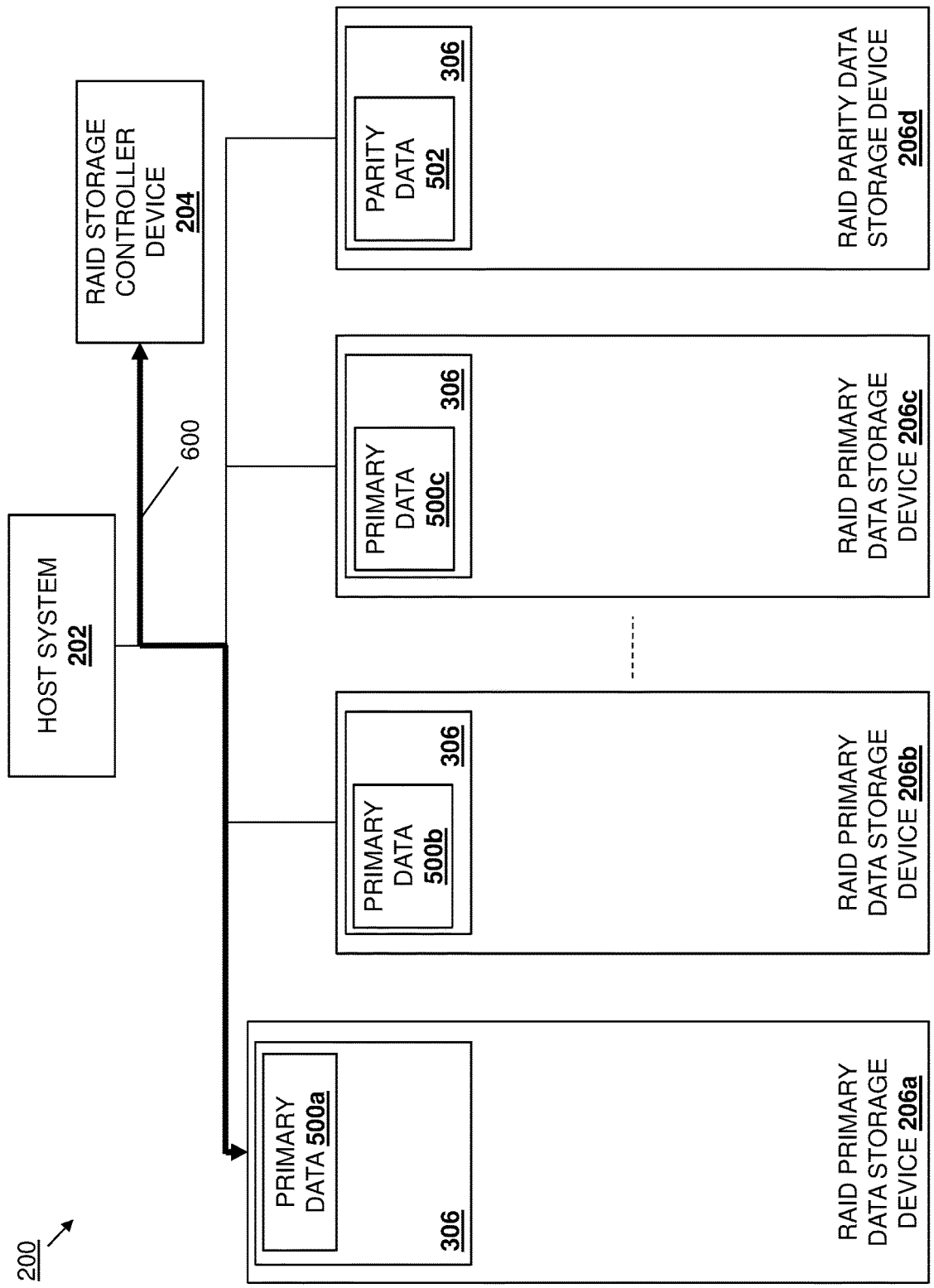
FIG. 6A is a schematic view illustrating an embodiment of the RAID data storage system of FIG. 2 operating during the method of FIG. 4.
Figure 6B:
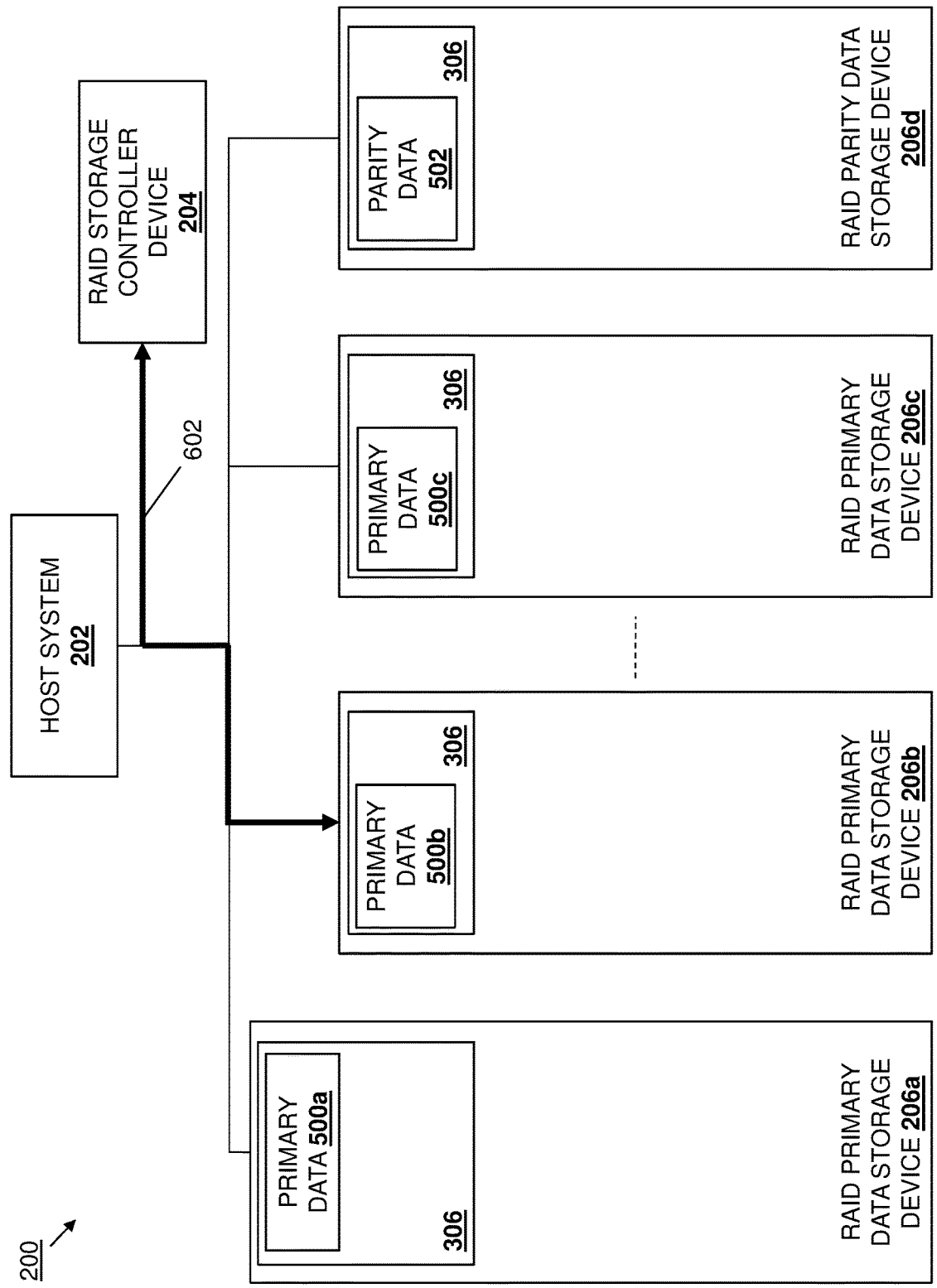
FIG. 6B is a schematic view illustrating an embodiment of the RAID data storage system of FIG. 2 operating during the method of FIG. 4.

As such, with reference to FIG. 6A, the RAID storage controller engine in the RAID storage controller device 204 may perform direct command operation configuration communications 600 with the RAID primary data storage device 206a in order to configure at least some of the submission and completions queues utilized by the RAID primary data storage device 206a/RAID primary data storage device 206b pair, the RAID primary data storage device 206a/RAID primary data storage device 206c pair, and the RAID primary data storage device 206a/RAID parity data storage device 206d pair. Similarly, with reference to FIG. 6B, the RAID storage controller engine in the RAID storage controller device 204 may perform direct command operation configuration communications 602 with the RAID primary data storage device 206b in order to configure at least some of the submission and completions queues utilized by the RAID primary data storage device 206b/RAID primary data storage device 206a pair, the RAID primary data storage device 206b/RAID primary data storage device 206c pair, and the RAID primary data storage device 206b/RAID parity data storage device 206d pair.

Figure 6C:
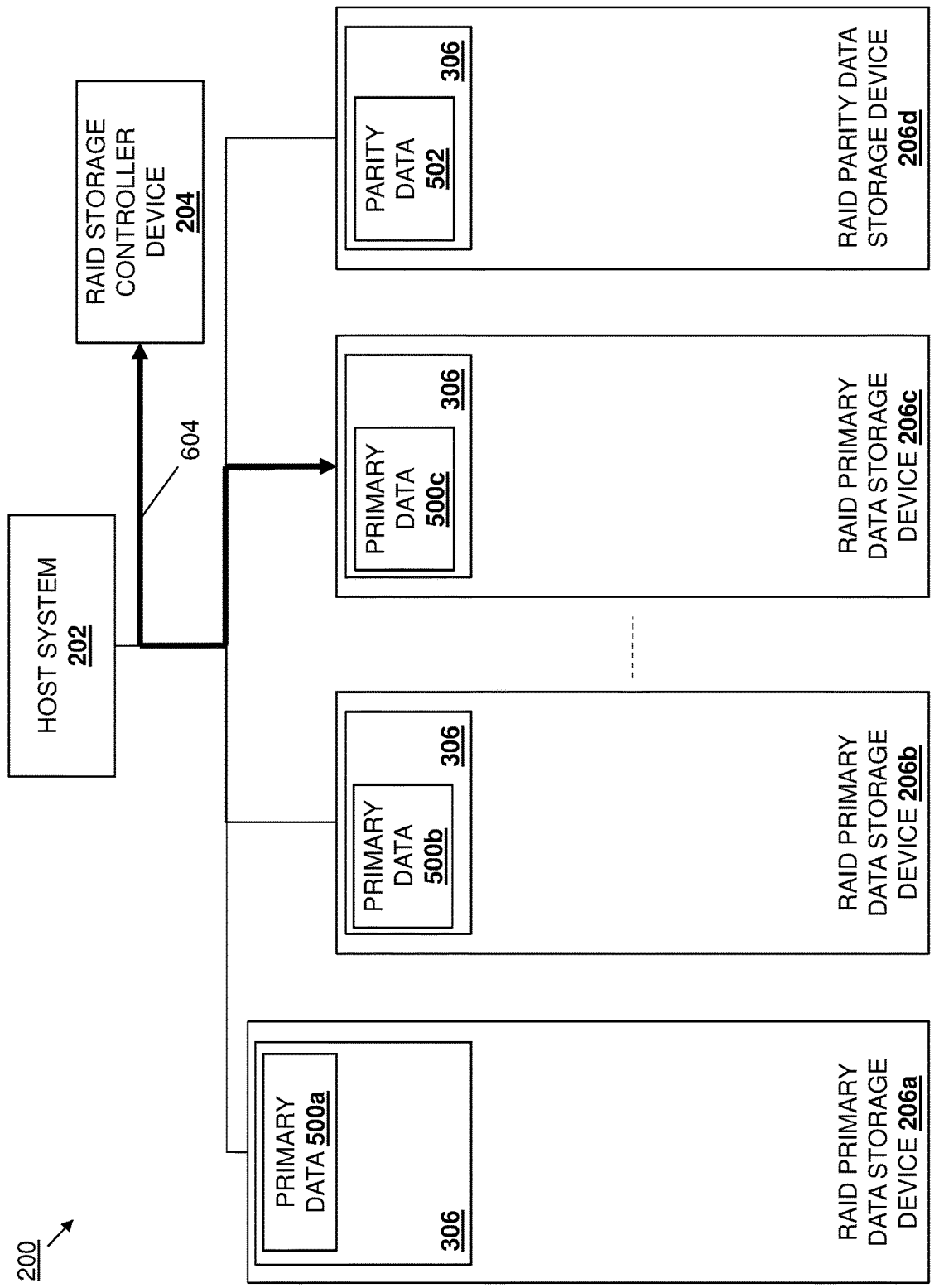
FIG. 6C is a schematic view illustrating an embodiment of the RAID data storage system of FIG. 2 operating during the method of FIG. 4.
Figure 6D:
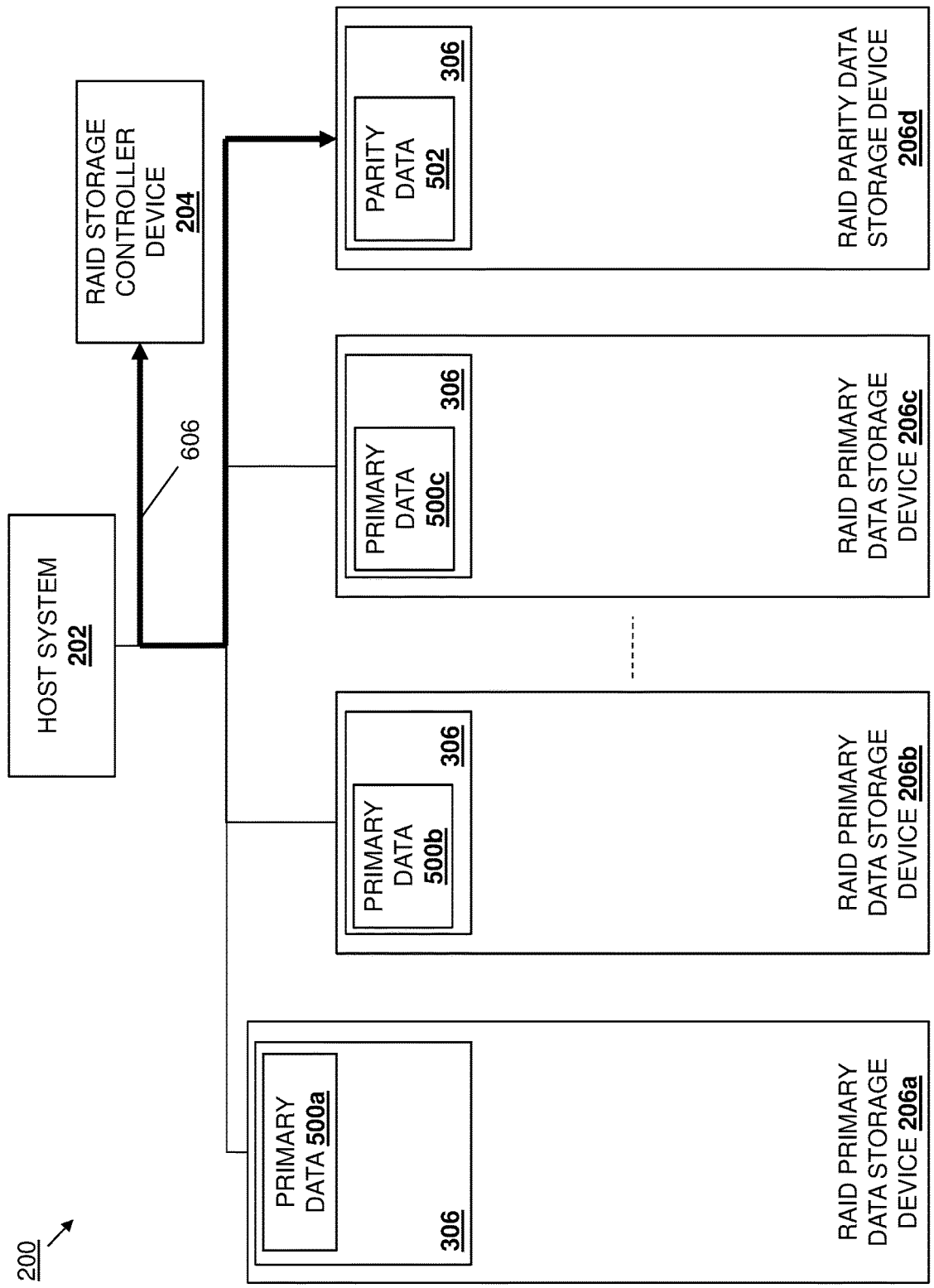
FIG. 6D is a schematic view illustrating an embodiment of the RAID data storage system of FIG. 2 operating during the method of FIG. 4.

Similarly as well, with reference to FIG. 6C, the RAID storage controller engine in the RAID storage controller device 204 may perform direct command operation configuration communications 604 with the RAID primary data storage device 206c in order to configure at least some of the submission and completions queues utilized by the RAID primary data storage device 206c/RAID primary data storage device 206a pair, the RAID primary data storage device 206c/RAID primary data storage device 206b pair, and the RAID primary data storage device 206c/RAID parity data storage device 206d pair. Similarly as well, with reference to FIG. 6D, the RAID storage controller engine in the RAID storage controller device 204 may perform direct command operation configuration communications 606 with the RAID parity data storage device 206d in order to configure at least some of the submission and completions queues utilized by the RAID parity data storage device 206d/RAID primary data storage device 206a pair, the RAID parity data storage device 206d/RAID primary data storage device 206b pair, and the RAID parity data storage device 206d/RAID primary data storage device 206c pair. As will be appreciated by one of skill in the art in possession of the present disclosure, any of the direct command operation configuration communications 600, 602, 604, and 606 may be substantially similar to the operations/communications described in U.S. patent application Ser. No. 16/838,224, filed on Apr. 2, 2020, and thus may result in the configuration of direct command operation submission and completion queues for each RAID data storage device pair that allows those RAID data storage devices to communicate directly with each other. As such, while not illustrated in the examples below, one of skill in the art in possession of the present disclosure will recognize that the submission and completion queues discussed in U.S. patent application Ser. No. 16/838,224, filed on Apr. 2, 2020, may be provided in the RAID data storage devices 206a-206d to enable the direct command operations discussed below.

The method 400 then proceeds to block 404 where the RAID storage controller device transmits a multi-step command to a first RAID data storage device. The inventors of the present disclosure have developed techniques for providing multi-step commands to RAID data storage devices which are described in U.S. patent application Ser. No. 16/832,348, filed on Mar. 27, 2020, the disclosure of which is incorporated herein by reference in its entirety. As will be appreciated by one of skill in the art in possession of the present disclosure, that application describes flexible techniques for allowing a RAID storage controller device to send a single, multi-step command to a RAID storage device that expresses multiple steps of operations that RAID data storage device(s) in the RAID data storage system 200 should perform, thus offloading control processing and control communication transmissions from the RAID storage controller device.

For example, the generation of multi-step commands may include a RAID storage controller device coupled to a RAID storage system identifying a RAID storage system configuration of the RAID storage system and, based on that RAID storage system configuration, generating a first multi-step command definition file for a first RAID storage device that is included in the RAID storage system. The first multi-step command definition file may define a plurality of first steps that each include at least one first operation, and may be "tuned" to the first RAID storage device based on first RAID storage device configuration, the first RAID storage device capabilities, the operations that the first RAID storage device is expected to perform, the RAID storage controller device capabilities, and/or any other information that may be determined from the RAID storage system configuration. As such, while RAID data storage devices within a RAID data storage system/RAIDset are often homogeneous, different types of RAID data storage devices may be provided in a RAID data storage system and coupled to its RAID storage controller device, and the first multi-step command definition file may be different than second multi-step definition file(s) provided to second RAID data storage device(s) included in the RAID storage system.

The RAID storage controller device may then transmit the first multi-step command definition file to the first RAID storage device and, subsequent to transmitting the first multi-step command definition file, the RAID storage controller device may generate a first multi-step command that references the first multi-step command definition file and includes at least one first parameter for use in performing one or more first operations included in the plurality of first steps defined by the first multi-step command definition file. The RAID storage controller device may then transmit the first multi-step command to the first RAID storage device, which causes the first RAID storage device to carry out the first multi-step command based on the multi-step command definition file and using the at least one first parameter. As such, RAID storage controller devices may send a single command that is configured to cause a RAID storage device to perform multiple steps, each with one or more operation, rather than sending a respective command for each of those operations, thus increasing the ability of the RAID storage controller device to scale with high performance RAID storage devices, offloading control operations from the RAID storage controller device, and/or reducing the number of completion communications generated and transmitted by the RAID storage controller device (thus reducing its processing and data transmission overhead.) As such, while not discussed in detail herein, one of skill in the art in possession of the present disclosure will appreciate that the multi-step commands generated and transmitted by the RAID storage controller device 204 to any of the RAID data storage devices 206a-206d during the method 400 may be preceded by any of the multi-step command operations described in U.S. patent application Ser. No. 16/832,348, filed on Mar. 27, 2020.

As discussed below, the method 400 may be performed for any of a variety of multi-step commands, and the discussion below provides three examples of multi-step commands (e.g., a "process write" multi-step command, a "degraded read" multi-step command, and a "degraded write" multi-step command) that are described as being performed as different embodiments of the method 400 (e.g., a "process write" embodiment, a "degraded read" embodiment, and a "degraded write" embodiment below.) However, one of skill in the art in possession of the present disclosure will appreciate that a variety of multi-step commands may be performed during the method 400 including, for example, other RAID data transfer operations, the RAID maintenance operations such as the BackGround Initialization (BGI) maintenance operations and Consistency Check (CC) maintenance operations discussed briefly below, and/or any other RAID operations that would be apparent to one of skill in the art in possession of the present disclosure.

Figure 7A:
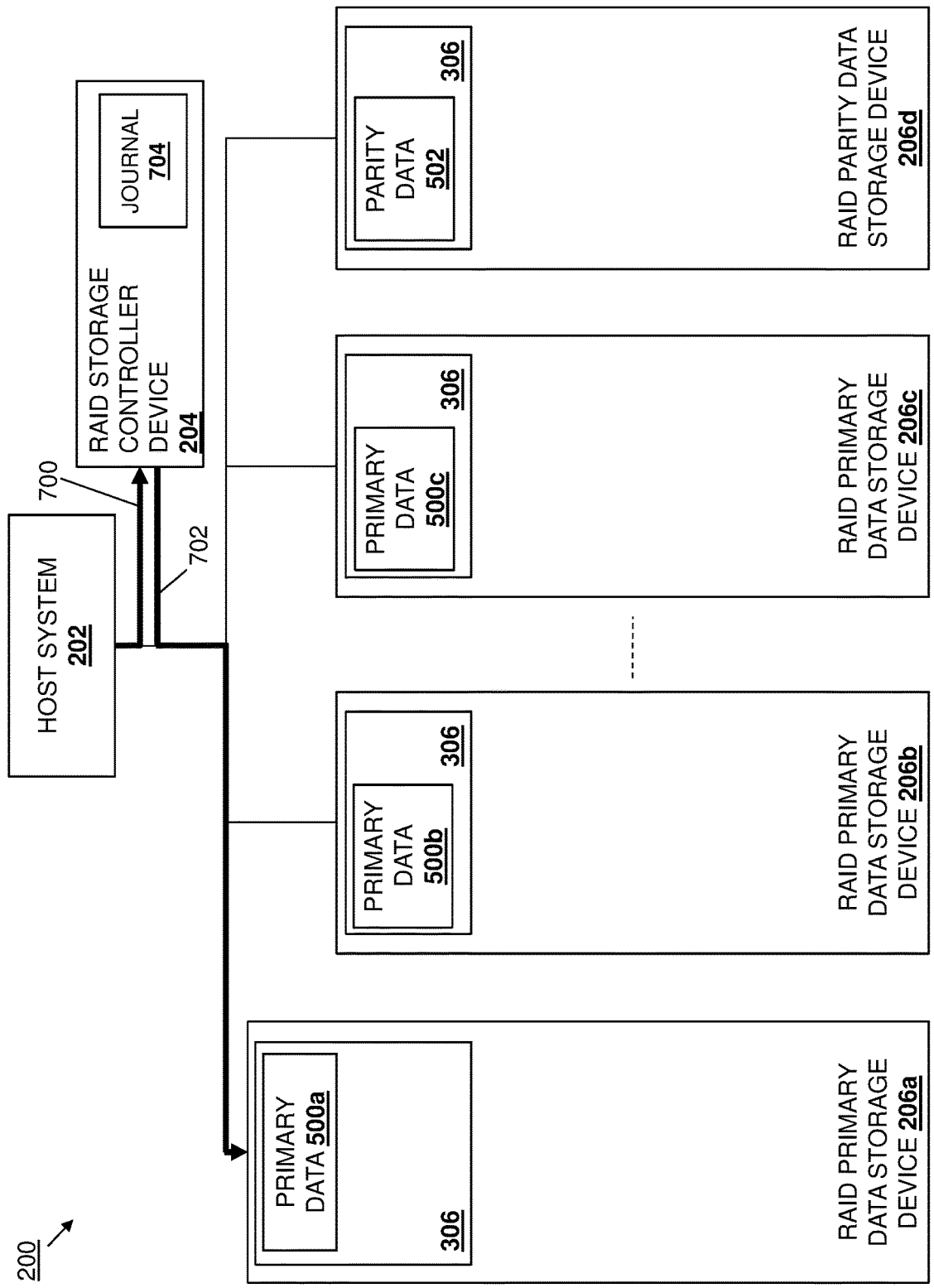
FIG. 7A is a schematic view illustrating an embodiment of the RAID data storage system of FIG. 2 operating during the method of FIG. 4.

Beginning with the "process write" embodiment discussed above and with reference to FIG. 7A, in this embodiment of block 404, the host system 202 may generate a write command 700 that instructs the writing of data stored in the host system 202 to RAID data storage device(s) in the RAID data storage system 200, and may transmit the write command 700 to the RAID storage controller device 204. In this example, the RAID storage controller engine in the RAID storage controller device 204 may receive that write command 700 and, in response, determine that the data identified in the write command 700 should be written to the RAID primary data storage device 206a. Thus, in this specific embodiment of block 404, the RAID storage controller engine in the RAID storage controller device 204 may then generate a "process write" multi-step command 702 for the RAID primary data storage device 206a, and transmit that "process write" multi-step command 702 to the RAID primary data storage device 206a. As will be appreciated by one of skill in the art in possession of the present disclosure, the generation of the "process write" multi-step command 702 may include the performance of any of the pre-command operations described in U.S. patent application Ser. No. 16/832,348, filed on Mar. 27, 2020, and the "process write" multi-step command 702 may include any information needed for the RAID primary data storage device 206a and the RAID parity data storage device 206d to perform the functionality described below.

In addition, at block 404, the RAID storage controller engine in the RAID storage controller device 204 may operate to generate a journal 704 (or journal entry) that logs the generation and transmission of the "process write" multi-step command 702. As will be appreciated by one of skill in the art in possession of the present disclosure, journal operations such as those performed to log the generation and transmission of the "process write" multi-step command 702 in the journal 704 may be performed to create a record of the data transfer operation being performed such that, in the event of a power loss to the RAID data storage system 200 or other interruption to the data transfer operation, the data transfer operation may be resumed after power is restored and/or the interruption ends. As such, the journal 704 may identify that the write command 700 was received, that the "process write" multi-step command 702 was generated and transmitted to the RAID primary data storage device 206a, that no completion message has yet been received from the RAID primary data storage device 206a, and/or any other journal information that would be apparent to one of skill in the art in possession of the present disclosure.

The method 400 then proceeds to block 406 where the first RAID data storage device performs a first subset of operations associated with the multi-step command. In an embodiment, at block 406 and following the receiving of the "process write" multi-step command 702 by the RAID data storage engine 304 in the RAID primary data storage device 206a/300 via its communication subsystem 310, the RAID data storage engine 304 in the RAID primary data storage device 206a/300 may identify the steps in the "process write" multi-step command 702 and determine a first subset of operations in those steps that must be performed by the RAID primary data storage device 206a, as well as a second subset of operations in those steps that must be performed by the RAID data storage device(s) 206b, 206c, and/or 206d. Thus, while the example of the "process write" multi-step command 702 discussed below only involves operations by the RAID primary data storage device 206a and the RAID parity data storage device 206d, one of skill in the art in possession of the present disclosure will appreciate that multi-step commands may involve the performance of operations by any number of the RAID data storage devices while remaining within the scope of the present disclosure as well.

As will be understood by one of skill in the art in possession of the present disclosure, the storage space provided by the RAID data storage devices 206a-206d in the RAID 5 configuration provided in the illustrated embodiment may be presented to an operating system on the host system 202 as a "virtual disk" that has a storage space equal to that of the combined storage spaces of the RAID data storage devices 206a-206d (e.g., absent storage space that is used to store parity data), and one of skill in the art in possession of the present disclosure will appreciate that the storage space may appear to be of different sizes for other RAID configurations (e.g., RAID 0, RAID 1, RAID 6, etc.) As such, the operating system on the host system 202 may "see" one contiguous RAID data storage device with a storage capacity of the RAID data storage devices 206a-206d, and has no awareness of the individual RAID data storage devices 206a-206d. This results in the operating system in the host system 202 addressing commands to the virtual disk it "sees" with virtual disk Logical Block Addresses (LBAs), which are typically translated by the RAID storage controller device 204 to the RAID data storage device LBAs. Thus, the RAID data storage devices 206a-206d may be configured with an "awareness" of the total size of the virtual disk storage space being presented to the operating system on the host system 202, and may also be configured to perform the virtual-disk-LBA-to-RAID-data-storage-device-LBA translations that are traditionally performed by the RAID storage controller device as discussed above. Furthermore, while the operating system on the host system 202 is discussed as "seeing" one contiguous RAID data storage device with a storage capacity of the RAID data storage devices 206a-206d, one of skill in the art in possession of the present disclosure will appreciate that the storage capacity of the RAID data storage devices 206a-206d may be presented as multiple virtual disks, multiple RAID data storage systems may have their storage capacity presented as a single virtual disk, and/or other virtual disk presentation scenarios will fall within the scope of the present disclosure as well.

Figure 7B:
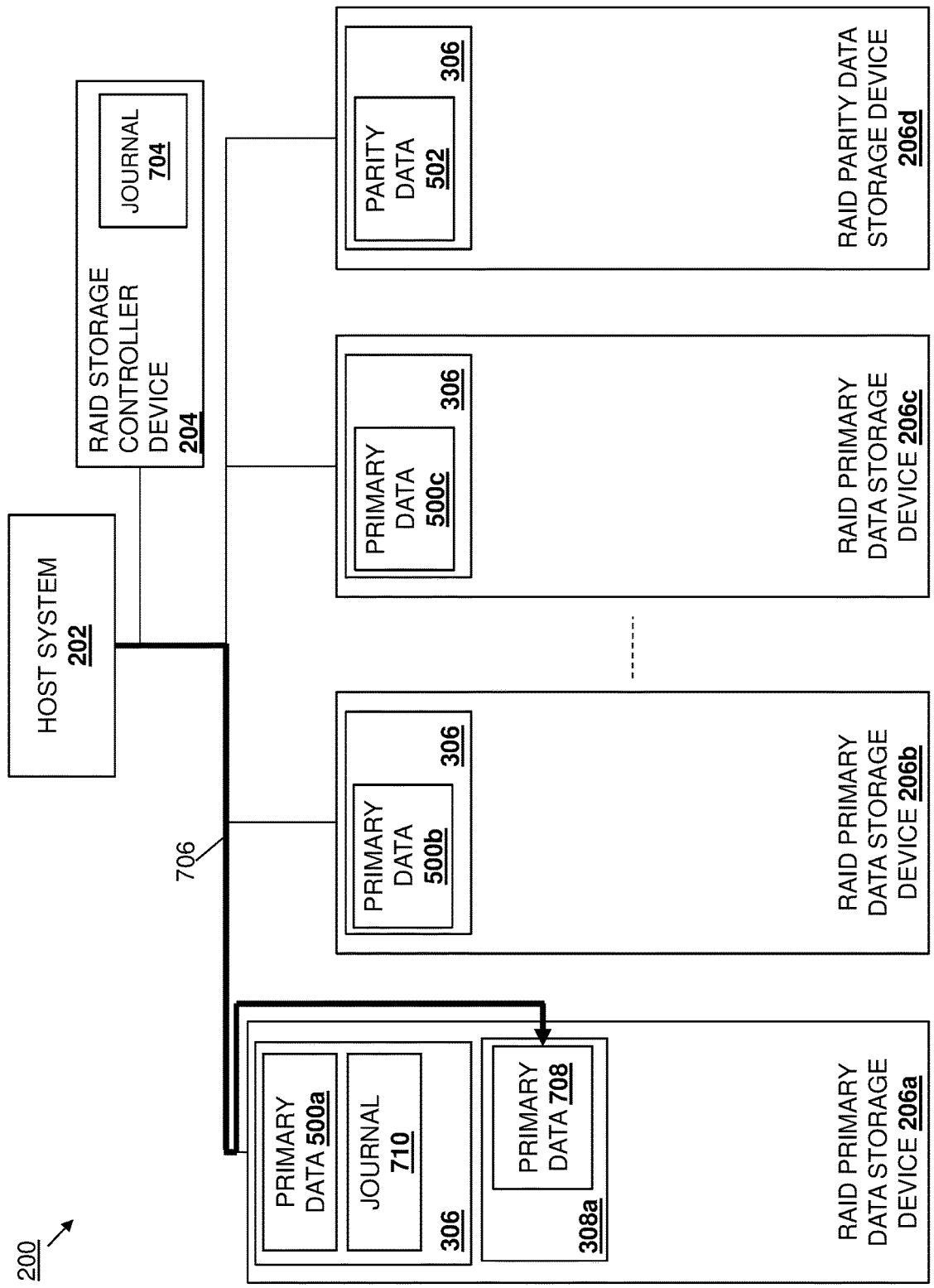
FIG. 7B is a schematic view illustrating an embodiment of the RAID data storage system of FIG. 2 operating during the method of FIG. 4.

With reference to FIG. 7B, first operation(s) in the first subset of operations included in the "process write" multi-step command 702 for performance by the RAID primary data storage device 206a may include the retrieval of "updated" primary data from the host system 202. As will be appreciated by one of skill in the art in possession of the present disclosure and as discussed above, the write command 700 generated by the host system 202 may identify "updated" primary data that is stored on the host system 202 and that should "update" or replace the "current" primary data 500a stored in the storage subsystem 306 of the RAID primary data storage device 206a. As such, at block 406, the RAID data storage engine 304 in the RAID primary data storage device 206a/300 may perform Direct Memory Access (DMA) operations 706 that access a memory system that is included in the host system 202 and that stores the "updated" primary data 708, and write that "updated" primary data 708 to its first buffer subsystem 308a (e.g., a device buffer) in the RAID primary data storage device 206a, as illustrated in FIG. 7B.

Furthermore, at block 406, the RAID data storage engine 304 in the RAID primary data storage device 206a/300 may operate to generate a journal 710 (or journal entry) that logs the progress of any of the first operations(s) discussed above. As will be appreciated by one of skill in the art in possession of the present disclosure, journal operations such as those performed to log the progress of any of the first operations(s) discussed above may be performed to create a record of the data transfer operation being performed such that, in the event of a power loss to the RAID data storage system 200 or other interruption to the data transfer operation, the data transfer operation may be resumed after power is restored and/or the interruption ends. In particular, one of skill in the art in possession of the present disclosure will appreciate that the multiple operations autonomously performed by the RAID primary data storage device 206a are not visible to the RAID storage controller device 204, and thus may be tracked by the RAID primary data storage device 206a using the journal 710 such that those operations may be resumed after power is restored and/or the interruption ends. As such, the journal 710 may identify and be used to regularly update the status of any of the first operation(s) performed by the RAID primary data storage device 206a, and the RAID primary data storage device 206d may remove any of the entries for those first operation(s) from the journal 710 once they have been completed.

Figure 7C:
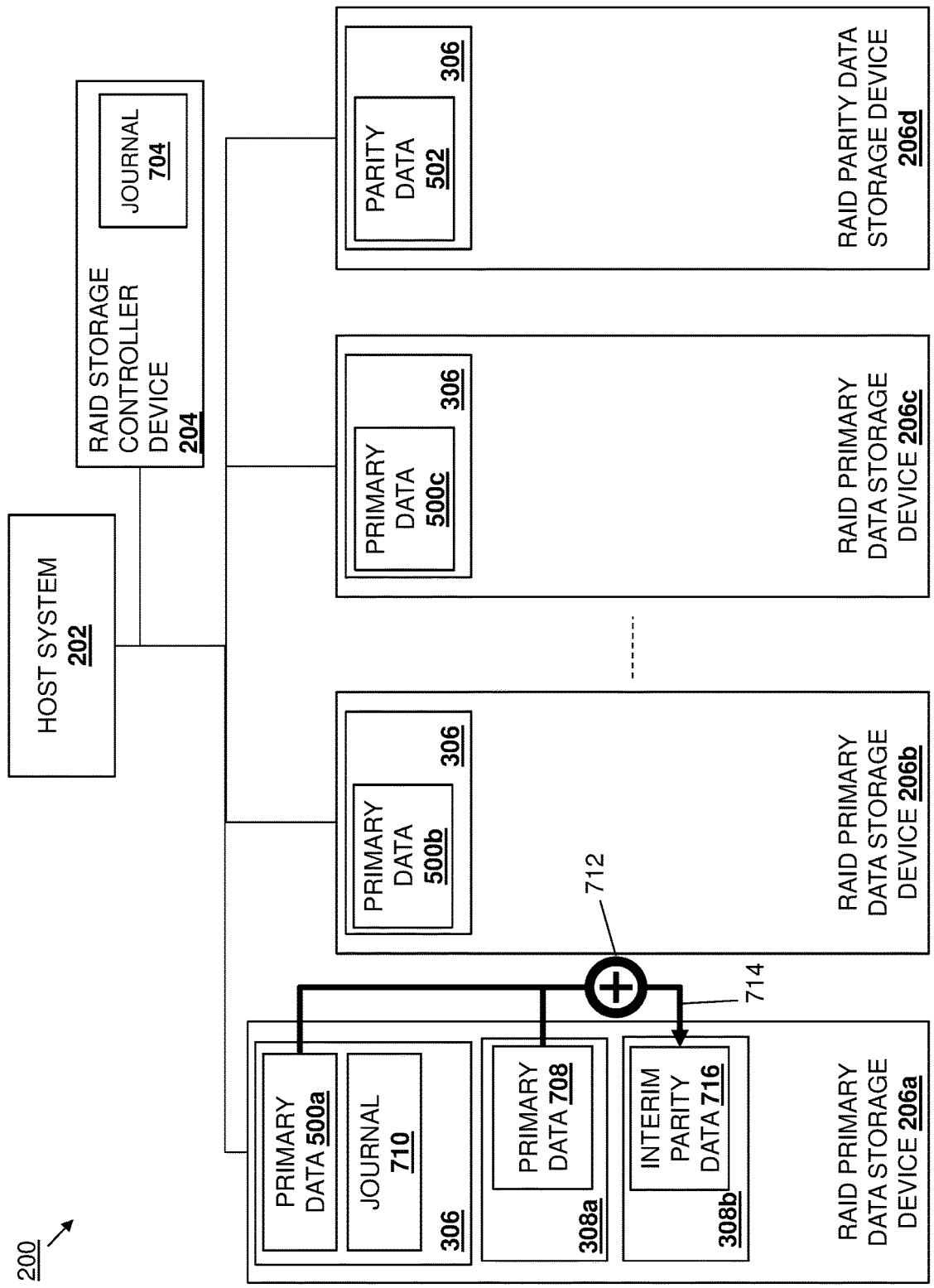
FIG. 7C is a schematic view illustrating an embodiment of the RAID data storage system of FIG. 2 operating during the method of FIG. 4.

With reference to FIG. 7C, second operation(s) in the first subset of operations included in the multi-step command 702 for performance by the RAID primary data storage device 206a may include the calculation of interim parity data by the RAID primary data storage device 206a. As discussed above, the updating of "current" primary data with "updated" primary data in the RAID primary data storage device 206a changes the data stored on the RAID primary data storage device 206a for the data stripe that includes the primary data 500a, 500b, and 500c and the parity data 502, and thus requires an update to the "current" parity data 502 stored in the storage subsystem 306 on the RAID parity data storage device 206d/300. Furthermore, the change in the data stored on the RAID primary data storage device 206a resulting from the updating of the "current" primary data 500a with the "updated" primary data 708 may be calculated via the performance of an XOR operation on the "current" primary data 500a and the "updated" primary data 708 to produce interim parity data. As such, at block 406, the RAID data storage engine 304 in the RAID primary data storage device 206a/300 may perform XOR operations 712 on the "current" primary data 500a and the "updated" primary data 708 to generate interim parity data 716, and perform a write operation 714 to store that interim parity data 716 in its second buffer subsystem 308b (e.g., a CMB subsystem), as illustrated in FIG. 7C. As discussed above, in response to beginning any of the second operation(s) in the first subset of operations, the RAID data storage engine 304 in the RAID primary data storage device 206a/300 may add journal entries corresponding to those first subset of operations to the journal 710, and in response to completing any of the first subset of operations associated with the multi-step command 702, the RAID data storage engine 304 in the RAID primary data storage device 206a/300 may remove journal entries corresponding to those first subset of operations from the journal 710.

Figure 7D:
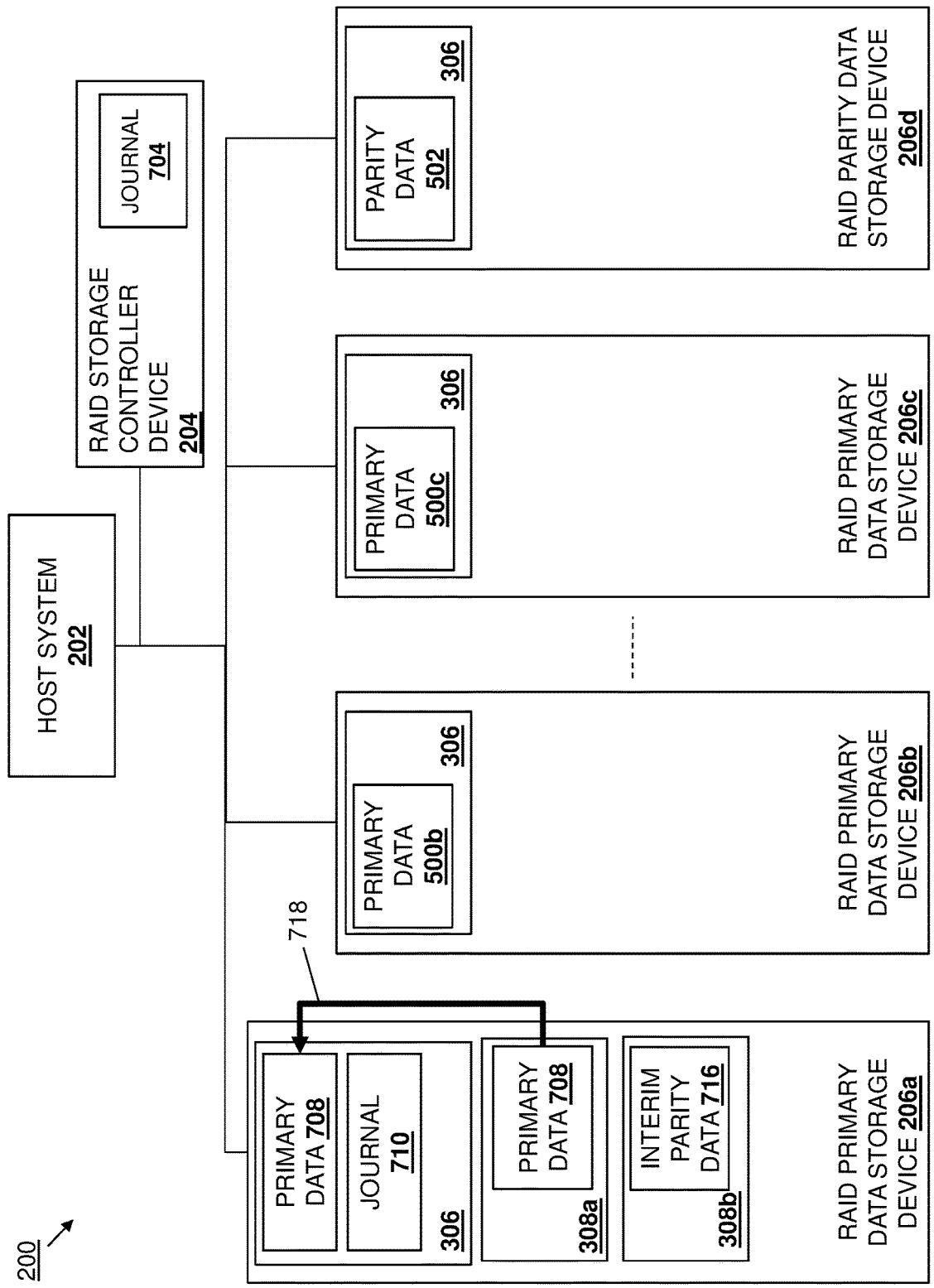
FIG. 7D is a schematic view illustrating an embodiment of the RAID data storage system of FIG. 2 operating during the method of FIG. 4.

With reference to FIG. 7D, third operation(s) in the first subset of operations included in the multi-step command 702 for performance by the RAID primary data storage device 206a may include the updating of "current" primary data with "updated" primary data. In an embodiment, at block 406, the RAID data storage engine 304 in the RAID primary data storage device 206a/300 may perform an overwrite operation 718 in order to overwrite the "current" primary data 500a stored on its storage subsystem 306 with the "updated" primary data 708 stored in its second buffer subsystem 308b, as illustrated in FIG. 7D. As discussed above, in response to beginning any of the third operation(s) in the first subset of operations, the RAID data storage engine 304 in the RAID primary data storage device 206a/300 may add journal entries corresponding to those first subset of operations to the journal 710, and in response to completing any of the first subset of operations associated with the multi-step command 702, the RAID data storage engine 304 in the RAID primary data storage device 206a/300 may remove journal entries corresponding to those first subset of operations from the journal 710 (e.g., while keeping at least one journal entry open to indicate the progress of the parity data update operations performed by the RAID parity data storage device 206d, discussed in further detail below.)

The method 400 then proceeds to decision block 408 where it is determined whether a command should be sent to a second RAID data storage device. As discussed above, the multi-step command 702 may include a second subset of operations for performance by second RAID data storage device(s), and thus the method 400 may proceed depending on whether a second subset of operations are included in the multi-step command 802 that must be performed by second RAID data storage device(s). If, at decision block 408, it is determined that a command should be sent to second RAID data storage device(s), the method 400 then proceeds to block 410 where the first RAID data storage device performs direct command operations with a second RAID data storage device. As discussed above, in this example of decision block 408 and following the receiving of the "process write" multi-step command 702, the RAID data storage engine 304 in the RAID primary data storage device 206a/300 may identify the steps in the "process write" multi-step command 702 and determine the second subset of operations in those steps that must be performed by the RAID parity data storage device 206d. In the example below, the second subset of operations includes the updating of "current" parity data with "updated" parity data, but one of skill in the art in possession of the present disclosure will appreciate that subsets of operations performed by other RAID data storage devices may include a variety of operations that will fall within the scope of the present disclosure as well.

Figure 7E:
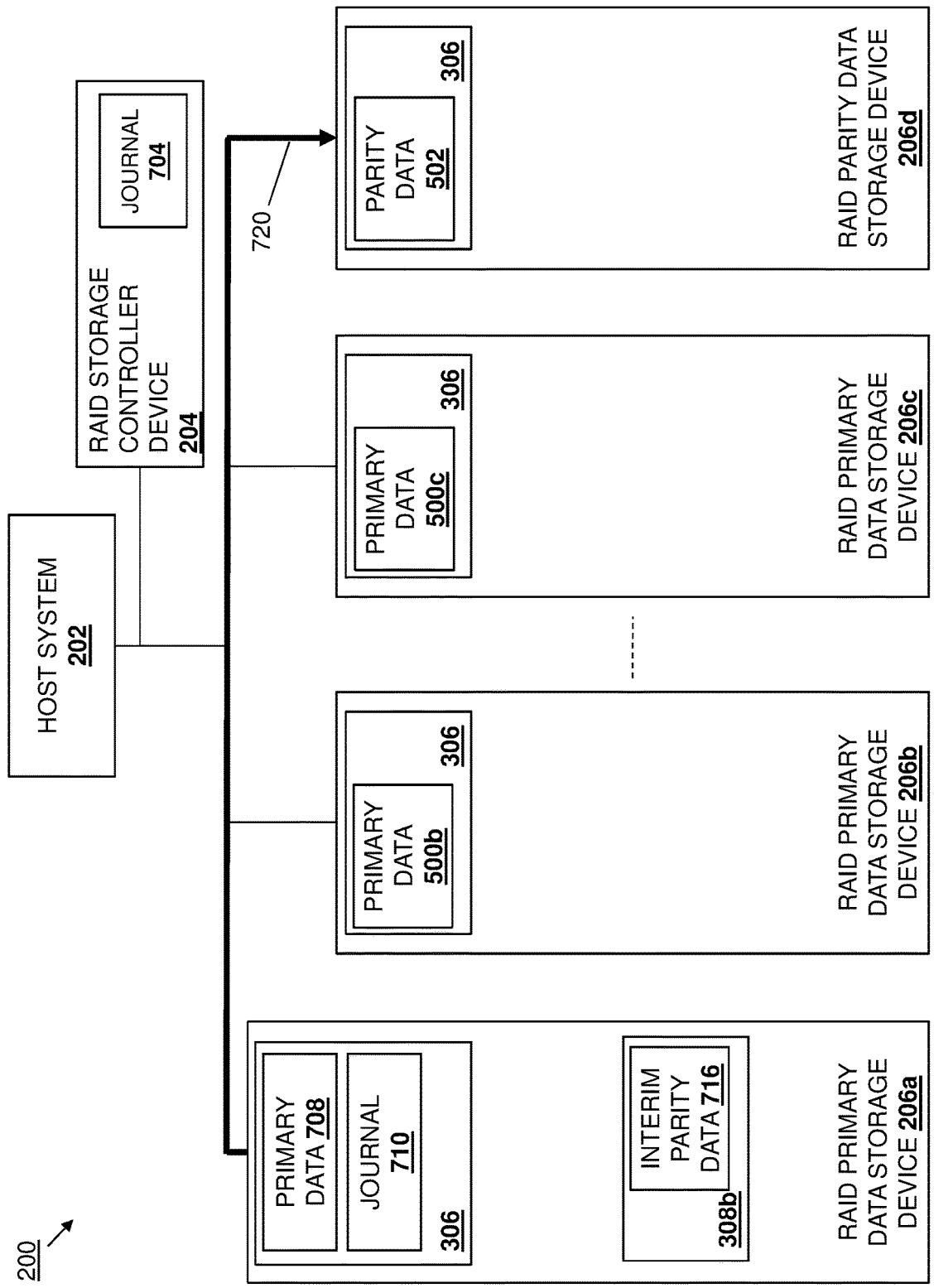
FIG. 7E is a schematic view illustrating an embodiment of the RAID data storage system of FIG. 2 operating during the method of FIG. 4.

With reference to FIG. 7E, in an embodiment of block 410, the RAID data storage engine 304 in the RAID primary data storage device 206a may generate a peer-to-peer multi-step command that instructs the updating of "current" parity data with "updated" parity data. As will be appreciated by one of skill in the art in possession of the present disclosure, the generation of the peer-to-peer multi-step command may include the performance of any of the pre-command operations described in U.S. patent application Ser. No. 16/832, 348, filed on Mach 27, 2020 and the peer-to-peer multi-step command may include any information needed for the RAID parity data storage device 206d to perform the functionality described below. The RAID data storage engine 304 in the RAID primary data storage device 206a may then perform direct command operations 720 to transmit the peer-to-peer multi-step command to the RAID parity data storage device 206d, as illustrated in FIG. 7E. As will be appreciated by one of skill in the art in possession of the present disclosure, the direct command operations 720 may include any of the operations described in U.S. patent application Ser. No. 16/838,224, filed on Apr. 2, 2020, that allow the RAID primary data storage device 206a to transmit the peer-to-peer multi-step command directly to the RAID parity data storage device 206d.

The method 400 then proceeds to block 412 where the second RAID data storage device performs a second subset of operations associated with the multi-step command. In an embodiment, at block 412 and following the receiving of the peer-to-peer multi-step command by the RAID data storage engine 304 in the RAID parity data storage device 206d/300 via its communication subsystem 310, the RAID data storage engine 304 in the RAID parity data storage device 206d/300 may identify the second subset of operations included in the peer-to-peer multi-step command for performance by the RAID parity data storage device 206d.

Figure 7F:
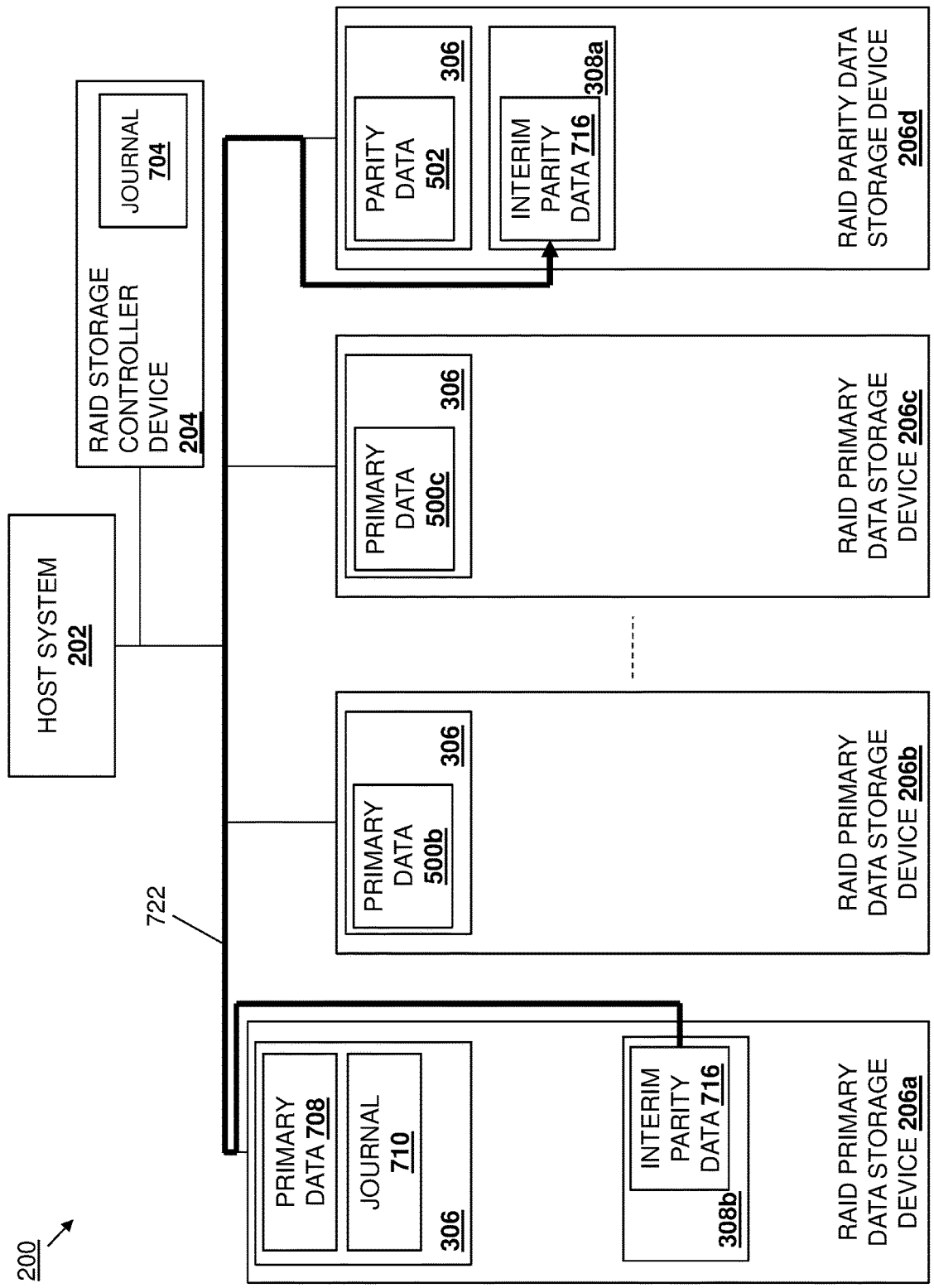
FIG. 7F is a schematic view illustrating an embodiment of the RAID data storage system of FIG. 2 operating during the method of FIG. 4.

With reference to FIG. 7F, first operation(s) in the second subset of operations included in the peer-to-peer multi-step command for performance by the RAID parity data storage device 206d may include the retrieval of interim parity data from the RAID primary data storage device 206a. As discussed above, the updating of "current" primary data with "updated" primary data in the RAID primary data storage device 206a changes the data stored on the RAID primary data storage device 206a for the data stripe that includes the primary data 500b and 500c and the parity data 502, and thus requires an update to the "current" parity data 502 stored in the storage subsystem 306 on the RAID parity data storage device 206d/300. Furthermore, the change in the data stored on the RAID primary data storage device 206a resulting from the updating of the "current" primary data 500a with the "updated" primary data 708 was previously calculated via the performance of an XOR operation on the "current" primary data 500a and the "updated" primary data 708 to produce the interim parity data 716 stored in the second buffer subsystem 308b (e.g., a CMB subsystem) in the RAID data storage device 206a. As such, at block 412, the RAID data storage engine 304 in the RAID parity data storage device 206b/300 may perform DMA operations 722 that access the interim parity data 716 in the second buffer subsystem 308b in the RAID primary data storage device 206a, and may write that interim parity data 716 to a first buffer subsystem 308a (e.g., a device buffer) in the RAID parity data storage device 206d/300, as illustrated in FIG. 7F.

Figure 7G:
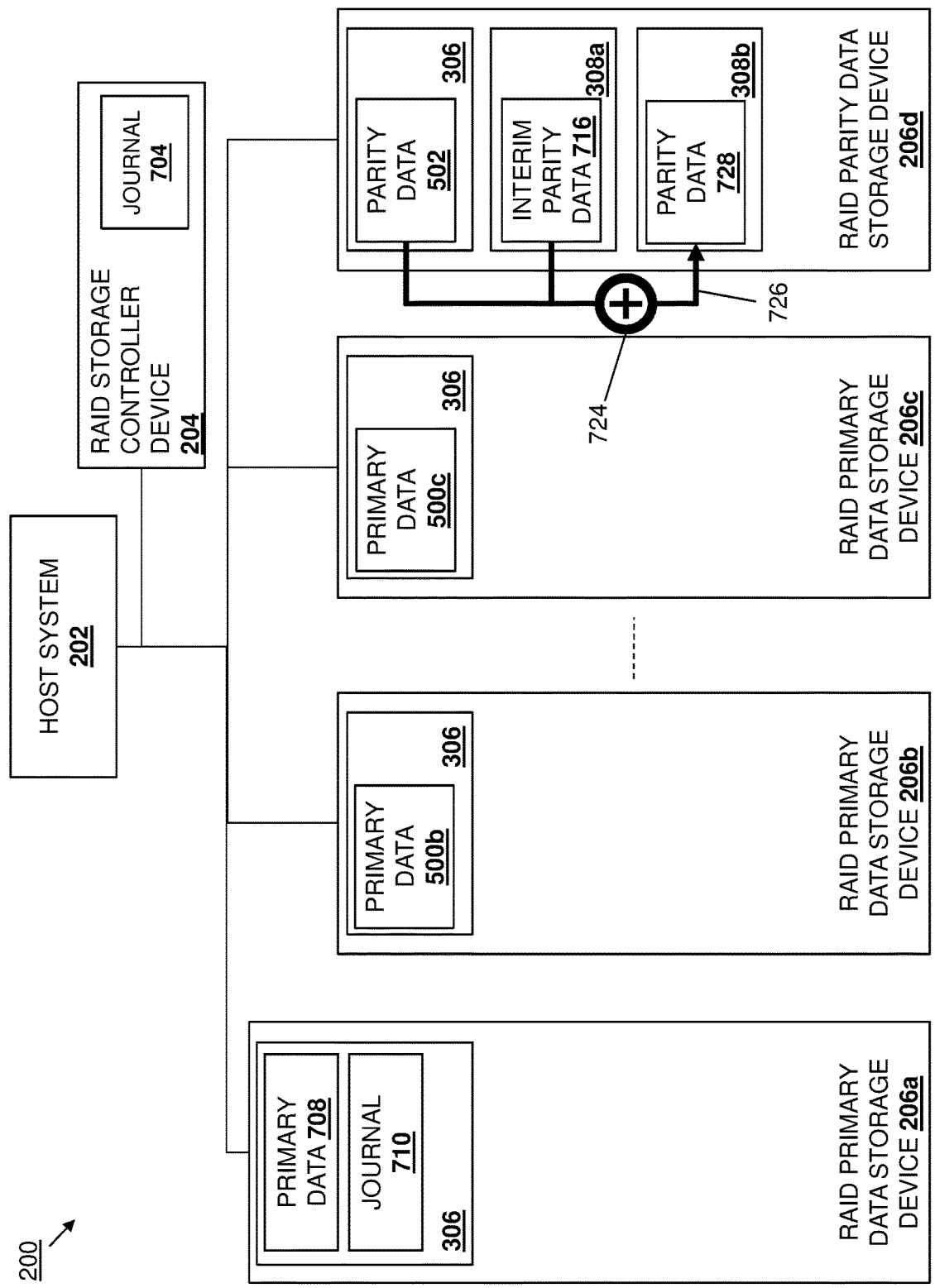
FIG. 7G is a schematic view illustrating an embodiment of the RAID data storage system of FIG. 2 operating during the method of FIG. 4.

With reference to FIG. 7G, second operation(s) in the second subset of operations included in the peer-to-peer multi-step command for performance by the RAID parity data storage device 206d may include the calculation of "updated" parity data. As discussed above, the change in the data stored on the RAID primary data storage device 206a resulting from the updating of the "current" primary data 500a with the "updated" primary data 708 may be calculated via the performance of an XOR operation on the "current" primary data 500a and the "updated" primary data 708 to produce the interim parity data 716, and an XOR operation performed on "current" parity data and that interim parity data 716 will generate "updated" parity data that takes into account the "updated" primary data 708. As such, at block 412, the RAID data storage engine 304 in the RAID parity data storage device 206d/300 may perform an XOR operation 724 on the "current" parity data 502 in its storage system 206 and the interim parity data 716 in its first buffer subsystem 308a to produce "updated" parity data 728, and may perform a write operation 726 to write the "updated" parity data 728 to its second buffer subsystem 308b (e.g., a CMB subsystem), as illustrated in FIG. 7G.

Figure 7H:
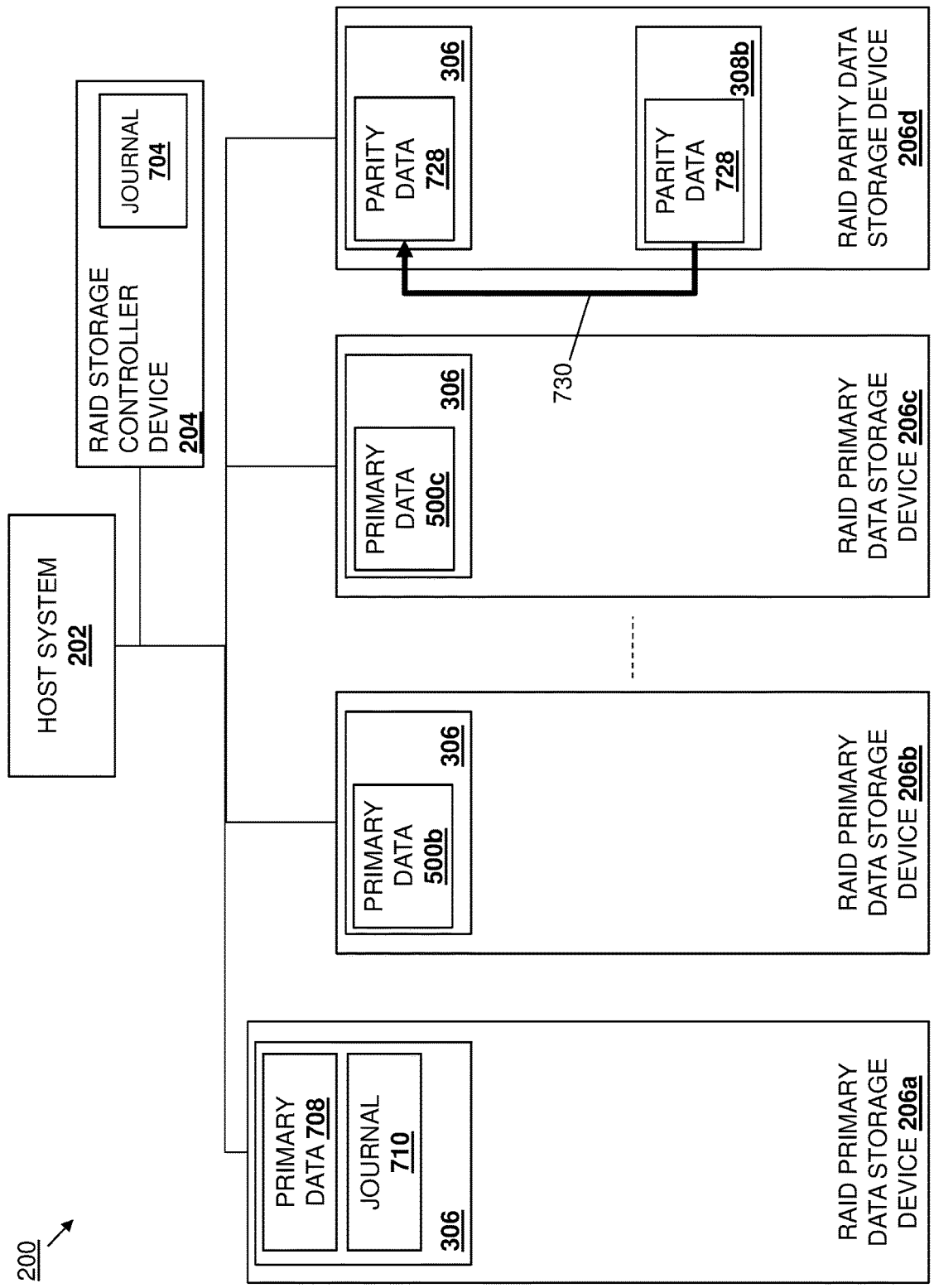
FIG. 7H is a schematic view illustrating an embodiment of the RAID data storage system of FIG. 2 operating during the method of FIG. 4.

With reference to FIG. 7H, third operation(s) in the second subset of operations included in the peer-to-peer multi-step command for performance by the RAID parity data storage device 206d may include the updating of "current" parity data with "updated" parity data. In an embodiment, at block 412, the RAID data storage engine 304 in the RAID parity data storage device 206d/300 may perform an overwrite operation 730 in order to overwrite the "current" parity data 502 stored on its storage subsystem 306 with the "updated" parity data 728 stored in its second buffer subsystem 308b, as illustrated in FIG. 7H. While not illustrated or described above, one of skill in the art in possession of the present disclosure will recognize that in some embodiments, the performance of the second subset of operations performed by the RAID parity data storage device 206d may include journal tracking and updating that is similar to that described above for the first subset of operations performed by the RAID primary data storage device 206a. For example, each of the first operation(s), second operation(s), and third operation(s) performed as part of the second subset of operations by the RAID parity data storage device 206d may include the RAID parity data storage device 206d sending status messages (e.g., an "operation begun" status, an "operation completed" status, etc.) to the RAID primary data storage device 206a so that the RAID primary data storage device 206a may update the journal 710 for those operations as they are performed.

As will be appreciated by one of skill in the art in possession of the present disclosure, at least a portion of the first subset of operations and the second subset of operations may be performed by the first and second RAID data storage devices in parallel. For example, after receiving the multi-step command 702, the RAID primary data storage device 206a may begin performing the first subset of operations associated with the multi-step command 702. The RAID primary data storage device 206a may then perform the direct command operations with the RAID parity data storage device 206d once the interim parity data 716 data has been generated (or will soon be generated) so that the RAID parity data storage device 206d may begin performing the second subset of operations associated with the multi-step command 702 (e.g., calculating "updated" parity data and overwriting "current" parity data with the "updated" parity data) while the RAID primary data storage device 206a completes the first subset of operations associated with the multi-step command 702 (e.g., overwriting "current" primary data with "updated" primary data.) As such, one of skill in the art in possession of the present disclosure will appreciate that the autonomous operations by the RAID data storage devices 206a-206d may be performed in a variety of manners that may increase the efficiency and speed of those operations while remaining within the scope of the present disclosure.

Figure 7I:
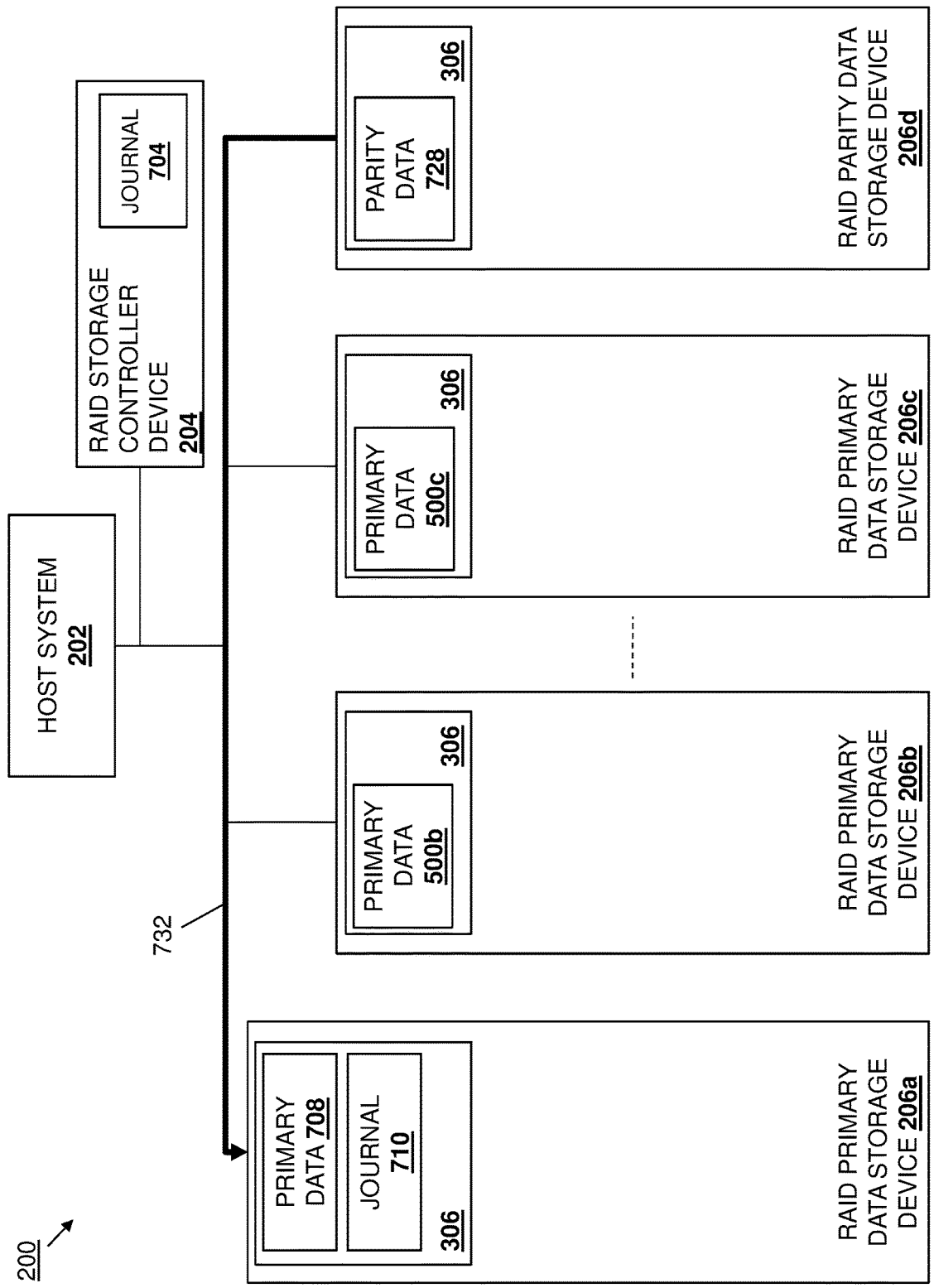
FIG. 7I is a schematic view illustrating an embodiment of the RAID data storage system of FIG. 2 operating during the method of FIG. 4.

The method 400 then proceeds to decision block 414 where it is determined whether the second subset of operations have been completed. In an embodiment, at decision block 414, the RAID data storage engine 304 in the RAID parity data storage device 206d/300 may monitor its progress in performing the second subset of operations associated with the multi-step command 702 to determine whether they have been completed. If, at decision block 414, it is determined that all of the first subset of operations have not been completed, the method 400 returns to block 412. As such, the method 400 may loop such that the RAID data storage engine 304 in the RAID parity data storage device 206d/300 performs the second subset of operations associated with the multi-step command 702 until they are completed. If, at decision block 414, it is determined that all of the second subset of operations have been completed, the method 400 proceeds to block 416 where the second RAID data storage device transmits a completion communication to the first RAID data storage device. In an embodiment, at block 416 and in response to completing the second subset of operations associated with the multi-step command 702, the RAID data storage engine 304 in the RAID parity data storage device 206d/300 may perform direct command operations 732 to transmit a peer-to-peer completion communication to the RAID primary data storage device 206a, as illustrated in FIG. 7I. As will be appreciated by one of skill in the art in possession of the present disclosure, the direct command operations 732 may include any of the operations described in U.S. patent application Ser. No. 16/838,224, filed on Apr. 2, 2020, that allow the RAID parity data storage device 206d to transmit the peer-to-peer completion communication directly to the RAID primary data storage device 206a.

Following block 416, or if at decision block 408 it is determined that a command should not be sent to a second RAID data storage device, the method 400 proceeds to decision block 418 where it is determined whether the first subset of operations have been completed. In an embodiment, at decision block 418, the RAID data storage engine 304 in the RAID primary data storage device 206a/300 may monitor its progress in performing the first subset of operations associated with the multi-step command 702 to determine whether they have been completed. As discussed above, in response to completing any of the first subset of operations associated with the multi-step command 702, the RAID data storage engine 304 in the RAID primary data storage device 206a/300 may remove journal entries corresponding to those first subset of operations from the journal 710. If, at decision block 418, it is determined that all of the first subset of operations have not been completed, the method 400 returns to decision block 406. As such, the method 400 may loop such that the RAID data storage engine 304 in the RAID primary data storage device 206a/300 performs the first subset of operations associated with the multi-step command 702 until they are completed.

If at decision block 418, it is determined that the first subset of operations have been completed, the method 400 proceeds to decision block 419 where it is determined whether a completion communication has been received from the second RAID data storage device. In an embodiment, at decision block 419 and in response to transmitting the peer-to-peer multi-step command to the RAID parity data storage device 206d, the RAID data storage engine 304 in the RAID primary data storage device 206a/300 may monitor for a completion communication from the RAID parity data storage device 206d that indicates that the second subset of operations associated with the multi-step command 702 have been completed. If, at decision block 419, it is determined that the completion communication has not been received from the second RAID data storage device, the method 400 returns to decision block 419. As such, the method 400 may loop such that the RAID data storage engine 304 in the RAID primary data storage device 206a/300 continues to monitor for the completion of the second subset of operations associated with the multi-step command 702 by the RAID parity data storage device 206d. One of skill in the art in possession of the present disclosure will recognize that decision blocks 418 and 419 may be performed at different times during the method 400 (e.g., depending on the type of operations being performed) so that the first RAID data storage device may determine when the multi-step command received at block 404 has been completed.

Figure 7J:
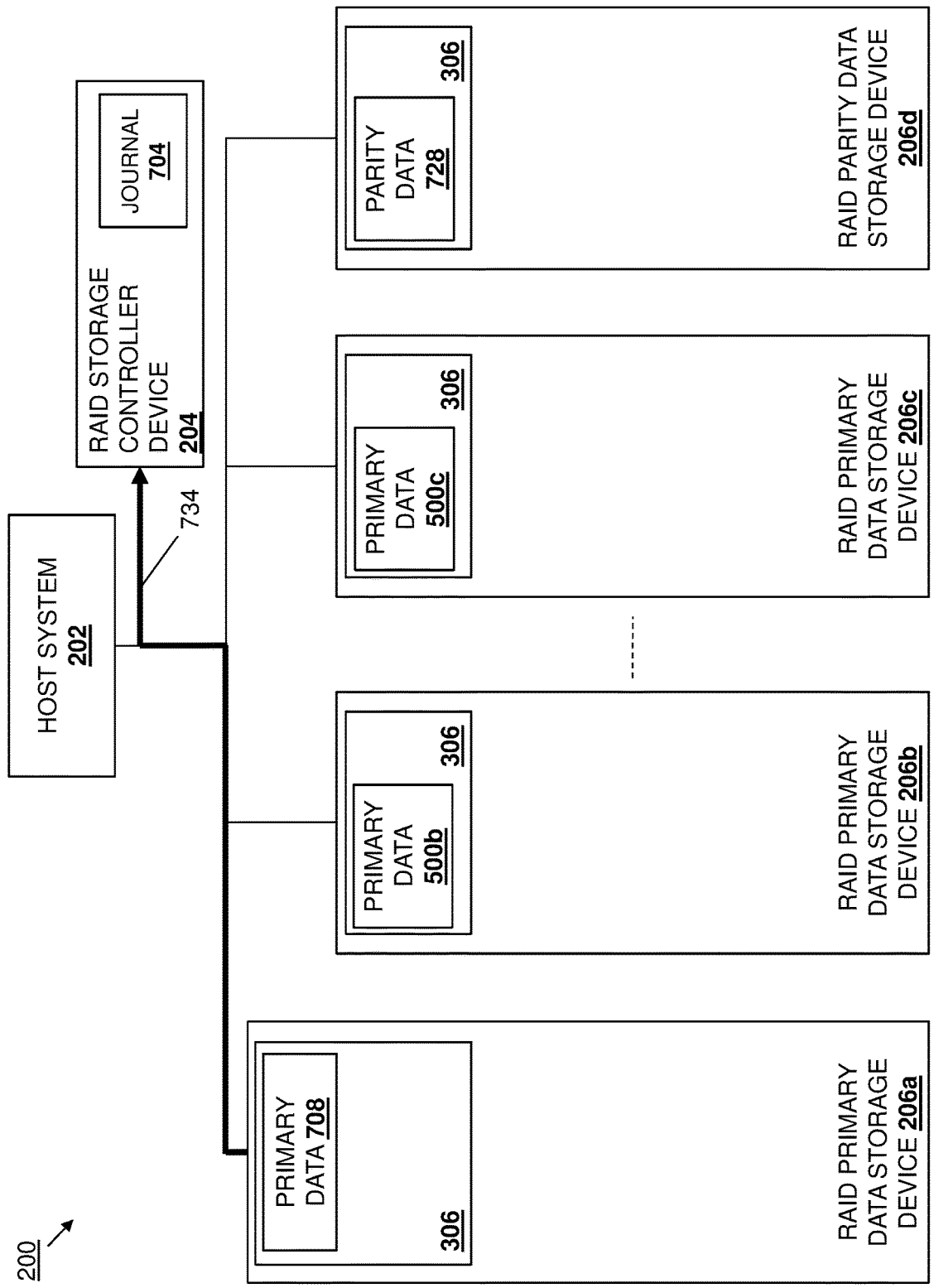
FIG. 7J is a schematic view illustrating an embodiment of the RAID data storage system of FIG. 2 operating during the method of FIG. 4.

If at decision block 419, it is determined that the completion communication has been received from the second RAID data storage device, the method 400 proceeds to block 420 where the first RAID data storage device transmits a completion communication to the RAID storage controller device. As illustrated in FIG. 7J, following the receiving the peer-to-peer completion communication from the RAID parity data storage device 206d, the RAID data storage engine 304 in the RAID primary data storage device 206a may generate and transmit a completion communication 734 via its communication system 310 to the RAID storage controller device 204 that indicates that the multi-step command 702 has been completed, and may remove the journal entries/journal 710 associated with the multi-step command 702.

Figure 7K:
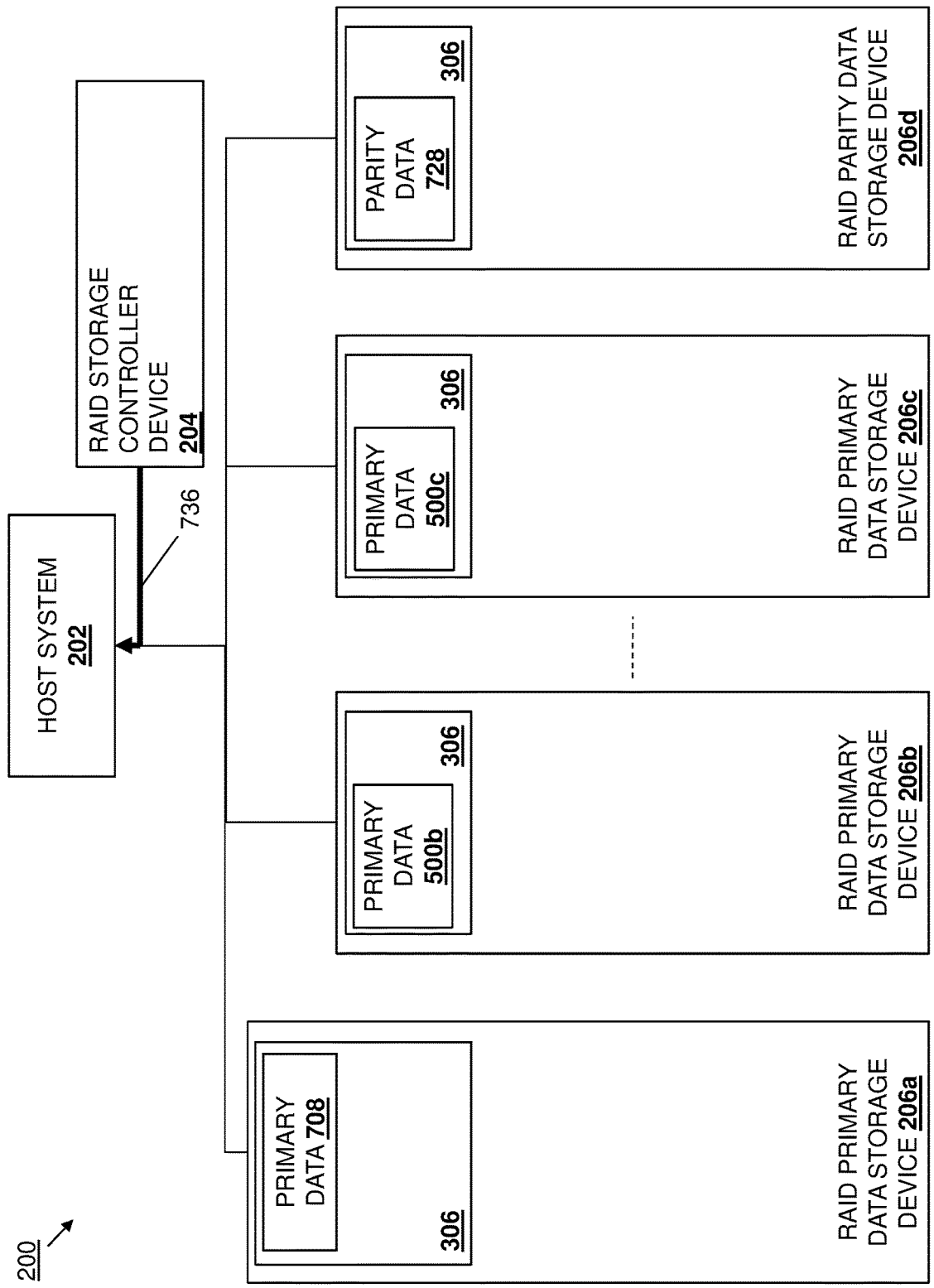
FIG. 7K is a schematic view illustrating an embodiment of the RAID data storage system of FIG. 2 operating during the method of FIG. 4.

Furthermore, as illustrated in FIG. 7K, in response to receiving the completion communication from the RAID primary data storage device 206a, the RAID storage controller engine in the RAID storage controller device 204 may generate and transmit a completion communication 736 to the host system 202 that indicates that the write command 700 has been completed, and may remove the journal entries/journal 704 associated with the write command 700. Thus, systems and methods have been described that provide for autonomous RAID data storage system operations that, in the example above, provide for the autonomous processing of a write command by RAID data storage devices, which operates to offload almost all of the operations conventionally performed by the RAID storage controller device to RAID data storage devices in the RAID data storage system in which that write operation (and associated operations) are being performed. Furthermore, one of skill in the art in possession of the present disclosure will recognize that only two RAID data storage devices are illustrated as enabling the write operation, the discussion above may be extended to provide a RAID data storage device (e.g., the RAID data storage device 206a) that coordinates operations of additional other RAID data storage devices that are needed to enable any command while remaining within the scope of the present disclosure as well.

Moving now to the "degraded read" embodiment discussed above, one of skill in the art in possession of the present disclosure will recognize that the discussion above with regard to FIGS. 5, 6A, 6B, 6C, and 6D, and the method 400 applies similarly to block 402 of the "degraded read" embodiment of the method 400. However, with reference to FIG. 8A, in this embodiment of block 404, the host system 202 may generate a read command 800 that instructs the reading of the primary data 500b stored in the RAID primary data storage device 206b, and may transmit the read command 800 to the RAID storage controller device 204.

Figure 8A:
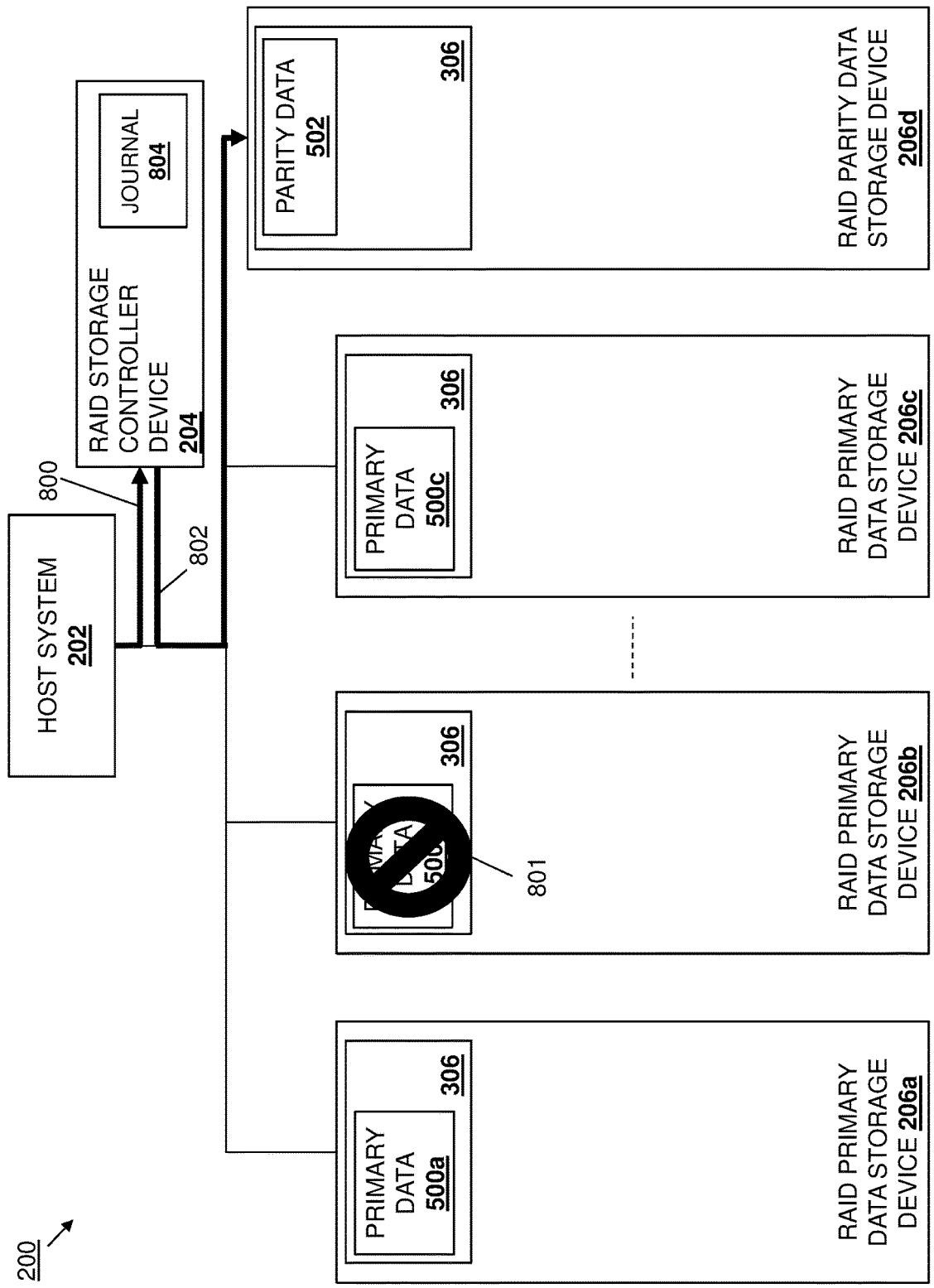
FIG. 8A is a schematic view illustrating an embodiment of the RAID data storage system of FIG. 2 operating during the method of FIG. 4.

In the embodiment illustrated in FIGS. 8A-8I, the primary data 500b is unavailable (as indicated by element 801 in FIG. 8A) due to, for example, an unavailability of the primary data 500b on the RAID primary data storage device 206b while other primary and/or parity data is available on the RAID primary data storage device 206b, failure of the RAID primary data storage device 206b and/or any of a variety of unavailable data situations that would be apparent to one of skill in the art in possession of the present disclosure. As such, the RAID storage controller engine in the RAID storage controller device 204 may receive that read command 800 and, in response, determine that the primary data 500b identified in the read command 800 was previously available on the RAID primary data storage device 206b, but is now currently unavailable. In response, in this specific example of block 404, the RAID storage controller engine in the RAID storage controller device 204 may then generate a "degraded read" multi-step command 802 for the RAID parity data storage device 206d, and transmit that "degraded read" multi-step command 802 to the RAID parity data storage device 206d, as illustrated in FIG. 8A. As will be appreciated by one of skill in the art in possession of the present disclosure, the generation of the "degraded read" multi-step command 802 may include the performance of any of the pre-command operations described in U.S. patent application Ser. No. 16/832,348, filed on Mar. 27, 2020, and the "degraded read" multi-step command 802 may include any information needed for the RAID primary data storage devices 206a and 206c and the RAID parity data storage device 206d to perform the functionality described below.

In addition, at block 404, the RAID storage controller engine in the RAID storage controller device 204 may operate to generate a journal 804 (or journal entry) that logs the generation and transmission of the "degraded read" multi-step command 802. As will be appreciated by one of skill in the art in possession of the present disclosure, journal operations such as those performed to log the generation and transmission of the "degraded read" multi-step command 802 in the journal 804 may be performed to create a record of the data transfer operation being performed such that, in the event of a power loss to the RAID data storage system 200 or other interruption to the data transfer operation, the data transfer operation may be resumed after power is restored and/or the interruption ends. As such, the journal 804 may identify that the read command 800 was received, that the "degraded read" multi-step command 802 was generated and transmitted to the RAID parity data storage device 206d, that no completion message has yet been received from the RAID parity data storage device 206d, and/or any other journal information that would be apparent to one of skill in the art in possession of the present disclosure. However, one of skill in the art in possession of the present disclosure will recognize that read operations may also be restarted from their beginning, and thus may not be journaled (as discussed above) in some embodiment.

As will be appreciated by one of skill in the art in possession of the present disclosure, the operations associated with the "degraded read" multi-step command 802 provide an example in which the first RAID data storage device performs the direct command operations with the second RAID data storage devices, and the second RAID data storage devices performs the second subset of operations associated with the "degraded read" multi-step command 802, prior to the first RAID storage device performing the first subset of operations associated with the "degraded read" multi-step command 802. Thus, in an embodiment of block 404 and following the receiving of the "degraded read" multi-step command 802 by the RAID data storage engine 304 in the RAID parity data storage device 206d/300 via its communication subsystem 310, the RAID data storage engine 304 in the RAID parity data storage device 206d/300 may identify the steps in the "degraded read" multi-step command 802 and determine a first subset of operations in those steps that must be performed by the RAID parity data storage device 206d, as well as second subsets of operations in those steps that must be performed by the RAID data storage device(s) 206c and 206d. However, while the example of the "degraded read" multi-step command 802 only involves operations by the RAID primary data storage devices 206a and 206c and the RAID parity data storage device 206d, one of skill in the art in possession of the present disclosure will appreciate that multi-step commands may involve any number of the RAID data storage devices while remaining within the scope of the present disclosure as well.

As such, following block 404 in this specific example, the first RAID parity data storage device 206d may wait to perform the first subset of operations associated with the multi-step command 802 at block 406 of the method 400 until the RAID primary data storage devices 206a and 206c have completed the second subset of operations associated with the multi-step command 802, discussed below. Thus, in this example, the method 400 may proceed to block 408 where it is determined whether commands should be sent to the RAID primary data storage devices 206a and 206c. In response to determining that commands should be sent to the RAID primary data storage devices 206a and 206c based on the multi-step command 802, the method 400 may then proceed to block 410 where the first RAID data storage device performs direct command operations with second RAID data storage devices. As discussed above, at block 408 and following the receiving of the "degraded read" multi-step command 802, the RAID data storage engine 304 in the RAID parity data storage device 206d/300 may identify the steps in the "degraded read" multi-step command 802 and determine the second subsets of operations in those steps that must be performed by the RAID primary data storage device 206a and the RAID primary data storage device 206c. In the example below, the second subsets of operations include providing current primary data to the RAID parity data storage device 206d, but one of skill in the art in possession of the present disclosure will appreciate that subsets of operations performed by other RAID data storage devices may include a variety of operations that will fall within the scope of the present disclosure as well.

Figure 8B:
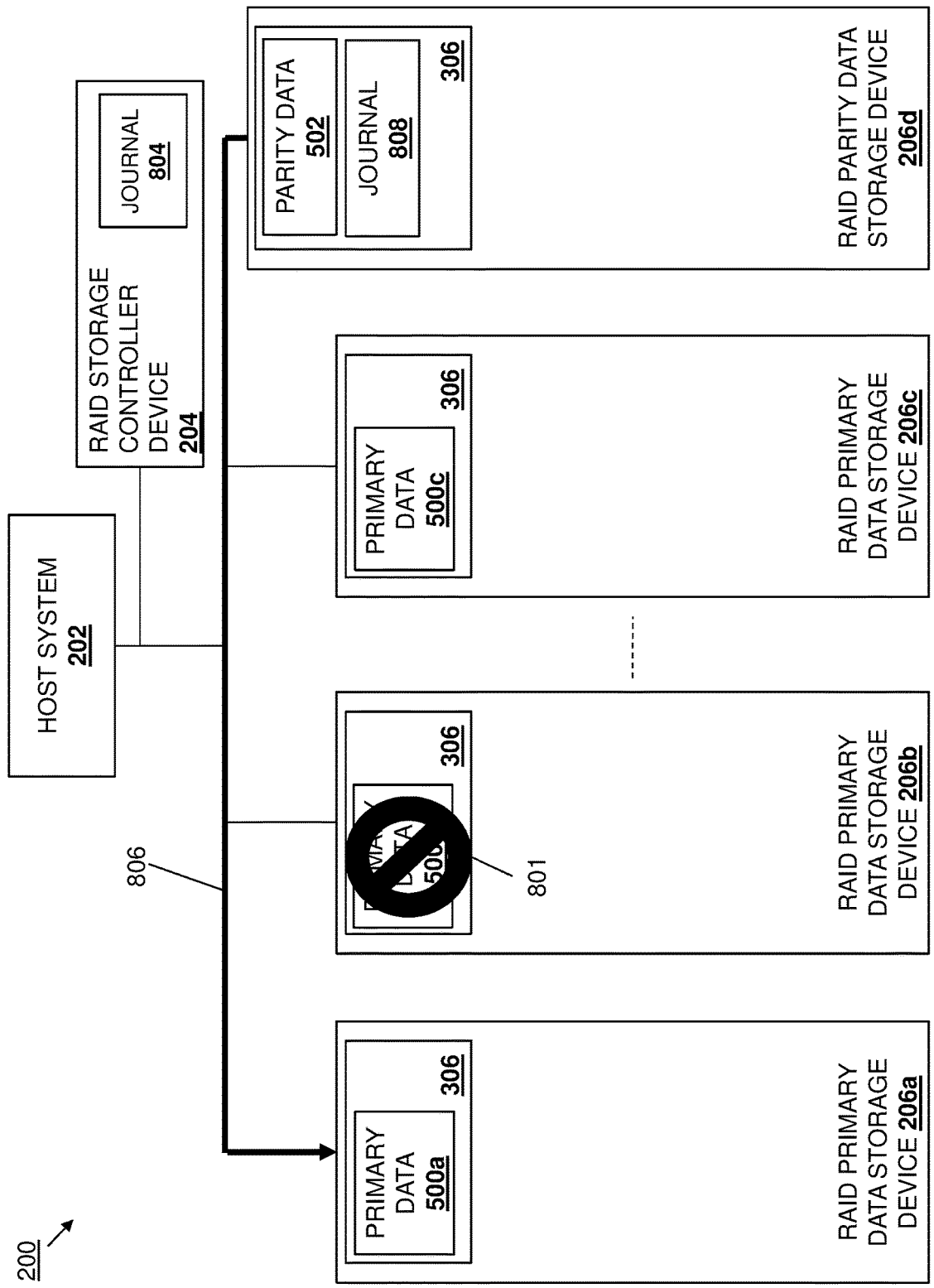
FIG. 8B is a schematic view illustrating an embodiment of the RAID data storage system of FIG. 2 operating during the method of FIG. 4.

With reference to FIG. 8B, in an embodiment of block 410, the RAID data storage engine 304 in the RAID parity data storage device 206d may generate a peer-to-peer command that instructs the RAID primary data storage device 206a to read primary data to the RAID parity data storage device 206d. The RAID data storage engine 304 in the RAID parity data storage device 206d may then perform direct command operations 806 to transmit the peer-to-peer command to the RAID primary data storage device 206a, as illustrated in FIG. 8B. As will be appreciated by one of skill in the art in possession of the present disclosure, the direct command operations 806 may include any of the operations described in U.S. patent application Ser. No. 16/838,224, filed on Apr. 2, 2020, that allow the RAID parity data storage device 206d to transmit the peer-to-peer command directly to the RAID parity data storage device 206a.

Furthermore, at block 410, the RAID data storage engine 304 in the RAID parity data storage device 206d/300 may operate to generate a journal 808 (or journal entry) that logs the generation and transmission of the peer-to-peer command to the RAID primary data storage device 206a discussed above. As discussed above, journal operations such that those performed to log the generation and transmission of the peer-to-peer command to the RAID primary data storage device 206a may be performed to create a record of the data transfer operation being performed such that, in the event of a power loss to the RAID data storage system 200 or other interruption to the data transfer operation, the data transfer operation may be resumed after power is restored and/or the interruption ends. In particular, one of skill in the art in possession of the present disclosure will appreciate that the multiple operations autonomously performed by the RAID parity data storage device 206d are not visible to the RAID storage controller device 204, and thus may be tracked by the RAID parity data storage device 206d using the journal 808 such that those operations may be resumed after power is restored and/or the interruption ends. As such, the journal 808 may identify and be regularly updated with the status of peer-to-peer command transmitted to the RAID data storage device 206a.

Figure 8C:
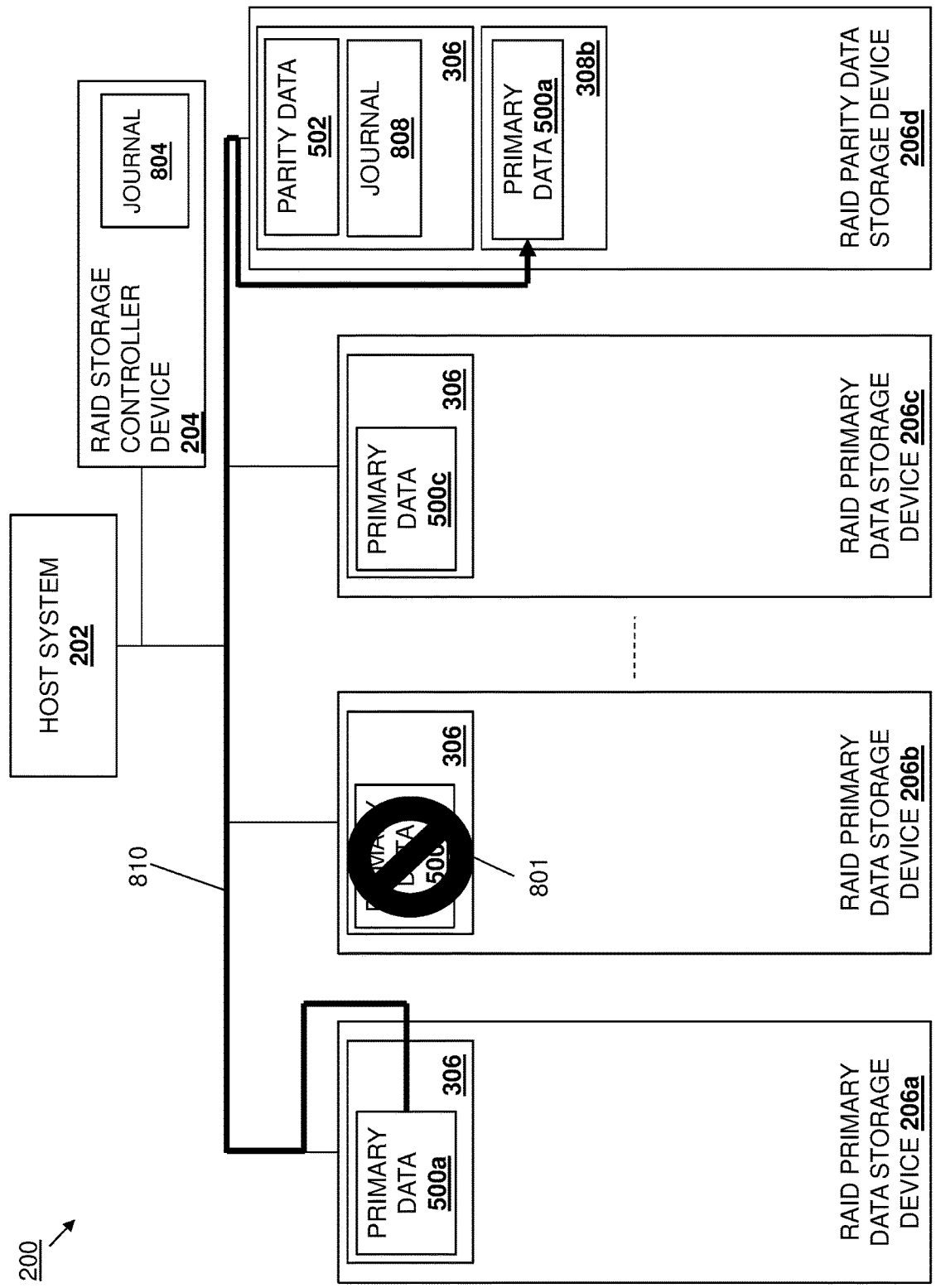
FIG. 8C is a schematic view illustrating an embodiment of the RAID data storage system of FIG. 2 operating during the method of FIG. 4.
Figure 8D:
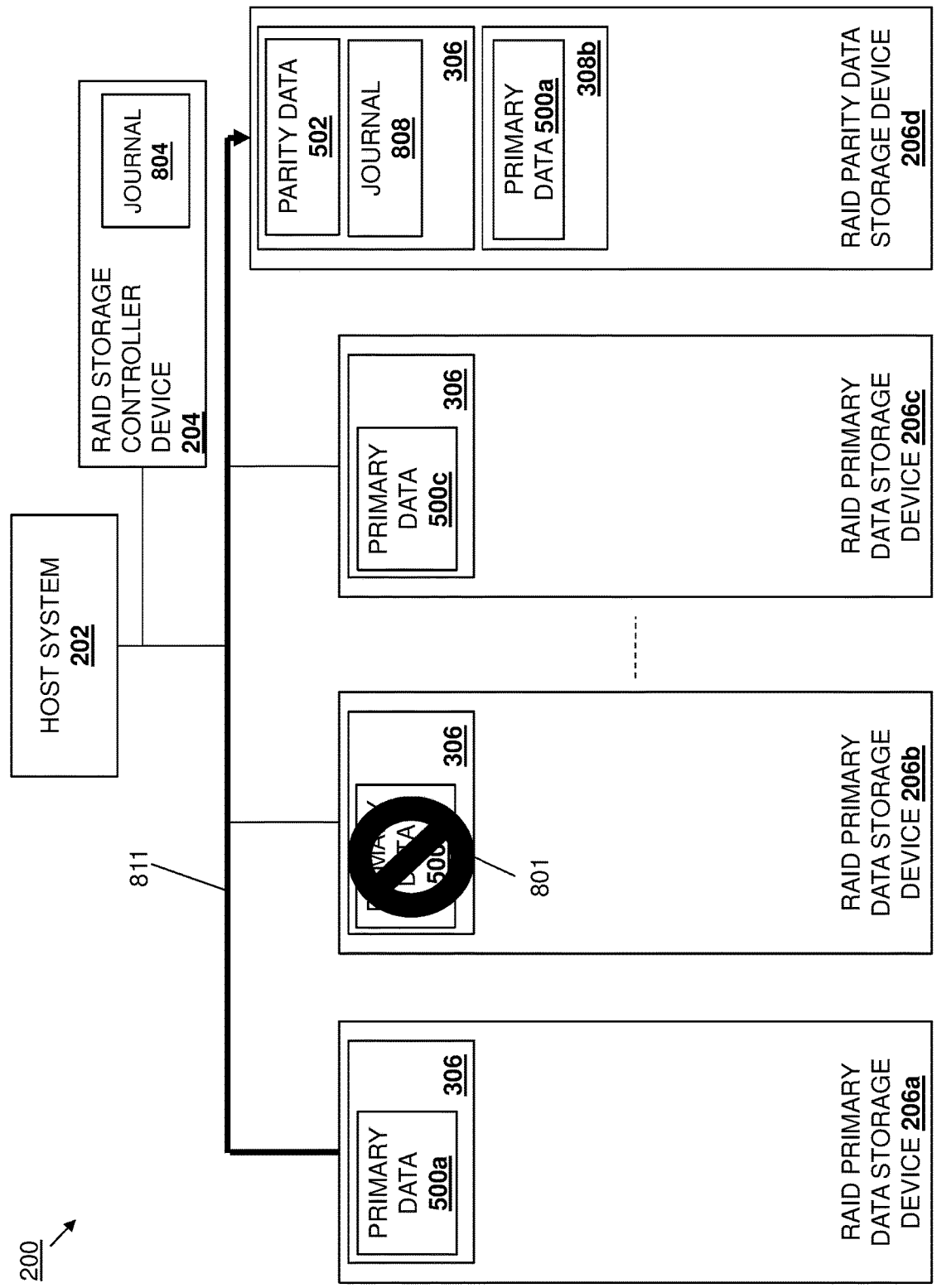
FIG. 8D is a schematic view illustrating an embodiment of the RAID data storage system of FIG. 2 operating during the method of FIG. 4.
Figure 8E:
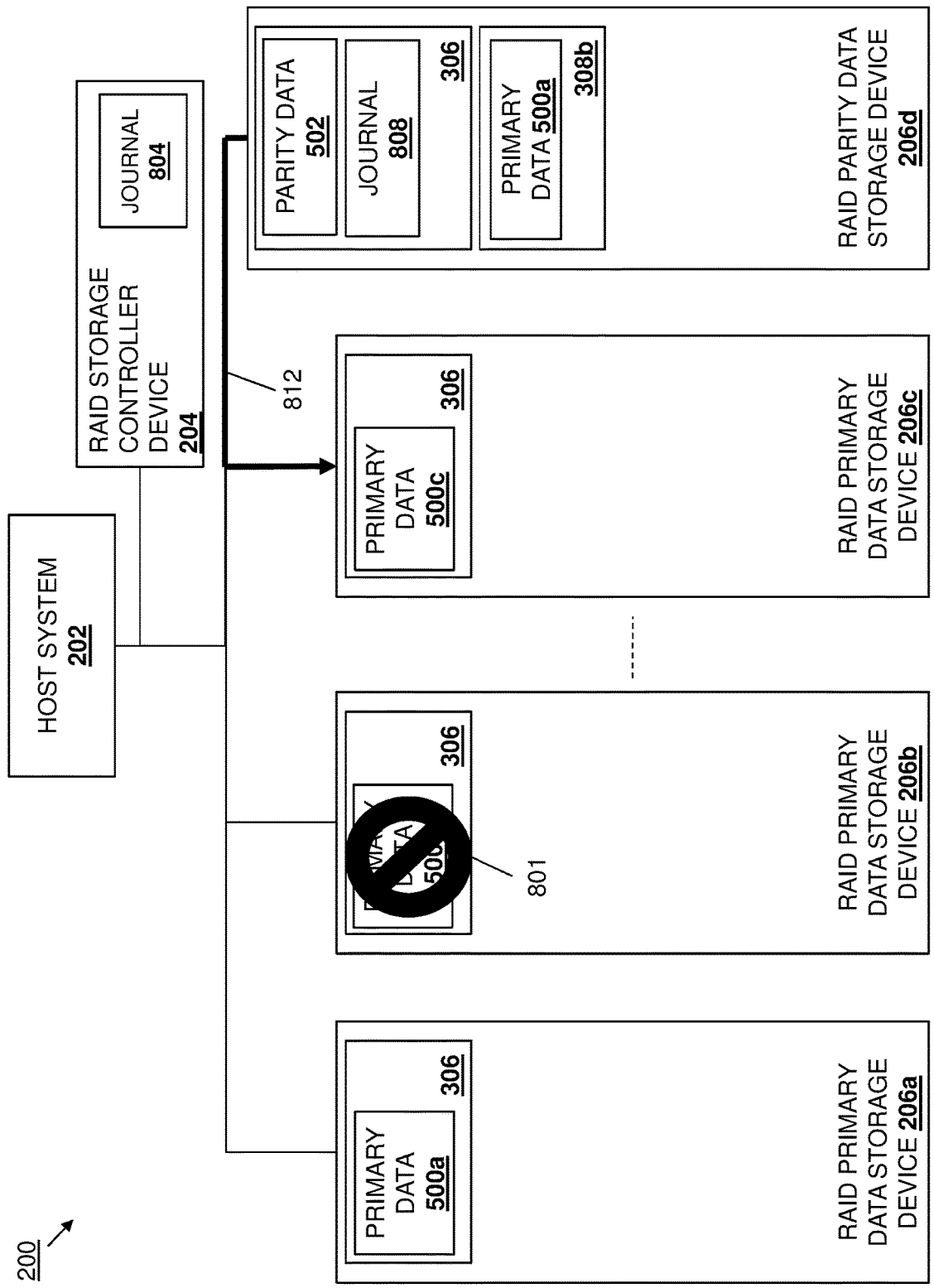
FIG. 8E is a schematic view illustrating an embodiment of the RAID data storage system of FIG. 2 operating during the method of FIG. 4.

Similarly, with reference to FIG. 8E, in an embodiment of block 410, the RAID data storage engine 304 in the RAID parity data storage device 206d may generate a peer-to-peer command that instructs the RAID primary data storage device 206c to read primary data to the RAID parity data storage device 206d. The RAID data storage engine 304 in the RAID parity data storage device 206d may then perform direct command operations 812 to transmit the peer-to-peer command to the RAID primary data storage device 206c, as illustrated in FIG. 8E. As will be appreciated by one of skill in the art in possession of the present disclosure, the direct command operations 812 may include any of the operations described in U.S. patent application Ser. No. 16/838,224, filed on Apr. 2, 2020, that allow the RAID parity data storage device 206d to transmit the peer-to-peer command directly to the RAID primary data storage device 206c.

Similarly as discussed above, at block 410 the RAID data storage engine 304 in the RAID parity data storage device 206d/300 may operate to update the journal 808 (or journal entry) to log the generation and transmission of the peer-to-peer command to the RAID data storage device 206c discussed above. As discussed above, journal operations such as those performed to log the generation and transmission of the peer-to-peer command to the RAID data storage device 206c may be performed to create a record of the data transfer operation being performed such that, in the event of a power loss to the RAID data storage system 200 or other interruption to the data transfer operation, the data transfer operation may be resumed after power is restored and/or the interruption ends. In particular, one of skill in the art in possession of the present disclosure will appreciate that the multiple operations autonomously performed by the RAID parity data storage device 206d are not visible to the RAID storage controller device 204, and thus may be tracked by the RAID parity data storage device 206d using the journal 808 such that those operations may be resumed after power is restored and/or the interruption ends. As such, the journal 808 may identify and be regularly updated with the status of peer-to-peer command transmitted to the RAID data storage device 206c.

The method 800 then proceeds to block 412 where the second RAID data storage devices perform second subsets of operations associated with the multi-step command. With reference to FIG. 8C, in an embodiment of block 412 and following the receiving of the peer-to-peer command by the RAID data storage engine 304 in the RAID primary data storage device 206a/300 via its communication subsystem 310, the RAID data storage engine 304 in the RAID primary data storage device 206a/300 may identify the second subset of operations included in the peer-to-peer command for performance by the RAID primary data storage device 206a.

With reference to FIG. 8C, operation(s) in the second subset of operations included in the peer-to-peer command for performance by the RAID primary data storage device 206a may include the reading of primary data to the RAID parity data storage device 206d. As discussed below, the read command 800 that identifies the primary data 500b that is unavailable requires the rebuilding of that primary data 500b, which further requires an XOR operation on the remaining primary data and parity data in the same stripe as the primary data 500b. As such, at block 412, the RAID data storage engine 304 in the RAID primary data storage device 206a/300 may perform DMA operations 810 that write the primary data 500a from its storage subsystem 306 directly into the second buffer subsystem 308b (e.g., a CMB subsystem) in the RAID parity data storage device 206d, as illustrated in FIG. 8C.

The method 400 may then proceed to decision block 414 where it is determined whether the second subset of operations performed by the RAID primary data storage device 206a have been completed. In response to determining that the second subset of operations performed by the RAID primary data storage device 206a have been completed at decision block 414, the method 400 may proceed to block 416 where the RAID primary data storage device 206a transmits a completion communication to the RAID parity data storage device 206d. As illustrated in FIG. 8D, following the reading of the primary data 500a to the second buffer subsystem 308b in the RAID parity data storage device 206d, the RAID data storage engine 304 in the RAID primary data storage device 206a may then perform direct completion communication operations 811 to transmit a completion communication to the RAID parity data storage device 206d. As will be appreciated by one of skill in the art in possession of the present disclosure, the direct completion communication operations 811 may include any of the operations described in U.S. patent application Ser. No. 16/838,224, filed on Apr. 2, 2020, that allow the RAID primary data storage device 206a to transmit the completion communication directly to the RAID parity data storage device 206d. In an embodiment, in response to receiving the completion communication from the RAID primary data storage device 206a, the RAID data storage engine 304 in the RAID parity data storage device 206d/300 may remove journal entries corresponding to the peer-to-peer command sent to the RAID primary data storage device 206a.

Figure 8F:
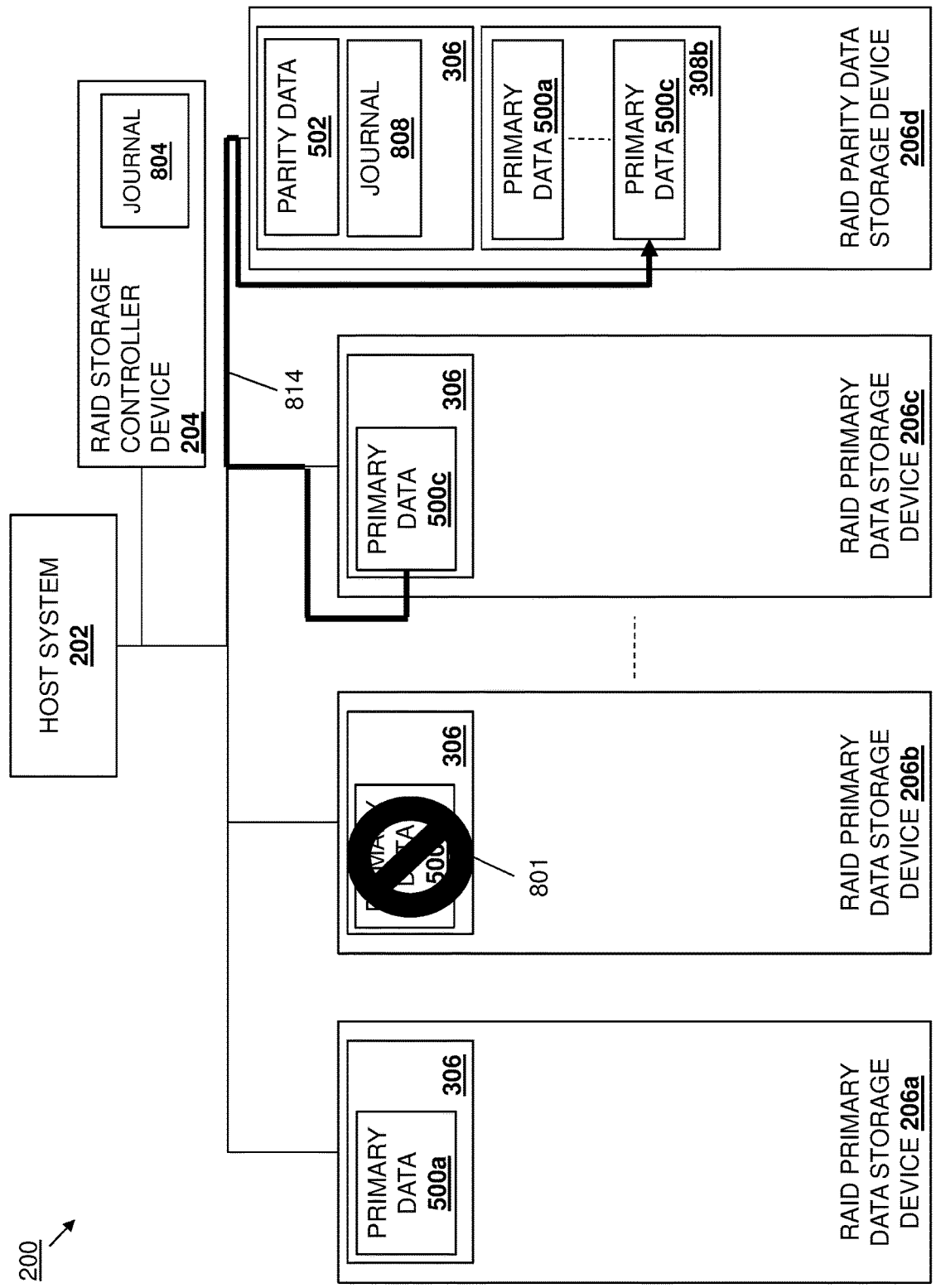
FIG. 8F is a schematic view illustrating an embodiment of the RAID data storage system of FIG. 2 operating during the method of FIG. 4.

With reference to FIG. 8F, operation(s) in the second subset of operations included in the peer-to-peer command for performance by the RAID primary data storage device 206c may include the reading of primary data to the RAID parity data storage device 206d. As discussed below, the read command 800 that identifies the primary data 500b that is unavailable requires the rebuilding of that primary data 500b, which further requires an XOR operation on the remaining primary data and parity data in the same stripe as the primary data 500b. As such, at block 412, the RAID data storage engine 304 in the RAID primary data storage device 206c/300 may perform DMA operations 814 that write the primary data 500c from its storage subsystem 306 directly into the second buffer subsystem 308b (e.g., a CMB subsystem) in the RAID parity data storage device 206d, as illustrated in FIG. 8F.

Figure 8G:
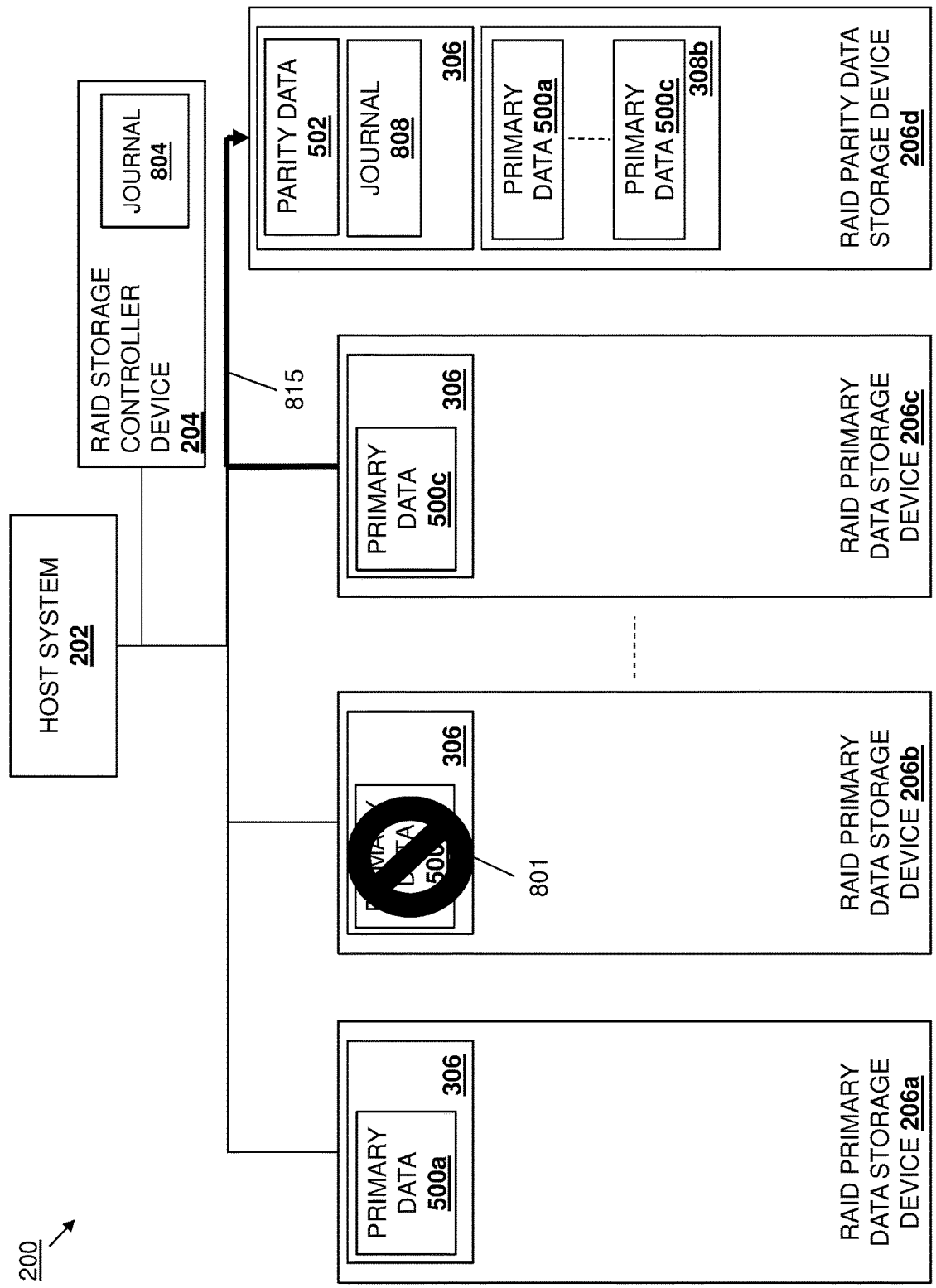
FIG. 8G is a schematic view illustrating an embodiment of the RAID data storage system of FIG. 2 operating during the method of FIG. 4.

The method 400 may then proceed to decision block 414 where it is determined whether the second subset of operations performed by the RAID primary data storage device 206c have been completed. In response to determining that the second subset of operations performed by the RAID primary data storage device 206c have been completed at decision block 414, the method 400 may proceed to block 416 where the RAID primary data storage device 206c transmits a completion communication to the RAID parity data storage device 206d. As illustrated in FIG. 8G, following the reading of the primary data 500c to the second buffer subsystem 308b in the RAID parity data storage device 206d, the RAID data storage engine 304 in the RAID primary data storage device 206c may then perform direct completion communication operations 815 to transmit a completion communication to the RAID parity data storage device 206d, as illustrated in FIG. 8G. As will be appreciated by one of skill in the art in possession of the present disclosure, the direct completion communication operations 815 may include any of the operations described in U.S. patent application Ser. No. 16/838,224, filed on Apr. 2, 2020, that allow the RAID primary data storage device 206c to transmit the completion communication directly to the RAID parity data storage device 206d. In an embodiment, in response to receiving the completion communication from the RAID primary data storage device 206c, the RAID data storage engine 304 in the RAID parity data storage device 206d/300 may remove journal entries corresponding to the peer-to-peer command sent to the RAID primary data storage device 206c.

As discussed above, in this "degraded read" embodiment of the method 400, the second subset of operations are completed by the RAID primary data storage devices 206a and 206c and completion communications are received by the RAID parity data storage device 206d prior to the performance of the first subset of operations by the RAID parity data storage device 206d. As such, the RAID data storage engine 304 in the RAID parity data storage device 206d may monitor for the completion communications from the RAID primary data storage devices 206a and 206c before beginning the performance of the first subset of operations associated with the multi-step command 802 at block 406.

Figure 8H:
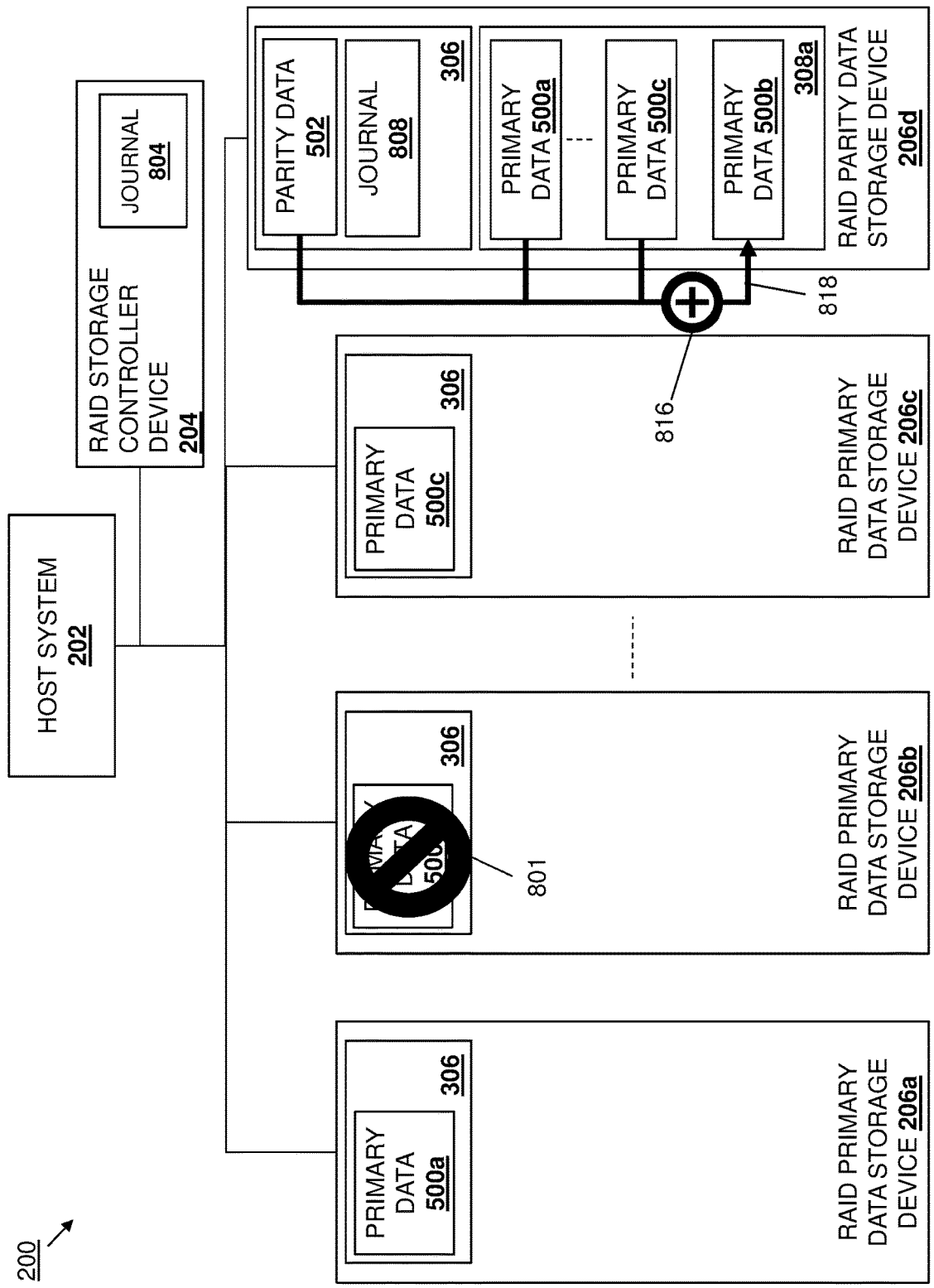
FIG. 8H is a schematic view illustrating an embodiment of the RAID data storage system of FIG. 2 operating during the method of FIG. 4.

When the first RAID data storage device receives the completion communications from the second RAID data storage devices (i.e., the RAID data storage engine 304 in the RAID parity data storage device 206d receives the completion communications from the RAID primary data storage devices 206a and 206c as discussed above), the first RAID data storage device may perform a first subset of operations associated with the multi-step command. As discussed above, following the receiving of the "degraded read" multi-step command 802, the RAID data storage engine 304 in the RAID parity data storage device 206d/300 may have identified the steps in the "degraded read" multi-step command 802 and determined a first subset of operations in those steps that must be performed by the RAID parity data storage device 206d. With reference to FIG. 8H, first operation(s) in the first subset of operations included in the "degraded read" multi-step command 802 for performance by the RAID parity data storage device 206d may include the rebuilding of the primary data that is currently unavailable using the primary data received from each of the available RAID primary data storage devices, along with the parity data stored in the RAID parity data storage device 206d.

As such, at block 406, the RAID data storage engine 304 in the RAID parity data storage device 206d/300 may perform an XOR operation 816 on the parity data 502 that is stored in its storage subsystem 306, along with the primary data 500a and 500c stored in its second buffer subsystem 308b, in order to produce the "rebuilt" primary data 500b, and may perform a write operation 818 to write the "rebuilt" primary data 500b to its second buffer subsystem 308b (e.g., a CMB subsystem), as illustrated in FIG. 8H. Similarly as discussed above, at block 406, the RAID data storage engine 304 in the RAID parity data storage device 206d/300 may operate to update the journal 808 (or journal entry) to log the progress of any of the first operations(s) discussed above and, as such, the journal 808 may identify and regularly update the status of any of those first operation(s), including the removal of any of the entries for the first operation(s) from the journal 808 once they have been completed.

Figure 8I:
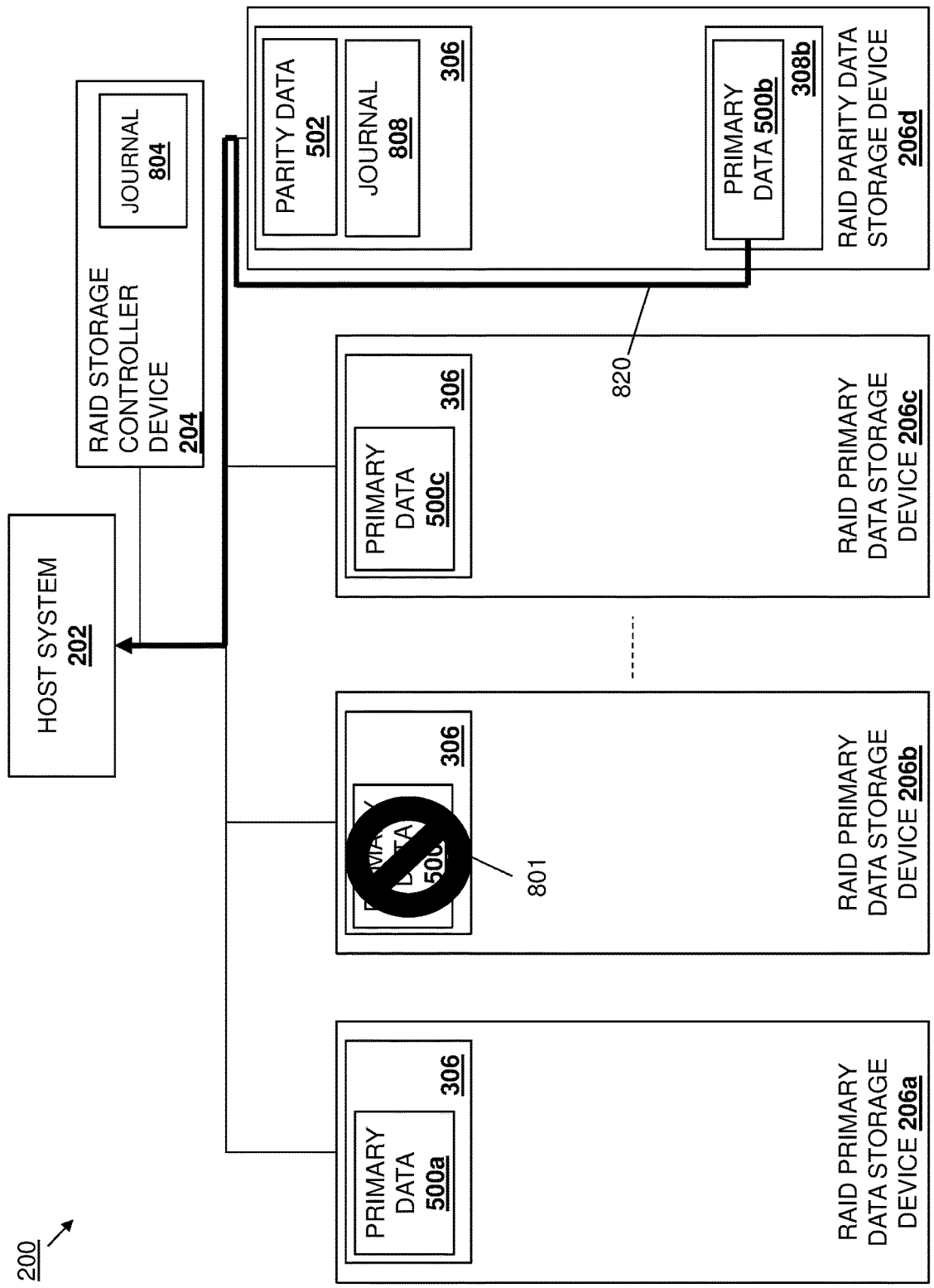
FIG. 8I is a schematic view illustrating an embodiment of the RAID data storage system of FIG. 2 operating during the method of FIG. 4.

With reference to FIG. 8I, second operation(s) in the first subset of operations included in the "degraded read" multi-step command 802 for performance by the RAID parity data storage device 206d may include the reading of the "rebuilt" primary data 500b to the host system 202. In an embodiment, at block 406, the RAID data storage engine 304 in the RAID parity data storage device 206d/300 may perform a DMA operation 820 in order to write the "rebuilt" primary data 500b stored on its second buffer subsystem 308b to a memory system included in the host system 202, as illustrated in FIG. 8I. As will be appreciated by one of skill in the art in possession of the present disclosure, following the provisioning of the "rebuilt" primary data 500b to the host system 202, the RAID parity data storage device 206d may discard that "rebuilt" primary data 500b along with the primary data 500a and 500b, as the subsequent availability of the RAID primary data storage device 206b (or the replacement of that RAID primary data storage device 206b) may be followed by the rebuilding of the primary data 500b using the primary data 500a and 500c stored on the RAID primary data storage devices 206a and 206c, and the parity data 502 stored on the RAID parity data storage device 206d.

Following the performance of blocks 416 and 406, or if at decision block 408 it is determined that a command should not be sent to a second RAID data storage device, the method 400 then proceeds to decision block 418 where it is determined whether the first subset of operations have been completed. In an embodiment, at decision block 418, the RAID data storage engine 304 in the RAID parity data storage device 206d/300 may monitor its progress in performing the first subset of operations associated with the multi-step command 802 to determine whether they have been completed. As discussed above, in response to completing any of the first subset of operations associated with the multi-step command 802, the RAID data storage engine 304 in the RAID parity data storage device 206d/300 may remove journal entries corresponding to those first subset of operations from the journal 808. If, at decision block 418, it is determined that all of the first subset of operations have not been completed, the method 400 returns to block 406. As such, the method 400 may loop such that the RAID data storage engine 304 in the RAID parity data storage device 206d/300 performs the first subset of operations associated with the multi-step command 802 until they are completed.

Figure 8J:
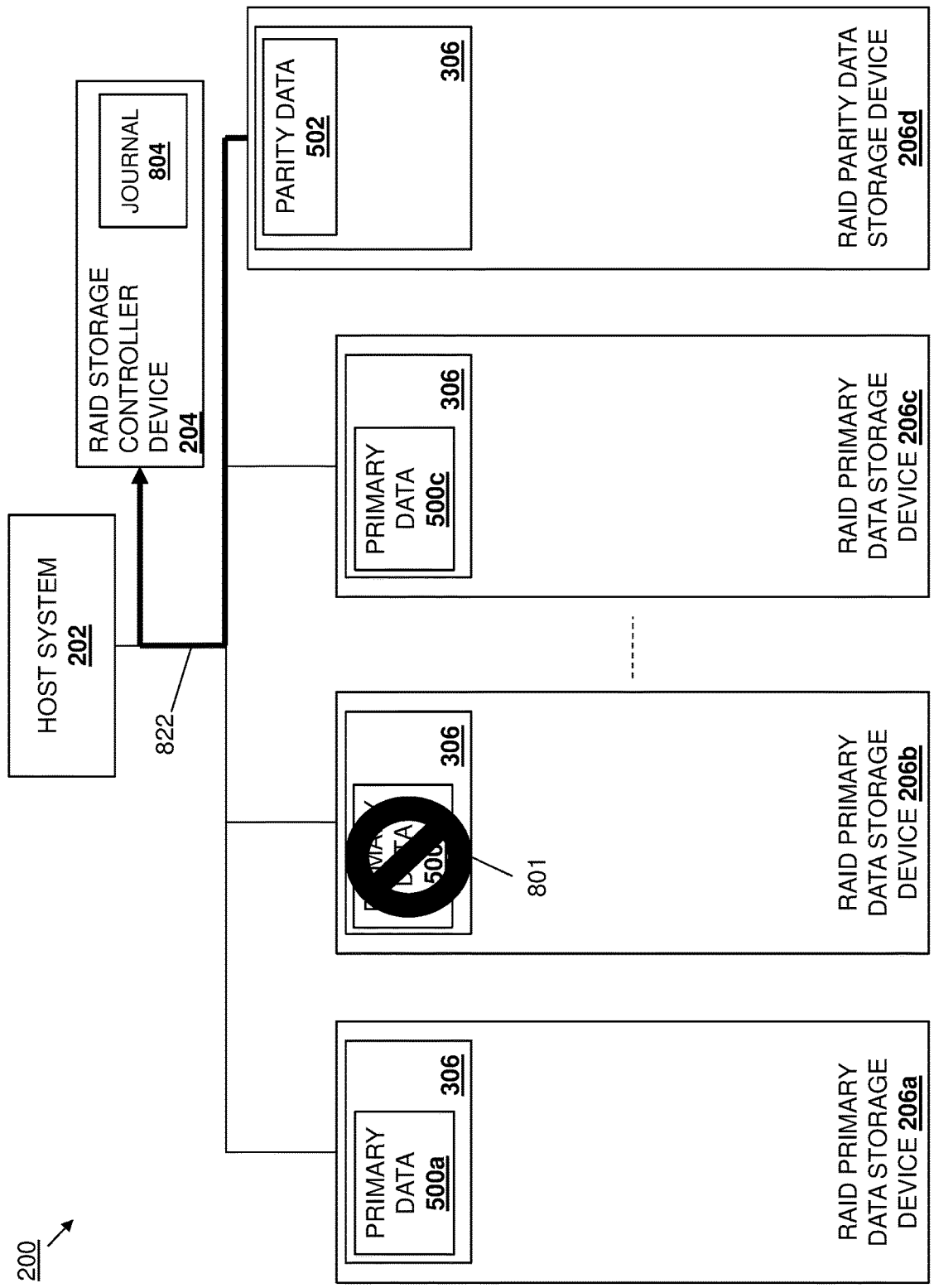
FIG. 8J is a schematic view illustrating an embodiment of the RAID data storage system of FIG. 2 operating during the method of FIG. 4.

If at decision block 418, it is determined that the first subset of operations have been completed, the method 400 proceeds to decision block 419 where it is determined whether a completion communication has been received from the second RAID data storage devices. In this example, the first subset of operations are not performed by the first RAID data storage device at block 406 until the completion communications are received from the second RAID data storage devices, and thus at decision block 419 it will be determined that the completion communications have been received from the second RAID data storage devices. In response to determining that the completion communications have been received from the second RAID data storage devices at decision block 419, the method 400 proceeds to block 420 where the first RAID data storage device transmits a completion communication to the RAID storage controller device. As illustrated in FIG. 8J, the RAID data storage engine 304 in the RAID parity data storage device 206d/300 may generate and transmit a completion communication 822 via its communication system 310 to the RAID storage controller device 204 that indicates that the multi-step command 802 has been completed, and may remove the journal entries/journal 808 associated with the multi-step command 802.

Figure 8K:
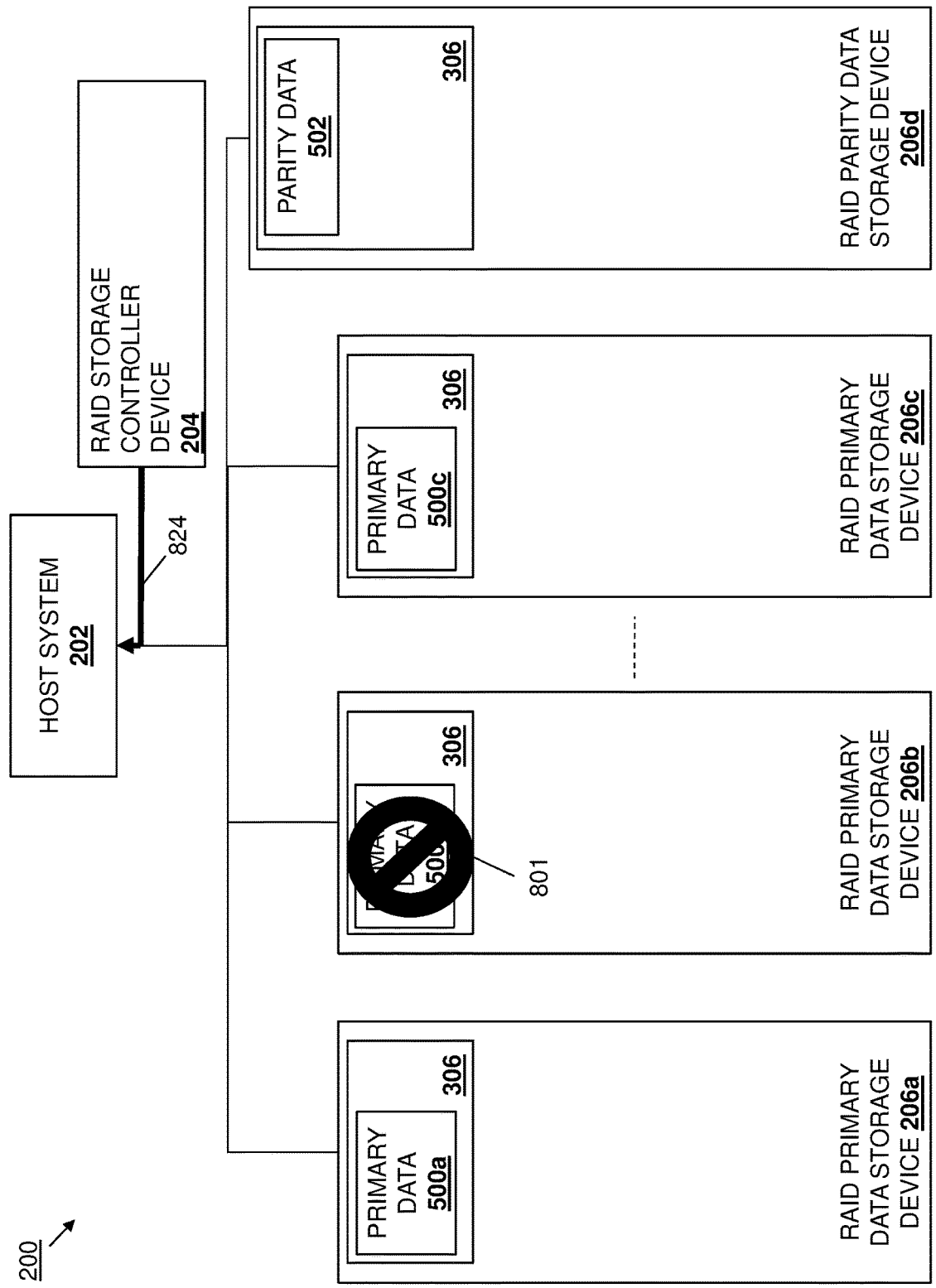
FIG. 8K is a schematic view illustrating an embodiment of the RAID data storage system of FIG. 2 operating during the method of FIG. 4.

Furthermore, as illustrated in FIG. 8K, in response to receiving the completion communication from the RAID parity data storage device 206d, the RAID storage controller engine in the RAID storage controller device 204 may generate and transmit a completion communication 824 to the host system 202 that indicates that the read command 800 has been completed, and may remove the journal entries/journal 804 associated with the read command 800. Thus, systems and methods have been described that provide for autonomous RAID data storage system operations that, in the example above, provide for the autonomous processing of a read command by RAID data storage devices when the data to be read is currently unavailable, thus offloading almost all of the operations conventionally performed by the RAID storage controller device to RAID data storage devices in the RAID data storage system in which that read is being performed.

Moving now to the "degraded write" embodiment discussed above, the method 400 may be performed substantially as discussed above, and the discussion above with regard to FIGS. 5, 6A, 6B, 6C, and 6D, and the method 400, applies similarly to the performance of the "degraded write" embodiment of the method 400. As such, at block 404 in this embodiment of the method 400, the host system 202 may generate a write command 900 that instructs the writing of "updated" primary data stored in the host system 202 to update "current" primary data stored in the RAID primary data storage device 206b in the RAID data storage system 200, and may transmit the write command 900 to the RAID storage controller device 204. In the embodiment illustrated in FIGS. 9A-9J, the RAID primary data storage device 206b is unavailable (as indicated by element 901 in FIG. 9A) due to, for example, failure of the RAID primary data storage device 206b and/or any of a variety of situations that might lead to an unavailable RAID data storage device and that would be apparent to one of skill in the art in possession of the present disclosure.

Figure 9A:
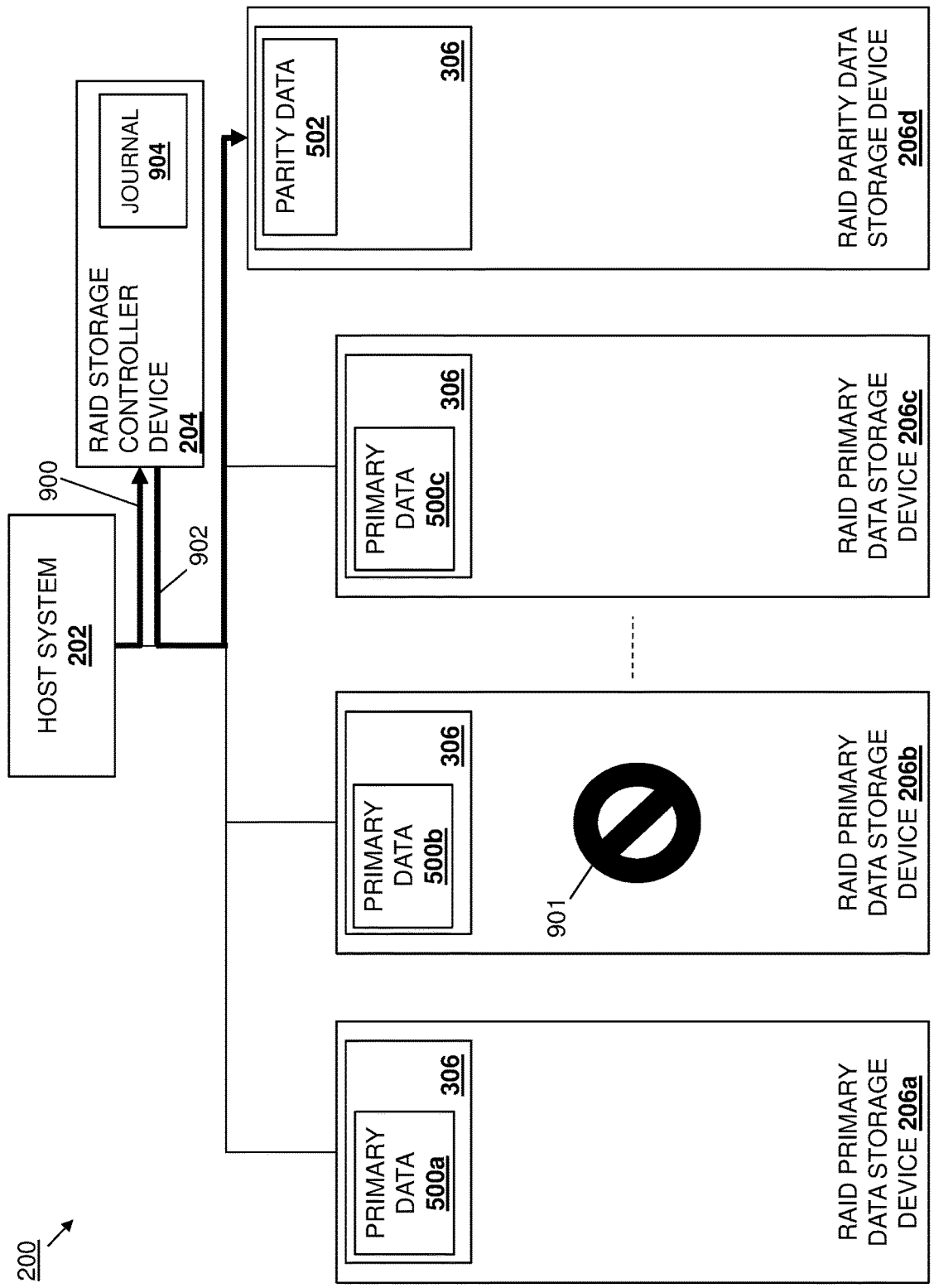
FIG. 9A is a schematic view illustrating an embodiment of the RAID data storage system of FIG. 2 operating during the method of FIG. 4.

As such, the RAID storage controller engine in the RAID storage controller device 204 may receive that write command 900 and, in response, determine that the "updated"

primary data stored on the host system 202 is an update to the "current" primary data 500*b* stored on the unavailable RAID primary data storage device 206*b*. In response, at block 404, the RAID storage controller engine in the RAID storage controller device 204 may then generate a "degraded write" multi-step command 902 for the RAID parity data storage device 206*d*, and transmit that "degraded write" multi-step command 902 command to the RAID parity data storage device 206*d*, as illustrated in FIG. 9A. As will be appreciated by one of skill in the art in possession of the present disclosure, the generation of the "degraded write" multi-step command 902 may include the performance of any of the pre-command operations described in U.S. patent application Ser. No. 16/832,348, filed on Mar. 27, 2020, and the "degraded read" multi-step command 902 may include any information needed for the RAID primary data storage devices 206*a* and 206*c* and the RAID parity data storage device 206*d* to perform the functionality described below.

In addition, at block 404, the RAID storage controller engine in the RAID storage controller device 204 may operate to generate a journal 904 (or journal entry) that logs the generation and transmission of the "degraded write" multi-step command 902. As will be appreciated by one of skill in the art in possession of the present disclosure, journal operations such as those performed to log the generation and transmission of the "degraded write" multi-step command 902 in the journal 904 may be performed to create a record of the data transfer operation being performed such that, in the event of a power loss to the RAID data storage system 200 or other interruption to the data transfer operation, the data transfer operation may be resumed after power is restored and/or the interruption ends. As such, the journal 904 may identify that the write command 900 was received, that the "degraded write" multi-step command 902 was generated and transmitted to the RAID parity data storage device 206*d*, that no completion message has yet been received from the RAID parity data storage device 206*d*, and/or any other journal information that would be apparent to one of skill in the art in possession of the present disclosure.

The method 400 then proceeds to block 406 where the first RAID data storage device performs a first subset of operations associated with the multi-step command. In an embodiment, at block 406 and following the receiving of the "degraded write" multi-step command 902 by the RAID data storage engine 304 in the RAID parity data storage device 206*d*/300 via its communication subsystem 310, the RAID data storage engine 304 in the RAID parity data storage device 206*d*/300 may identify the steps in the "degraded write" multi-step command 902 and determine a first subset of operations in those steps that must be performed by the RAID parity data storage device 206*d*, and that second subsets of operations in those steps that must be performed by the RAID primary data storage devices 206*a* and 206*c*. However, while the example of the "degraded write" multi-step command 902 discussed below only involves operations by the RAID primary data storage devices 206*a* and 206*c* and the RAID parity data storage device 206*d*, one of skill in the art in possession of the present disclosure will appreciate that multi-step commands may involve the performance of operations by any number of the RAID data storage devices while remaining within the scope of the present disclosure as well.

Figure 9B:
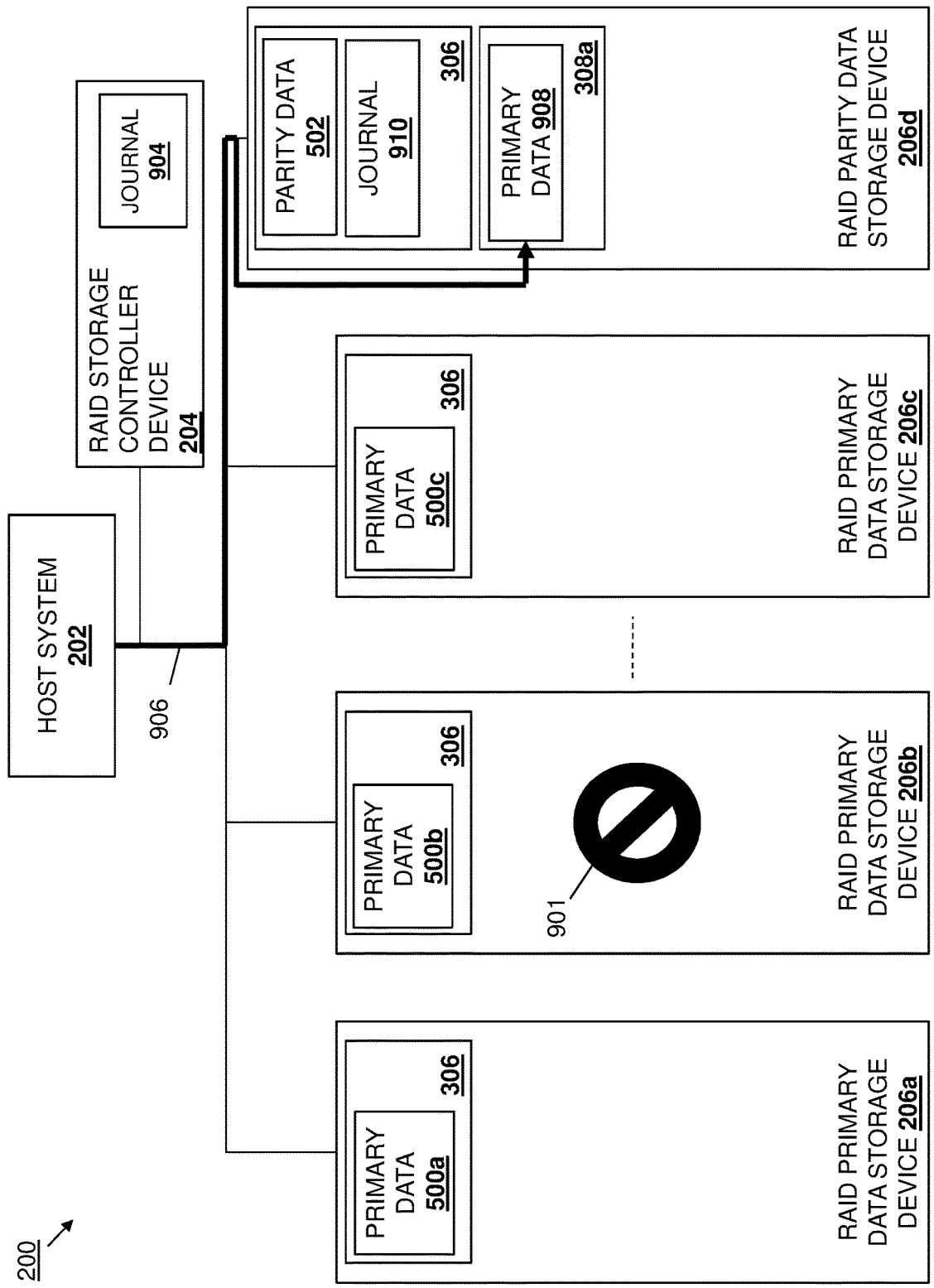
FIG. 9B is a schematic view illustrating an embodiment of the RAID data storage system of FIG. 2 operating during the method of FIG. 4.

With reference to FIG. 9B, first operation(s) in the first subset of operations included in the "degraded write" multi-step command 902 for performance by the RAID parity data storage device 206*d* may include the retrieval of "updated" primary data from the host system 202. As will be appreciated by one of skill in the art in possession of the present disclosure and as discussed above, the write command 900 generated by the host system 202 may identify "updated" primary data that is stored on the host system 202 and that should "update" or replace the "current" primary data 500*b* stored in the storage subsystem 306 of the unavailable RAID primary data storage device 206*b*. As such, at block 406, the RAID data storage engine 304 in the RAID parity data storage device 206*d*/300 may perform DMA operations 906 that access a memory system that is included in the host system 202 and that stores the "updated" primary data 908, read that "updated" primary data 908 from the host system 202, and then write that "updated" primary data 908 to its first buffer subsystem 308*a* (e.g., a device buffer) in the RAID parity data storage device 206*d*, as illustrated in FIG. 9B.

Furthermore, at block 406, the RAID data storage engine 304 in the RAID parity data storage device 206*d*/300 may operate to generate a journal 910 (or journal entry) that logs the progress of any of the first operations(s) discussed above. As discussed above, journal operations such as those performed to log the progress of any of the first operations(s) discussed above may be performed to create a record of the data transfer operation being performed such that, in the event of a power loss to the RAID data storage system 200 or other interruption to the data transfer operation, the data transfer operation may be resumed after power is restored and/or the interruption ends. In particular, one of skill in the art in possession of the present disclosure will appreciate that the multiple operations autonomously performed by the RAID parity data storage device 206*d* are not visible to the RAID storage controller device 204, and thus may be tracked by the RAID parity data storage device 206*d* using the journal 910 such that those operations may be resumed after power is restored and/or the interruption ends. As such, the journal 910 may identify and regularly update the status of any of the first operation(s) performed by the RAID parity data storage device 206*d*, and the RAID parity data storage device 206*d* may remove any of the entries for those first operation(s) from the journal 710 once they have been completed.

The method 400 may then proceeds to decision block 408 where it is determined whether commands should be sent to the RAID primary data storage devices 206*a* and 206*c* based on the multi-step command 902. In response to determining that commands should be sent to the RAID primary data storage devices 206*a* and 206*c* at decision block 408, the method 400 then proceeds to block 410 where the first RAID data storage device performs direct command operations with second RAID data storage device(s). As will be appreciated by one of skill in the art in possession of the present disclosure, at least some portion of the first subset of operations and the second subset of operations may be performed at the same time during the "degraded write" embodiment of the method 400. Thus, in this example of block 406 and following the receiving of the "degraded write" multi-step command 902, the RAID data storage engine 304 in the RAID parity data storage device 206*d*/300 may identify the steps in the "degraded write" multi-step command 902 and determine the second subsets of operations in those steps that must be performed by the RAID primary data storage devices 206*a* and 206*c*. In the example below, the second subsets of operations include the provisioning of primary data by the RAID primary data storage devices 206*a* and 206*c* to the RAID parity data storage device 206*d*, but one of skill in the art in possession of the present disclosure will appreciate that subsets of operations performed by other RAID data storage devices may include a variety of operations that will fall within the scope of the present disclosure as well.

Figure 9C:
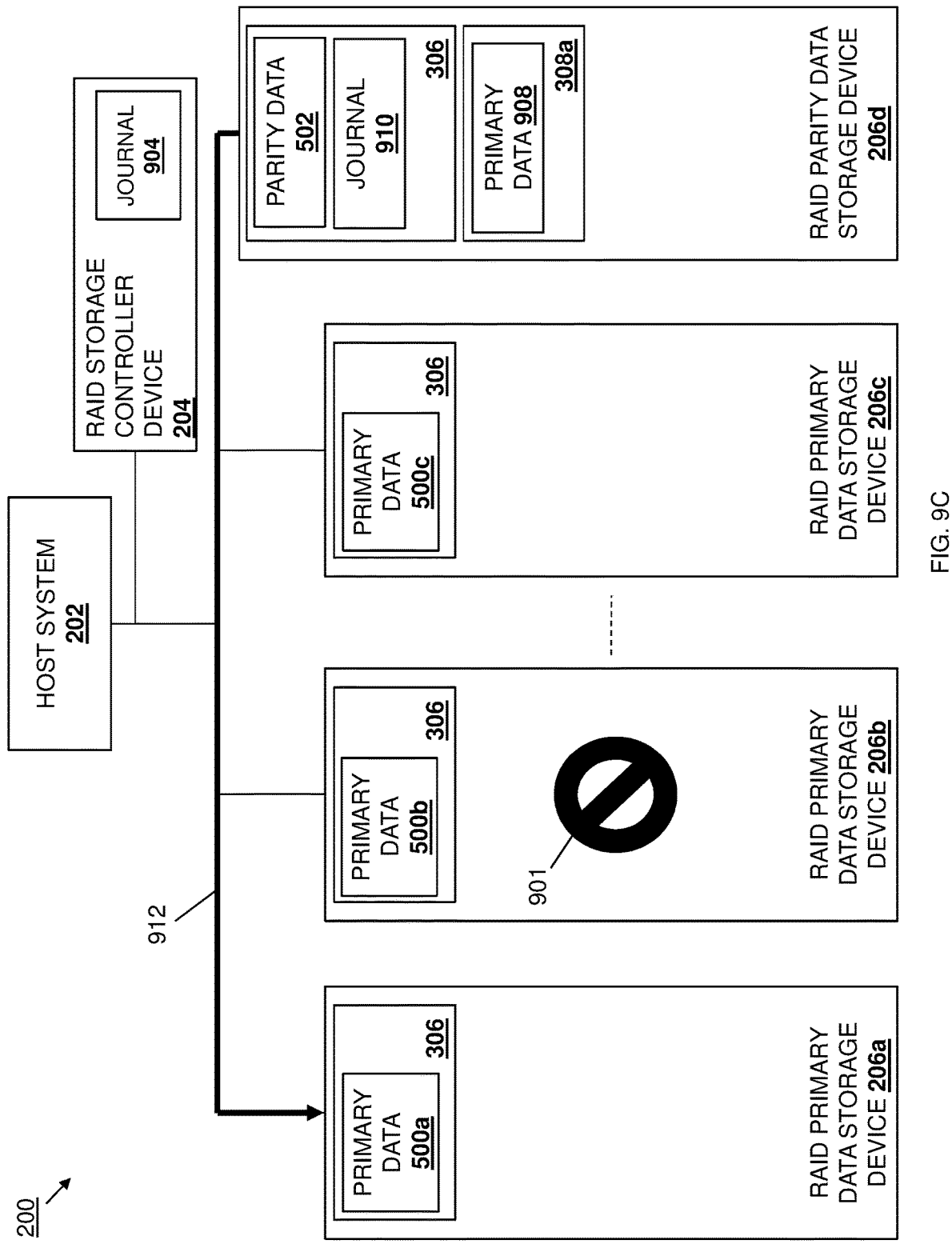
FIG. 9C is a schematic view illustrating an embodiment of the RAID data storage system of FIG. 2 operating during the method of FIG. 4.

With reference to FIG. 9C, in an embodiment of block 410, the RAID data storage engine 304 in the RAID parity data storage device 206d may generate a peer-to-peer command that instructs the RAID primary data storage device 206a to provide its primary data 500a to the RAID parity data storage device 206d. As will be appreciated by one of skill in the art in possession of the present disclosure, the generation of the peer-to-peer command may include the performance of any of the pre-command operations described in U.S. patent application Ser. No. 16/832,348, filed on Mar. 27, 2020, and that peer-to-peer command may include any information needed for the RAID primary data storage device 206a to perform the functionality described below. The RAID data storage engine 304 in the RAID parity data storage device 206d may then perform direct command operations 912 to transmit the peer-to-peer command to the RAID primary data storage device 206a, as illustrated in FIG. 9C. As will be appreciated by one of skill in the art in possession of the present disclosure, the direct command operations 912 may include any of the operations described in U.S. patent application Ser. No. 16/838,224, filed on Apr. 2, 2020, that allow the RAID parity data storage device 206d to transmit the peer-to-peer command directly to the RAID primary data storage device 206a.

Similarly as discussed above, at block 410, the RAID data storage engine 304 in the RAID parity data storage device 206d/300 may operate to update the journal 910 (or journal entry) to log the generation and transmission of the peer-to-peer command to the RAID data storage device 206a discussed above. As discussed above, journal operations such as those performed to log the generation and transmission of the peer-to-peer command to the RAID data storage device 206a may be performed to create a record of the data transfer operation being performed such that, in the event of a power loss to the RAID data storage system 200 or other interruption to the data transfer operation, the data transfer operation may be resumed after power is restored and/or the interruption ends. In particular, one of skill in the art in possession of the present disclosure will appreciate that the multiple operations autonomously performed by the RAID parity data storage device 206d are not visible to the RAID storage controller device 204, and thus may be tracked by the RAID parity data storage device 206d using the journal 910 such that those operations may be resumed after power is restored and/or the interruption ends. As such, the journal 910 may identify and be regularly updated with the status of peer-to-peer command transmitted to the RAID data storage device 206a.

Figure 9D:
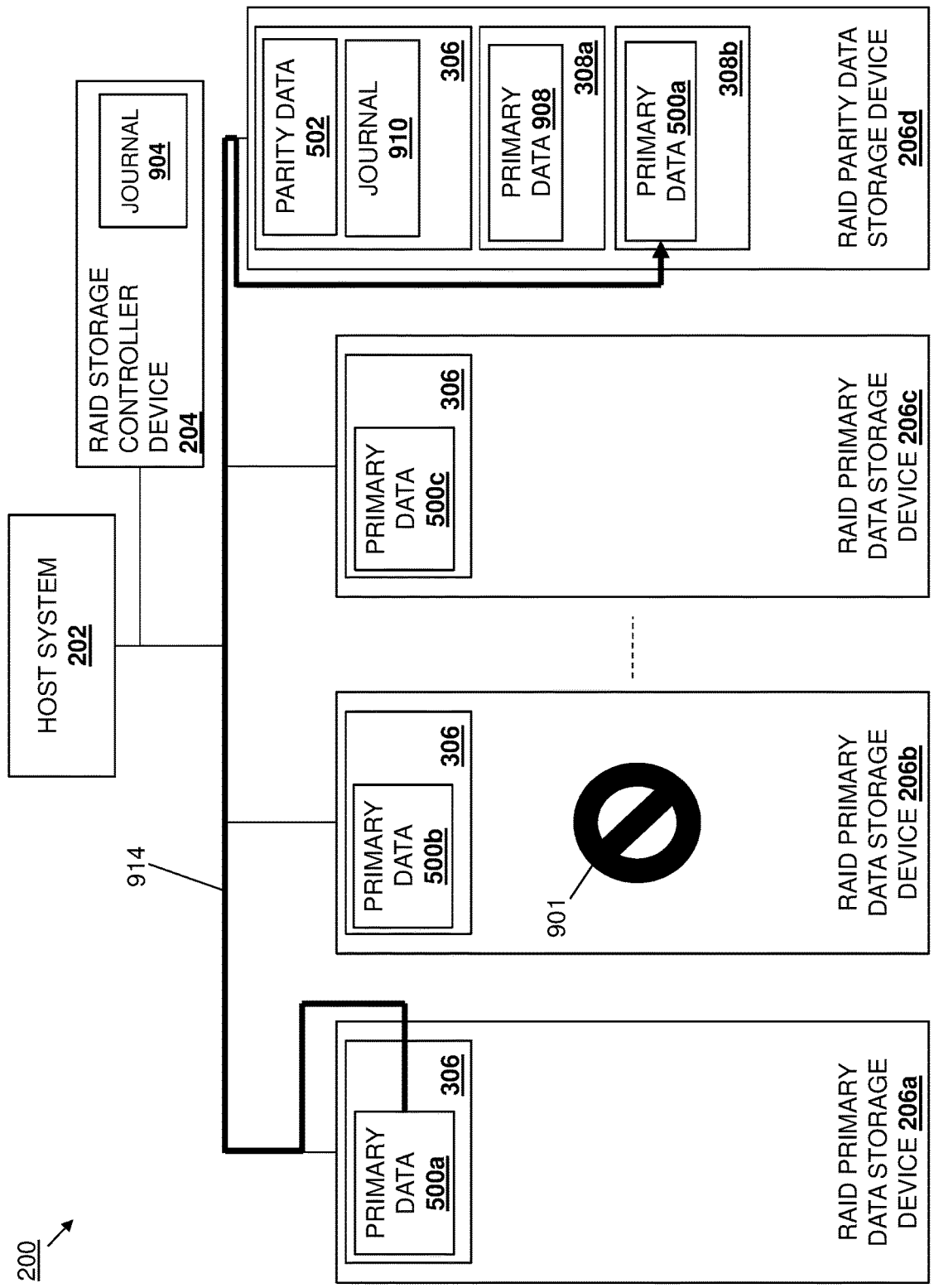
FIG. 9D is a schematic view illustrating an embodiment of the RAID data storage system of FIG. 2 operating during the method of FIG. 4.
Figure 9E:
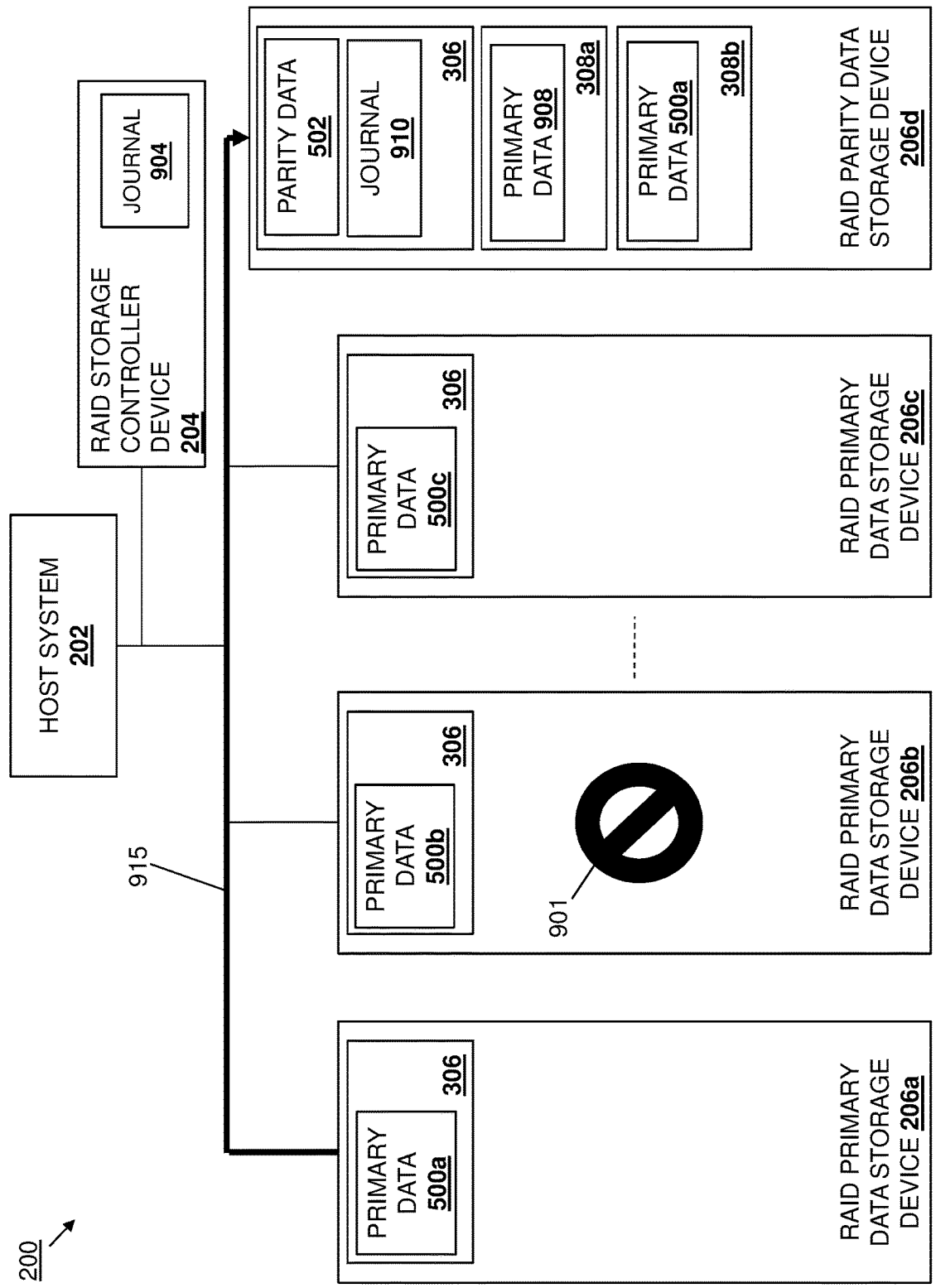
FIG. 9E is a schematic view illustrating an embodiment of the RAID data storage system of FIG. 2 operating during the method of FIG. 4.
Figure 9F:
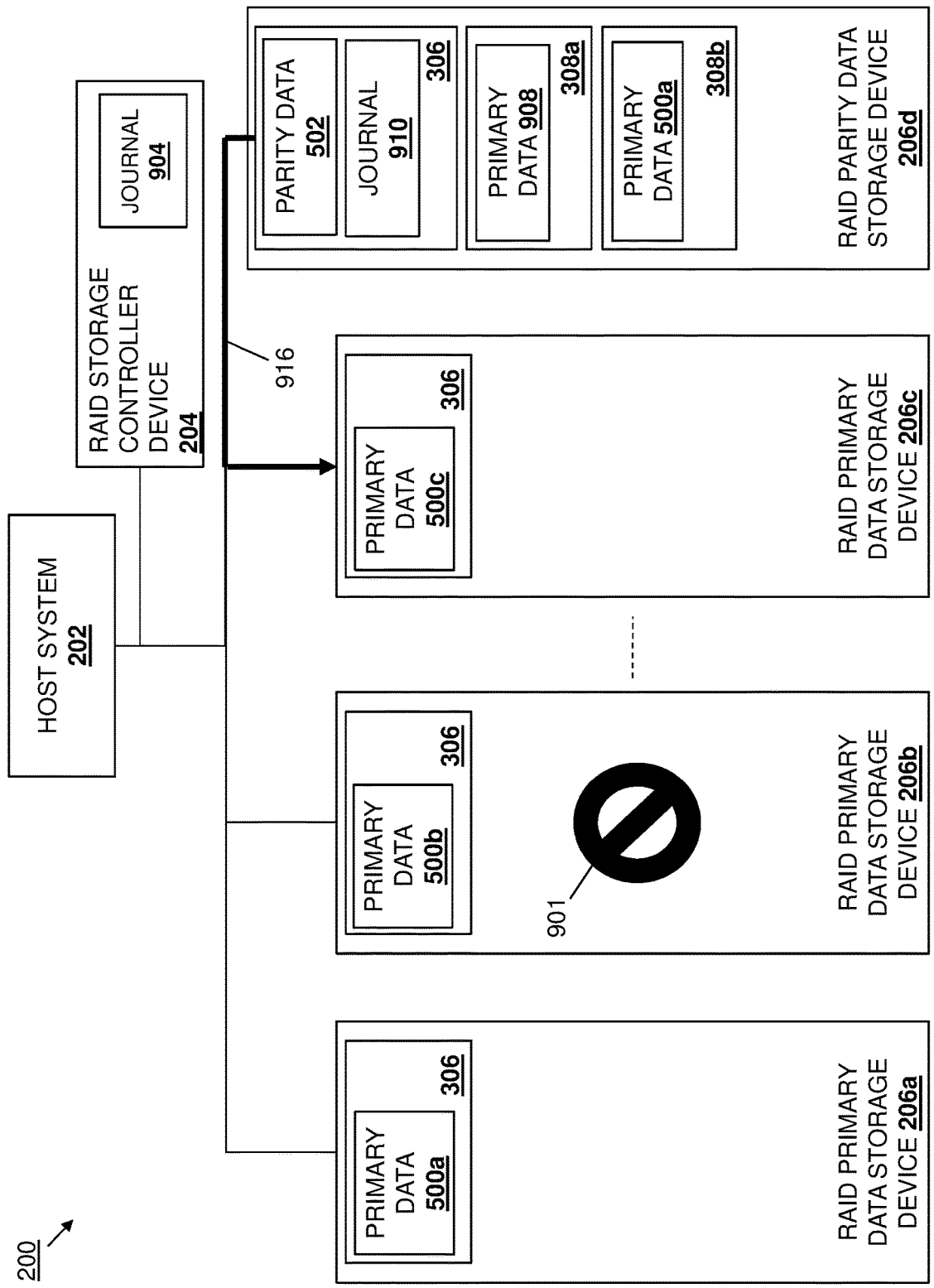
FIG. 9F is a schematic view illustrating an embodiment of the RAID data storage system of FIG. 2 operating during the method of FIG. 4.

With reference to FIG. 9F, in an embodiment of block 410, the RAID data storage engine 304 in the RAID parity data storage device 206d may generate a peer-to-peer command that instructs the RAID primary data storage device 206c to provide its primary data 500c to the RAID parity data storage device 206d. As will be appreciated by one of skill in the art in possession of the present disclosure, the generation of the peer-to-peer command may include the performance of any of the pre-command operations described in U.S. patent application Ser. No. 16/832,348, filed on Mar. 27, 2020, and the peer-to-peer command may include any information needed for the RAID primary data storage device 206c to perform the functionality described below. The RAID data storage engine 304 in the RAID parity data storage device 206d may then perform direct command operations 916 to transmit the peer-to-peer command to the RAID primary data storage device 206c, as illustrated in FIG. 9F. As will be appreciated by one of skill in the art in possession of the present disclosure, the direct command operations 916 may include any of the operations described in U.S. patent application Ser. No. 16/838,224, filed on Apr. 2, 2020, that allow the RAID parity data storage device 206d to transmit the peer-to-peer command directly to the RAID primary data storage device 206c.

Similarly as discussed above, at block 410, the RAID data storage engine 304 in the RAID parity data storage device 206d/300 may operate to update the journal 910 (or journal entry) to log the generation and transmission of the peer-to-peer command to the RAID data storage device 206c discussed above. As discussed above, journal operations such as those performed to log the generation and transmission of the peer-to-peer command to the RAID data storage device 206c may be performed to create a record of the data transfer operation being performed such that, in the event of a power loss to the RAID data storage system 200 or other interruption to the data transfer operation, the data transfer operation may be resumed after power is restored and/or the interruption ends. In particular, one of skill in the art in possession of the present disclosure will appreciate that the multiple operations autonomously performed by the RAID parity data storage device 206d are not visible to the RAID storage controller device 204, and thus may be tracked by the RAID parity data storage device 206d using the journal 910 such that those operations may be resumed after power is restored and/or the interruption ends. As such, the journal 910 may identify and be regularly updated with the status of peer-to-peer command transmitted to the RAID data storage device 206c.

The method 400 then proceeds to block 412 where the second RAID data storage devices perform a second subset of operations associated with the multi-step command. In an embodiment, at block 412 and following the receiving of the peer-to-peer command by the RAID data storage engine 304 in the RAID primary data storage device 206a/300 via its communication subsystem 310, the RAID data storage engine 304 in the RAID primary data storage device 206a/300 may identify the second subset of operations included in the peer-to-peer command for performance by the RAID primary data storage device 206a. With reference to FIG. 9D, the second subset of operations included in the peer-to-peer command for performance by the RAID primary data storage device 206a may include the transmission of the primary data 500a to the RAID parity data storage device 206d. As discussed above, the "degraded write" operation performed in response to the write command 900 to write data to update primary data on an unavailable RAID primary data storage device requires the updating of parity data in the same stripe as that primary data, which further requires the transmission of primary data that is stored on the available RAID primary data storage devices (and that is in that same stripe) to the RAID parity data storage device. As such, at block 412, the RAID data storage engine 304 in the RAID primary data storage device 206a/300 may perform DMA operations 914 that read the primary data 500a in its storage system 306 to the second buffer subsystem 308b in the RAID parity data storage device 206d, as illustrated in FIG. 9D.

The method 400 may then proceed to decision block 414 where it is determined whether the second subset of operations performed by the RAID primary data storage device 206a are completed. In response to determining that the second subset of operations performed by the RAID primary data storage device 206a have been completed, the method 400 may proceed to block 416 where the performed by the RAID primary data storage device 206a transmits a completion communication to the RAID parity data storage device 206d. As illustrated in FIG. 9E, following the reading of the primary data 500a to the second buffer subsystem 308b in the RAID parity data storage device 206d, the RAID data storage engine 304 in the RAID primary data storage device 206a may then perform direct completion communication operations 915 to transmit a completion communication to the RAID parity data storage device 206d. As will be appreciated by one of skill in the art in possession of the present disclosure, the direct completion communication operations 915 may include any of the operations described in U.S. patent application Ser. No. 16/838,224, filed on Apr. 2, 2020, that allow the RAID primary data storage device 206a to transmit the completion communication directly to the RAID parity data storage device 206d. In an embodiment, in response to receiving the completion communication from the RAID primary data storage device 206a, the RAID data storage engine 304 in the RAID parity data storage device 206d/300 may remove journal entries corresponding to the peer-to-peer command sent to the RAID primary data storage device 206a at block 408.

Figure 9G:
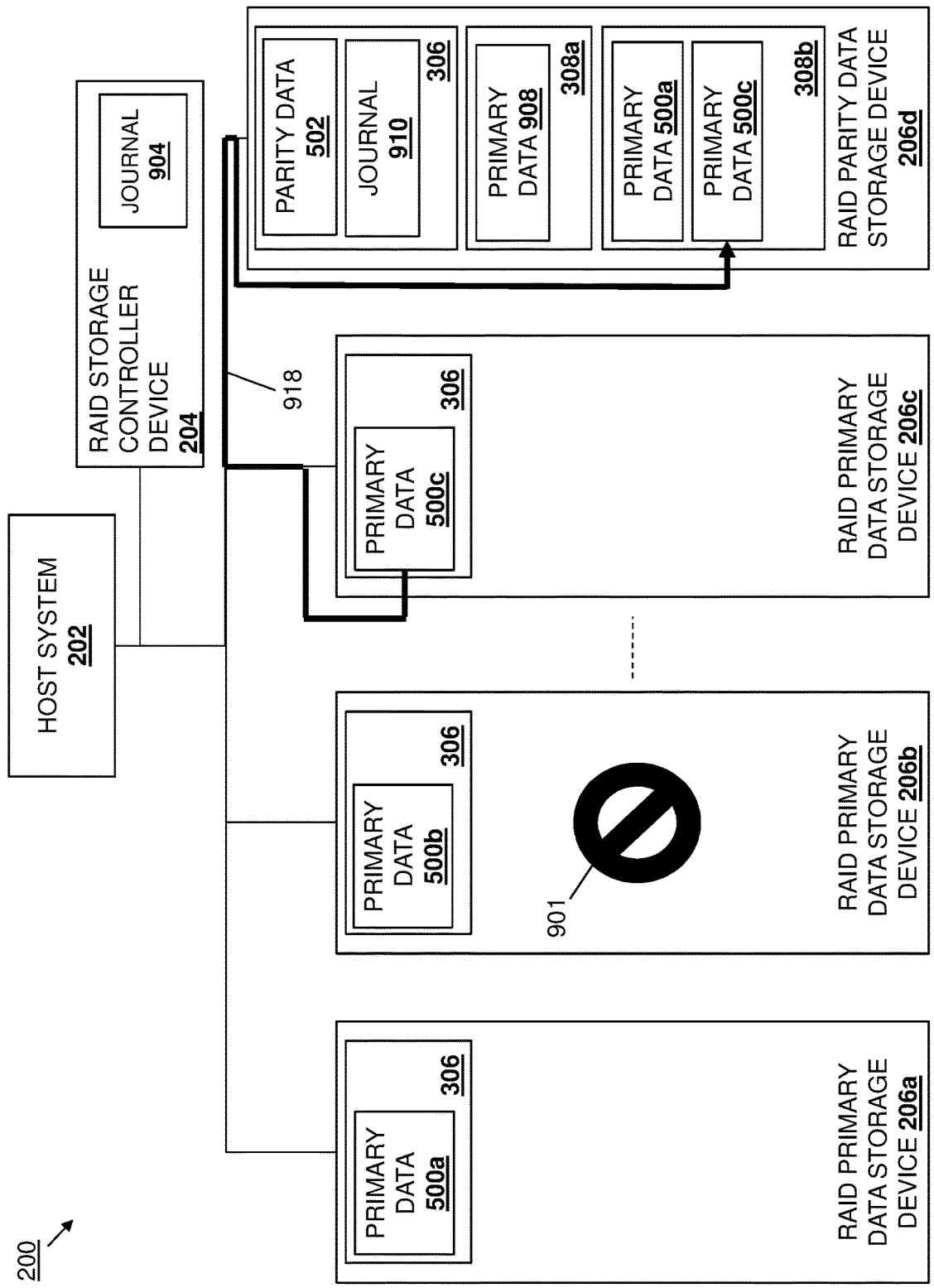
FIG. 9G is a schematic view illustrating an embodiment of the RAID data storage system of FIG. 2 operating during the method of FIG. 4.

Similarly, in an embodiment of block 412 and following the receiving of the peer-to-peer command by the RAID data storage engine 304 in the RAID primary data storage device 206c/300 via its communication subsystem 310, the RAID data storage engine 304 in the RAID primary data storage device 206c/300 may identify the second subset of operations included in the peer-to-peer command for performance by the RAID primary data storage device 206c. With reference to FIG. 9G, the second subset of operations included in the peer-to-peer command for performance by the RAID primary data storage device 206c may include the transmission of the primary data 500c to the RAID parity data storage device 206d. As discussed above, the "degraded write" operation performed in response to the write command 900 to write data to update primary data on an unavailable RAID primary data storage device requires the updating of parity data in the same stripe as that primary data, which further requires the transmission of primary data that is stored on the available RAID primary data storage devices (and that is in that same stripe) to the RAID parity data storage device. As such, at block 410, the RAID data storage engine 304 in the RAID primary data storage device 206c/300 may perform DMA operations 918 that read the primary data 500c in its storage system 306 to the second buffer subsystem 308b in the RAID parity data storage device 206d, as illustrated in FIG. 9G.

Figure 9H:
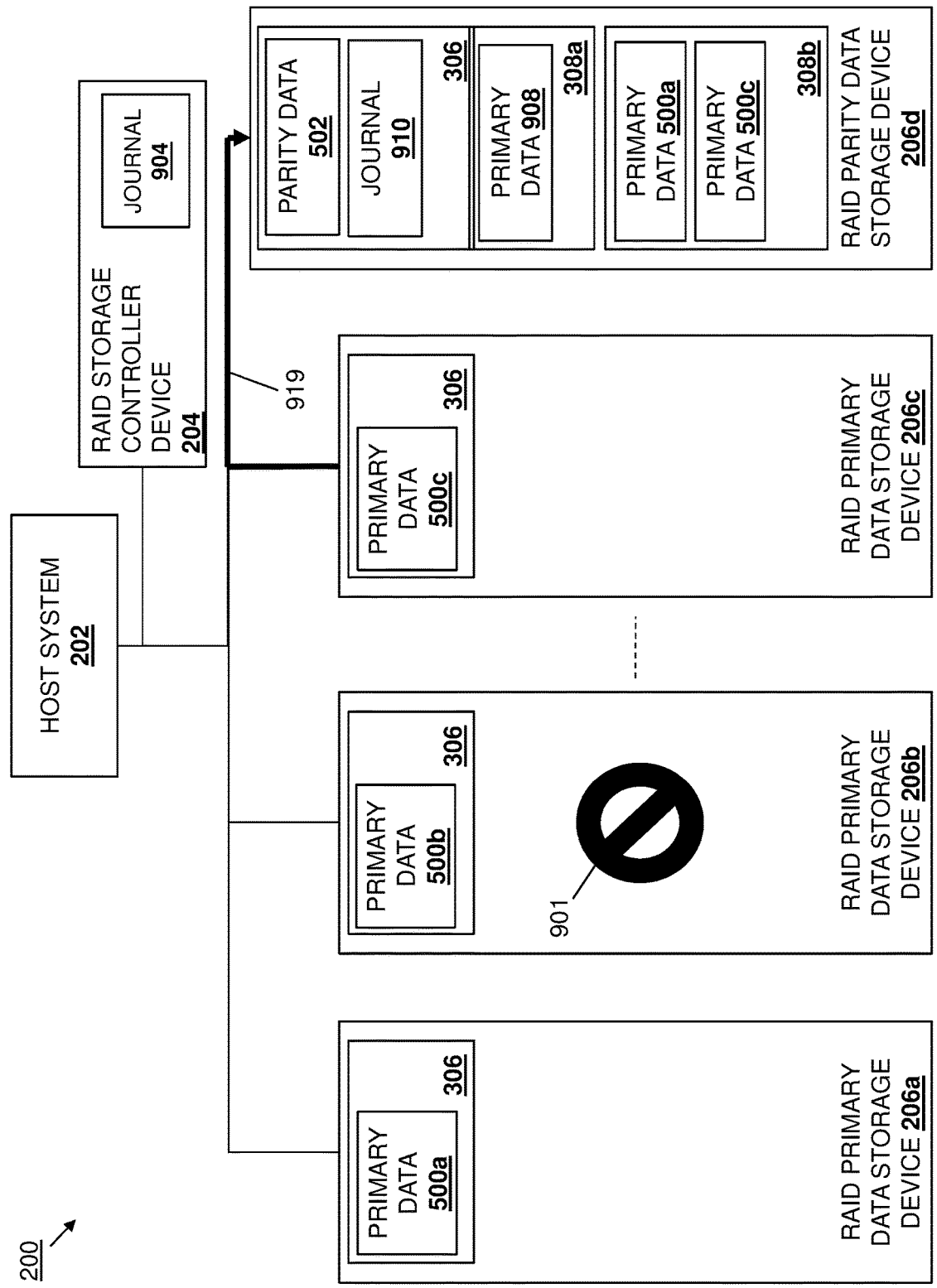
FIG. 9H is a schematic view illustrating an embodiment of the RAID data storage system of FIG. 2 operating during the method of FIG. 4.

The method 400 may then proceed to decision block 414 where it is determined whether the second subset of operations performed by the RAID primary data storage device 206c are completed. In response to determining that the second subset of operations performed by the RAID primary data storage device 206c have been completed, the method 400 may proceed to block 416 where the RAID primary data storage device 206a transmits a completion communication to the RAID parity data storage device 206d. As illustrated in FIG. 9H, following the reading of the primary data 500c to the second buffer subsystem 308b in the RAID parity data storage device 206d, the RAID data storage engine 304 in the RAID primary data storage device 206c may then perform direct completion communication operations 919 to transmit a completion communication to the RAID parity data storage device 206d. As will be appreciated by one of skill in the art in possession of the present disclosure, the direct completion communication operations 919 may include any of the operations described in U.S. patent application Ser. No. 16/838,224, filed on Apr. 2, 2020, that allow the RAID primary data storage device 206c to transmit the completion communication directly to the RAID parity data storage device 206d. In an embodiment, in response to receiving the completion communication from the RAID primary data storage device 206a, the RAID data storage engine 304 in the RAID parity data storage device 206d/300 may remove journal entries corresponding to the peer-to-peer command sent to the RAID primary data storage device 206c at block 408.

Figure 9I:
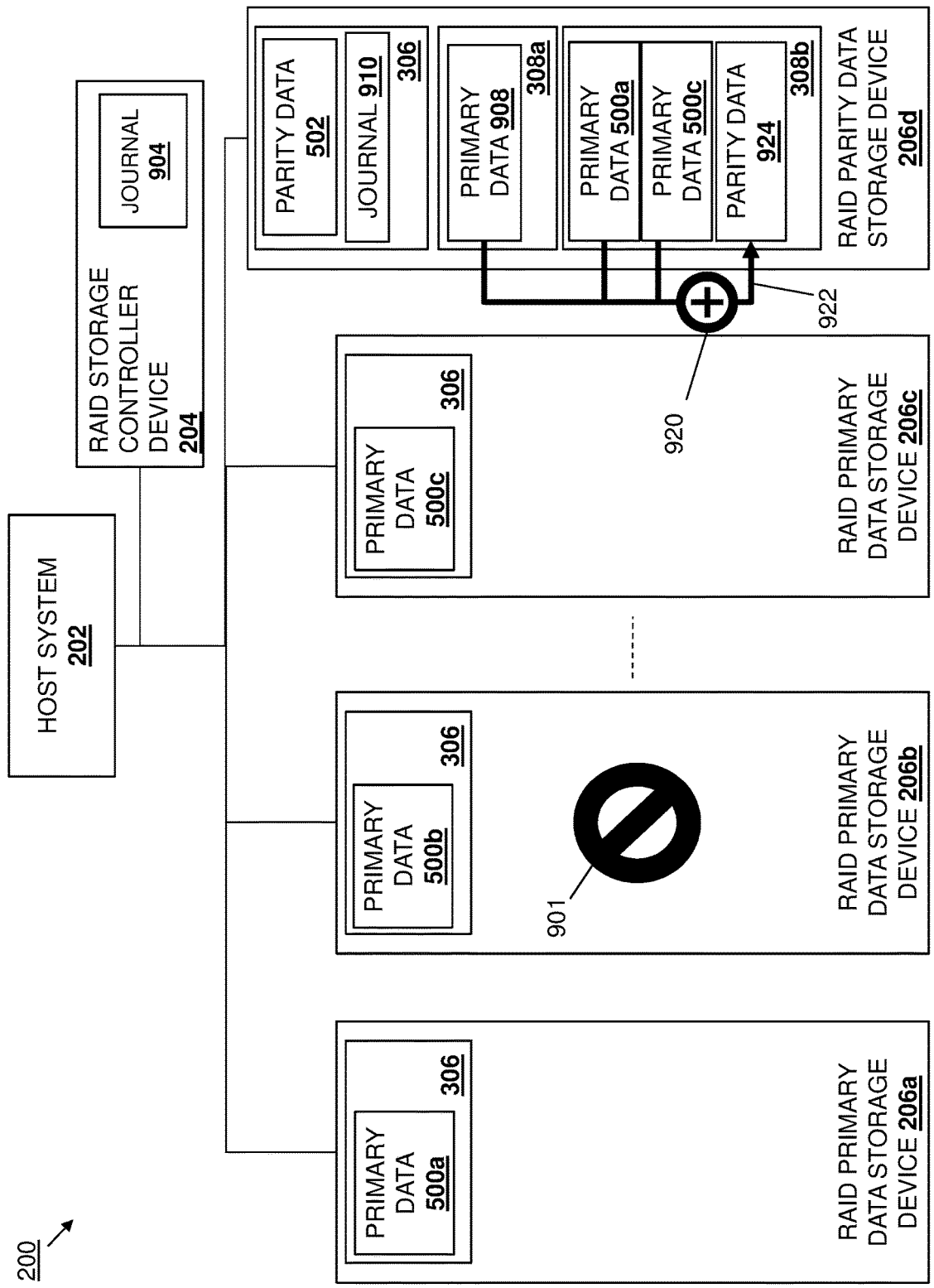
FIG. 9I is a schematic view illustrating an embodiment of the RAID data storage system of FIG. 2 operating during the method of FIG. 4.

With reference to FIG. 9I and returning to block 406 of the method 400, second operation(s) in the first subset of operations included in the peer-to-peer multi-step command for performance by the RAID parity data storage device 206d may include the calculation of "updated" parity data. As discussed above, the "degraded write" operation performed in response to the write command 900 to write data to update primary data on an unavailable RAID primary data storage device requires the updating of parity data in the same stripe as that primary data, which further requires an XOR operation on the available "current" primary data and the "updated" primary data in order to produce "updated" parity data. As such, at block 406, the RAID data storage engine 304 in the RAID parity data storage device 206d/300 may perform an XOR operation 920 on the "updated" primary data in its first buffer subsystem 308a, and the "current" primary data 500a and 500c in its second buffer subsystem 308b, in order to produce "updated" parity data 924, and may perform a write operation 922 to write the "updated" parity data 924 to its second buffer subsystem 308b (e.g., a CMB subsystem), as illustrated in FIG. 9I.

Figure 9J:
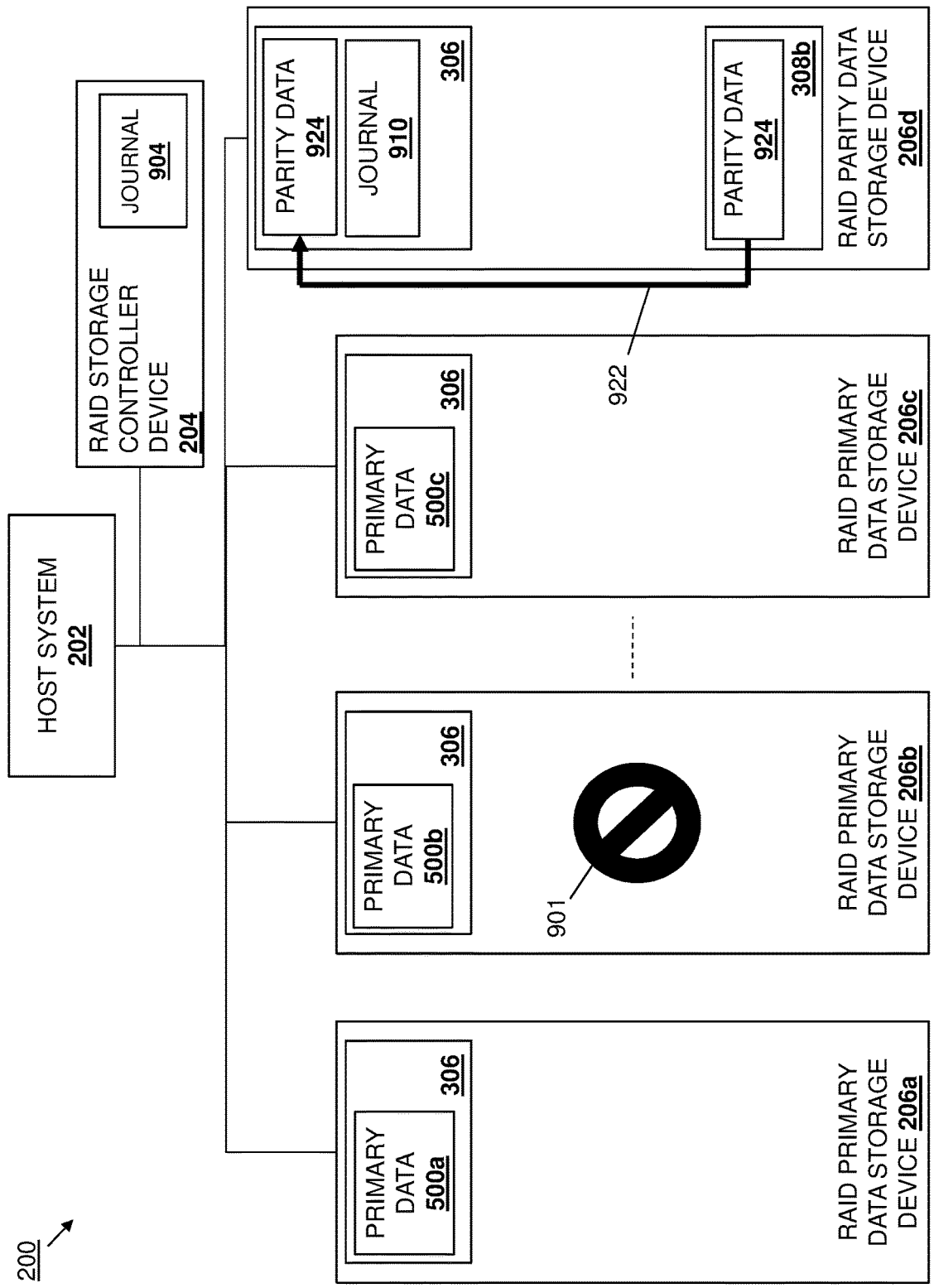
FIG. 9J is a schematic view illustrating an embodiment of the RAID data storage system of FIG. 2 operating during the method of FIG. 4.

With reference to FIG. 9J, third operation(s) in the first subset of operations included in the peer-to-peer multi-step command for performance by the RAID parity data storage device 206d may include the updating of parity data. As discussed above, the "degraded write" operation performed in response to the write command 900 to write data to update primary data on an unavailable RAID primary data storage device requires the updating of parity data in the same stripe as that primary data. As such, at block 406, the RAID data storage engine 304 in the RAID parity data storage device 206d/300 may perform an overwrite operation 922 to overwrite the "current" parity data 502 in its storage system 306 with the "updated" parity data 924 in its second buffer subsystem 308b, as illustrated in FIG. 9J. As will be appreciated by one of skill in the art in possession of the present disclosure, following the updating of the parity data 924, the RAID data storage engine 304 in the RAID parity data storage device 206d may discard the "current" primary data 500a and 506 and the "updated" primary data 908. Furthermore, when the RAID primary data storage device 206b becomes available or is replaced with a new RAID primary data storage device, the "updated" primary data 908 may be rebuilt via an XOR operation on the "current" primary data 500a and 500c and the "updated" parity data 924, and that "updated" primary data 908 may then be stored on the available or new RAID primary data storage device.

Following block 416, or if it is determined that no command should be sent to the second RAID data storage device(s) at block 408, the method 400 then proceeds to decision block 418 where it is determined whether the first subset of operations have been completed. In an embodiment, at decision block 418, the RAID data storage engine 304 in the RAID parity data storage device 206d/300 may monitor its progress in performing the first subset of operations associated with the multi-step command 902 to determine whether they have been completed. As discussed above, in response to completing any of the first subset of operations associated with the multi-step command 902, the RAID data storage engine 304 in the RAID parity data storage device 206d/300 may remove journal entries corresponding to those first subset of operations from the journal 910. If, at decision block 418, it is determined that all of the first subset of operations have not been completed, the method 400 returns to decision block 406. As such, the method 400 may loop such that the RAID data storage engine 304 in the RAID parity data storage device 206d/300 performs the first subset of operations associated with the multi-step command 902 until they are completed. Thus, one of skill in the art in possession of the present disclosure will appreciate that the RAID parity data storage device 206d may retrieve the "updated" primary data 908, wait until the RAID primary data storage devices 206a and 206d read their "current" primary data 500a and 500c to the RAID parity data storage device 206d, and then generate the "updated" parity data 924 prior to determining that the first subset of operations are completed.

If at decision block 418, it is determined that the first subset of operations have been completed, the method 400 proceeds to decision block 419 where it is determined whether a completion communication has been received from the second RAID data storage device. In an embodiment, at decision block 418 and in response to transmitting the peer-to-peer commands to the RAID primary data storage devices 206a and 206c, the RAID data storage engine 304 in the RAID parity data storage device 206d/300 may monitor for the completion communications discussed above from the RAID primary data storage devices 206 and 206c that indicate that the second subset of operations associated with the multi-step command 902 have been completed. As such, if at decision block 418 it is determined that the completion communications have not been received from the second RAID data storage devices, the method 400 returns to decision block 418 and the method 400 may loop such that the RAID data storage engine 304 in the RAID primary data storage device 206a/300 continues to monitor for the completion of the second subset of operations associated with the multi-step command 902 by the RAID primary data storage devices 206a and 206c. Thus, one of skill in the art in possession of the present disclosure will appreciate that the RAID parity data storage device 206d may retrieve the "updated" primary data 908, determine that the second subset of operations are completed when the RAID primary data storage devices 206a and 206d read their "current" primary data 500a and 500c to the RAID parity data storage device 206d and provide their corresponding completion communications, and then generate the "updated" parity data 924 prior to determining that the first subset of operations are completed.

Figure 9K:
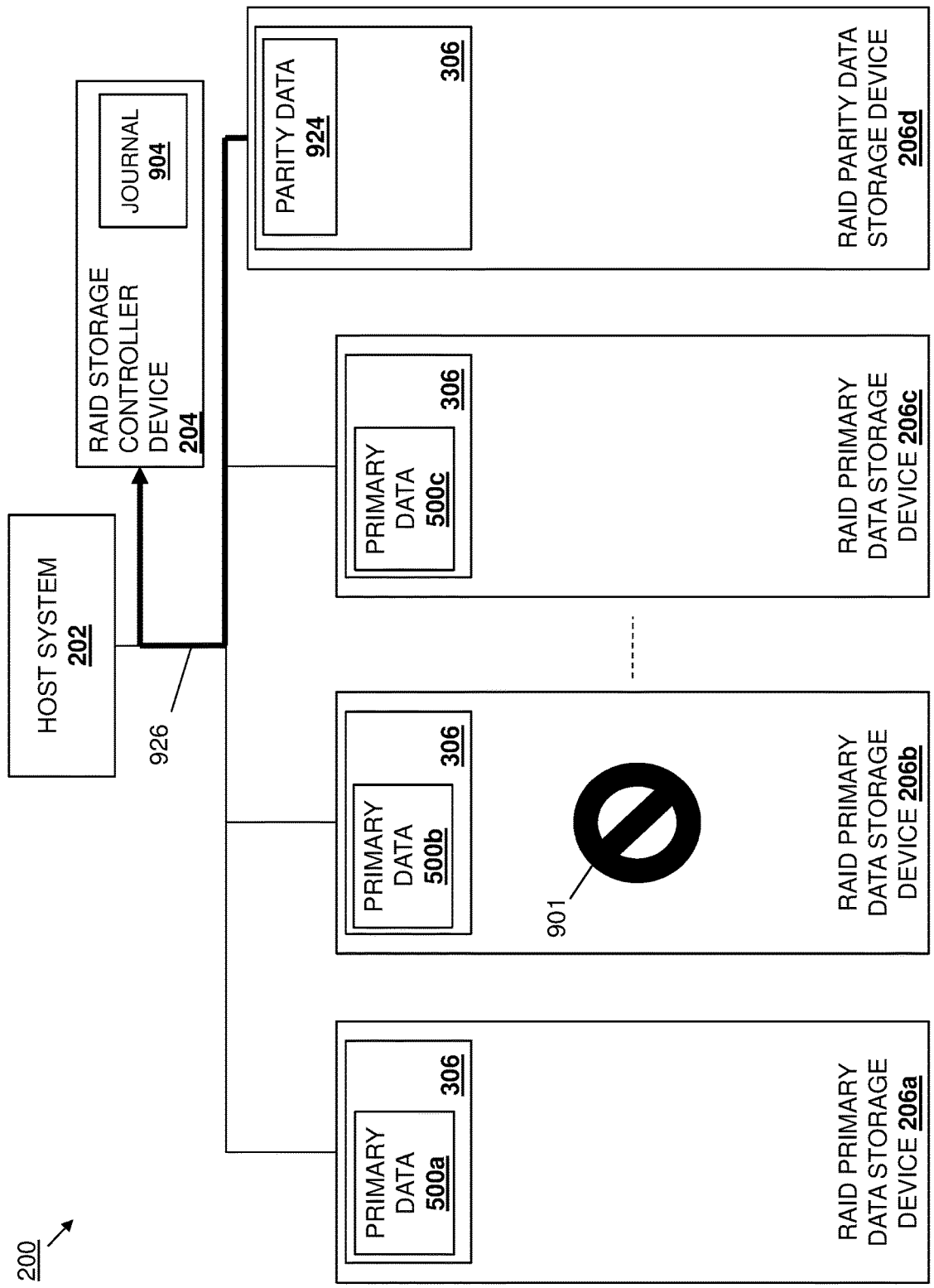
FIG. 9K is a schematic view illustrating an embodiment of the RAID data storage system of FIG. 2 operating during the method of FIG. 4.
Figure 9L:
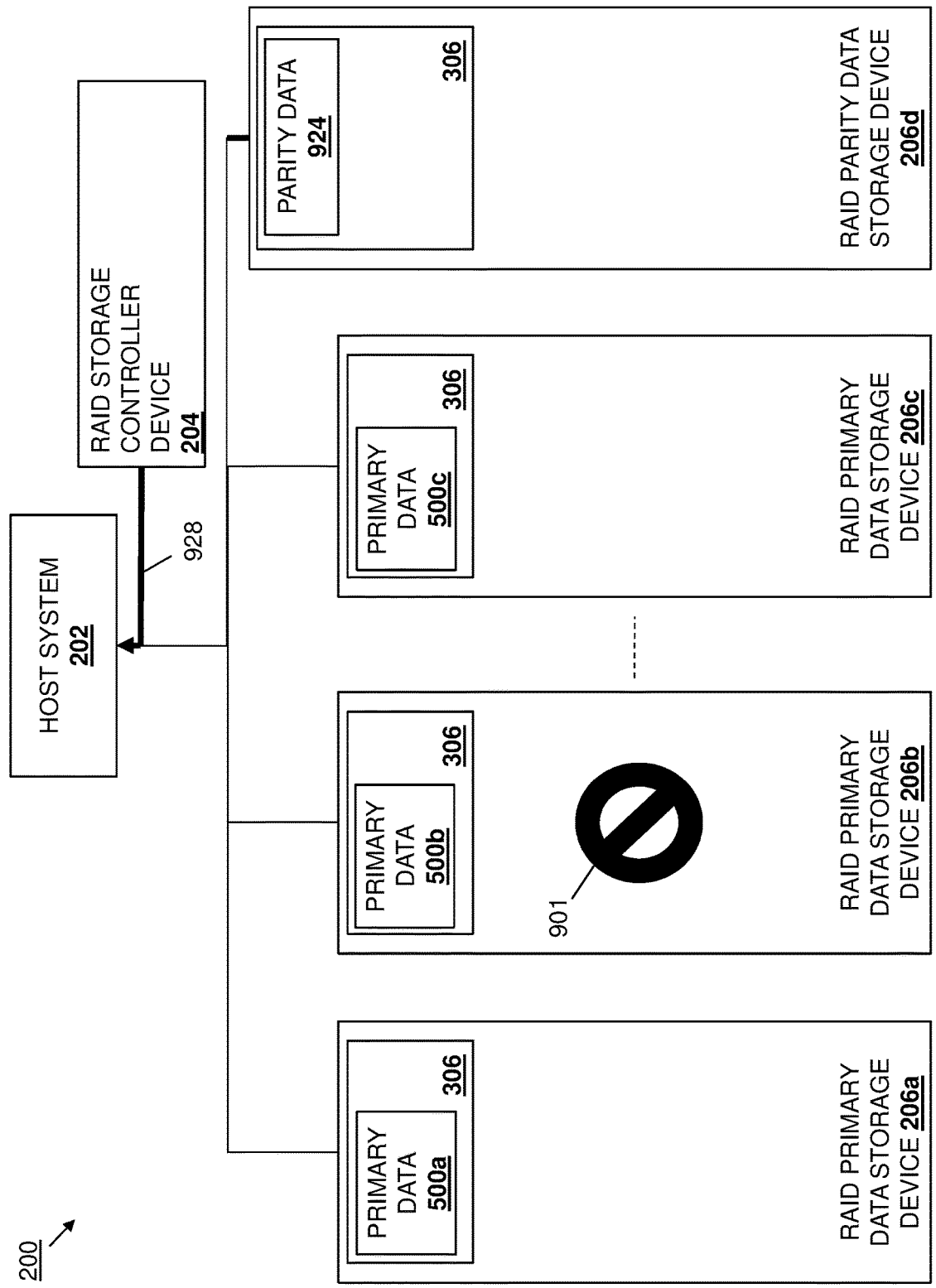
FIG. 9L is a schematic view illustrating an embodiment of the RAID data storage system of FIG. 2 operating during the method of FIG. 4.

If at decision block 419, it is determined that the completion communication has been received from the second RAID data storage devices (and, in this embodiment, that the first subset of operations have also been completed), the method 400 proceeds to block 420 where the first RAID data storage device transmits a completion communication to the RAID storage controller device. With reference to FIG. 9K, in an embodiment of block 420 and in response to receiving the peer-to-peer completion communications from the RAID primary data storage devices 206a and 206c and completing its first subset of operation(s), the RAID data storage engine 304 in the RAID parity data storage device 206d/300 may generate and transmit a completion communication 926 via its communication system 310 to the RAID storage controller device 204 that indicates that the multi-step command 902 has been completed, and may remove the journal entries/journal 910 associated with the multi-step command 902. Furthermore, as illustrated in FIG. 9L, in response to receiving the completion communication 926 from the RAID parity data storage device 206d, the RAID storage controller engine in the RAID storage controller device 204 may generate and transmit a completion communication 928 to the host system 202 that indicates that the write command 900 has been completed, and may remove the journal entries/journal 904 associated with the write command 900. Thus, systems and methods have been described that provide for autonomous RAID data storage system operations that, in the example above, provide for the autonomous processing of a write command to an unavailable RAID data storage device by the available RAID data storage device(s), thus offloading almost all of the operations conventionally performed by the RAID storage controller device to RAID data storage devices in the RAID data storage system in which that write operation and associated operations are being performed.

While a few specific autonomous operations associated with a "process write", a "degraded read", and a "degraded write" have been described, one of skill in the art in possession of the present disclosure will appreciate that other operations will benefit from the teachings of the present disclosure as well. For example, while the "degraded write" operation above discusses a write command to update primary data on an unavailable RAID primary data storage device, one of skill in the art in possession of the present disclosure will recognize how a "degraded write" operation may provide a write command to update primary data on an available RAID primary data storage device while the parity data for the same stripe is located on an unavailable RAID parity data storage device, and will involve different operations to compete the "degraded write" that will fall within the scope of the present disclosure as well.

In another example, RAID BackGround Initialization (BGI) operations may be performed according to the teachings of the present disclosure. For example, when a RAID storage system/RAIDset is initialized, BGI operations may be performed that include XOR operations on the primary data in each stripe to produce the parity data for that stripe (e.g., an XOR operation on the primary data 500a, 500b, and 500c to produce the parity data 502) and store that parity data in the RAID parity data storage device for that stripe (e.g., the RAID parity data storage device 206d). As such, the BGI operations may be performed for each stripe stored on the RAID data storage devices 206a-206d until parity data has been generated and stored for each stripe. One of skill in the art in possession of the present disclosure will recognize how the teachings of the present disclosure may be extended to perform such BGI operations (e.g., by the RAID parity data storage device for each stripe).

In yet another example, RAID Consistency Check (CC) operations may be performed according to the teachings of the present disclosure. For example, following the initialization of the RAID storage system/RAIDset and the BGI operations discussed above, CC operations may be performed by the RAID parity data storage device for each stripe by reading the primary data for the stripe (e.g., the primary data 500a, 500b, and 500c), performing an XOR operations on that primary data to produce parity data (e.g., the parity data 502), and then confirming that that parity data matches the parity data generated during the BGI (or write) operations. One of skill in the art in possession of the present disclosure will recognize how the teachings of the present disclosure may be extended to perform such CC operations (e.g., by the RAID parity data storage device for each stripe.) As such, a wide variety of operations may be performed according to the teachings of the present disclosure while remaining within its scope.

Thus, systems and methods have been described that provide for autonomous operations by RAID data storage devices in a RAID data storage system in order to allow a RAID storage controller device to issue a single command to a single RAID data storage device in the RAID data storage system that results in the performance of a plurality of complex operations by multiple RAID data storage devices that satisfy the command. For example, a RAID storage controller device may communicate with the RAID data storage devices in the RAID data storage system in order to configure each of the RAID data storage devices to perform direct command operations with each other. When the RAID storage controller device generates and transmits a multi-step command to a first RAID data storage device in the RAID data storage system, the first RAID data storage device will perform a first subset of operations associated with the multi-step command, and perform direct command operations with a second RAID data storage device in the RAID data storage system in order to cause the second RAID data storage device to perform a second subset of operations associated with the multi-step command. The first RAID data storage device may then receive a first completion communication from the second RAID data storage device that indicates that the second subset of operations associated with the multi-step command are completed and, in response to completing the first subset of operations associated with the multi-step command and receiving the first completion communication, the first RAID data storage device may transmit a second completion communication to the RAID storage controller device that indicates that the multi-step command is completed. As such, orchestration and tracking of RAID storage-device-assisted data updates by RAID storage controller devices is substantially reduced, allowing a single command from the RAID storage controller device to trigger the autonomous performance of any number of complex operations by the RAID data storage devices that satisfy the requirements of that command.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An autonomous Redundant Array of Independent Disks (RAID) data storage system, comprising:
   a Redundant Array of Independent Disks (RAID) storage controller device that is configured to:
      communicate with a plurality of RAID data storage devices in order to configure each of the plurality of RAID data storage devices to perform direct command operations with each other; and
      generate and transmit a multi-step command; and
   a first RAID data storage device that is included in the plurality of RAID data storage devices and that is configured to:
      receive the multi-step command from the RAID storage controller device;
      perform a first subset of operations associated with the multi-step command;
      perform direct command operations with a second RAID data storage device that is included in the plurality of RAID data storage devices in order to cause the second RAID data storage device to perform a second subset of operations associated with the multi-step command;
      receive a first completion communication from the second RAID data storage device that indicates that the second subset of operations associated with the multi-step command are completed; and
      transmit, in response to completing the first subset of operations associated with the multi-step command and receiving the first completion communication, a second completion communication to the RAID storage controller device that indicates that the multi-step command is completed.

2. The system of claim 1, wherein the first RAID data storage device is configured to:
   generate at least one journal entry in the first RAID data storage device in response to beginning the first subset of operations; and
   remove the at least one journal entry in the first RAID data storage device in response to completing the first subset of operations.

3. The system of claim 1, wherein the first RAID data storage device is configured to:
   generate at least one journal entry in the first RAID data storage device in response to performing the first direct command operations; and
   remove the at least one journal entry in the first RAID data storage device in response to receiving the first completion communication.

4. The system of claim 1, wherein the multi-step command is a process write multi-step command, and wherein:
   the first subset of operations include the first RAID data storage device:
      retrieving updated primary data;
      performing an XOR operation on the updated primary data and current primary data stored in the first RAID data storage device to generate interim parity data; and
      updating the current primary data with the updated primary data; and
   the second subset of operations include the second RAID data storage device:
      retrieving the interim parity data from the first RAID data storage device;
      performing an XOR operation on the interim parity data and current parity data stored in the second RAID data storage device to generate updated parity data; and
      updating the current parity data with the updated parity data.

5. The system of claim 1, wherein the multi-step command is a degraded read multi-step command, and wherein:
   the second subset of operations include the second RAID data storage device:
      transmitting first current primary data to the first RAID data storage device; and
   the first subset of operations include the first RAID data storage device:
      receiving the first current primary data from the second RAID data storage device;

performing an XOR operation on the first current primary data and current parity data stored in the first RAID data storage device to generate second current primary data; and
transmitting the second current primary data to a host system.

6. The system of claim 1, wherein the multi-step command is a degraded write multi-step command, and wherein:
the second subset of operations include the second RAID data storage device:
transmitting first current primary data to the first RAID data storage device; and
the first subset of operations include the first RAID data storage device:
retrieving updated primary data;
receiving the first current primary data from the second RAID data storage device:
performing an XOR operation on the updated primary data, the first current primary data, and current parity data stored in the first RAID data storage device to generate updated parity data; and
updating the current parity data with the updated parity data.

7. An Information Handling System (IHS), comprising:
a processing system; and
a memory system that is coupled to the processing system and that includes instructions that, when executed by the processing system, cause the processing system to provide a Redundant Array of Independent Disks (RAID) data storage engine that is configured to:
receive a multi-step command from a RAID storage controller device;
perform a first subset of operations associated with the multi-step command;
perform direct command operations with a RAID data storage device in order to cause the RAID data storage device to perform a second subset of operations associated with the multi-step command;
receive a first completion communication from the RAID data storage device that indicates that the second subset of operations associated with the multi-step command are completed; and
transmit, in response to completing the first subset of operations associated with the multi-step command and receiving the first completion communication, a second completion communication to the RAID storage controller device that indicates that the multi-step command is completed.

8. The IHS of claim 7, wherein the RAID data storage engine is configured to:
communicate with the RAID storage controller device in order to configure the direct command operations with the RAID data storage device.

9. The IHS of claim 7, wherein the RAID data storage engine is configured to:
generate at least one journal entry in response to beginning the first subset of operations; and
remove the at least one journal entry in response to completing the first subset of operations.

10. The IHS of claim 7, wherein the RAID data storage engine is configured to:
generate at least one journal entry in response to performing the first direct command operations; and
remove the at least one journal entry in response to receiving the first completion communication.

11. The IHS of claim 7, wherein the multi-step command is a process write multi-step command, and wherein:

the first subset of operations include the RAID data storage engine:
retrieving updated primary data;
performing an XOR operation on the updated primary data and current primary data to generate interim parity data; and
updating the current primary data with the updated primary data; and
the second subset of operations include the RAID data storage device:
retrieving the interim parity data;
performing an XOR operation on the interim parity data and current parity data stored in the RAID data storage device to generate updated parity data; and
updating the current parity data with the updated parity data.

12. The IHS of claim 7, wherein the multi-step command is a degraded read multi-step command, and wherein:
the second subset of operations include the RAID data storage device:
transmitting first current primary data; and
the first subset of operations include the RAID data storage engine:
receiving the first current primary data from the RAID data storage device:
performing an XOR operation on the first current primary data and current parity data to generate second current primary data; and
transmitting the second current primary data to a host system.

13. The IHS of claim 7, wherein the multi-step command is a degraded write multi-step command, and wherein:
the second subset of operations include the RAID data storage device:
transmitting first current primary data; and
the first subset of operations include the RAID data storage engine:
retrieving updated primary data;
receiving the first current primary data from the RAID data storage device:
performing an XOR operation on the updated primary data, the first current primary data, and current parity data to generate updated parity data; and
updating the current parity data with the updated parity data.

14. A method for performing autonomous Redundant Array of Independent Disks (RAID) data storage operations, comprising:
receiving, by a first Redundant Array of Independent Disks (RAID) data storage device, a multi-step command from a RAID storage controller device;
performing, by the first RAID data storage device, a first subset of operations associated with the multi-step command;
performing, by the first RAID data storage device, direct command operations with a second RAID data storage device in order to cause the second RAID data storage device to perform a second subset of operations associated with the multi-step command;
receiving, by the first RAID data storage device, a first completion communication from the second RAID data storage device that indicates that the second subset of operations associated with the multi-step command are completed; and
transmitting, by the first RAID data storage device in response to completing the first subset of operations associated with the multi-step command and receiving the first completion communication, a second completion communication to the RAID storage controller device that indicates that the multi-step command is completed.

15. The method of claim 14, further comprising:
communicating, by the first RAID data storage device, with the RAID storage controller device in order to configure the direct command operations with the second RAID data storage device.

16. The method of claim 14, further comprising:
generating, by the first RAID data storage device, at least one journal entry in the first RAID data storage device in response to beginning the first subset of operations; and
removing, by the first RAID data storage device, the at least one journal entry in the first RAID data storage device in response to completing the first subset of operations.

17. The method of claim 14, further comprising:
generating, by the first RAID data storage device, at least one journal entry in the first RAID data storage device in response to performing the first direct command operations; and
removing, by the first RAID data storage device, the at least one journal entry in the first RAID data storage device in response to receiving the first completion communication.

18. The method of claim 14, wherein the multi-step command is a degraded read multi-step command, and wherein:
the second subset of operations include the second RAID data storage device:
transmitting first current primary data; and
the first subset of operations include the first RAID data storage engine:
receiving the first current primary data from the second RAID data storage device;
performing an XOR operation on the first current primary data and current parity data stored in the first RAID data storage device to generate second current primary data; and
transmitting the second current primary data to a host system.

19. The method of claim 14, wherein the multi-step command is a degraded read multi-step command, and wherein:
the second subset of operations include the second RAID data storage device:
transmitting first current primary data; and
the first subset of operations include the first RAID data storage engine:
receiving the first current primary data from the second RAID data storage device;
performing an XOR operation on the first current primary data and current parity data stored in the first RAID data storage device to generate second current primary data; and
transmitting the second current primary data to a host system.

20. The method of claim 14, wherein the multi-step command is a degraded write multi-step command, and wherein:
the second subset of operations include the second RAID data storage device:
transmitting first current primary data; and
the first subset of operations include the first RAID data storage engine:
retrieving updated primary data;
receiving the first current primary data from the RAID data storage device;
performing an XOR operation on the updated primary data, the first current primary data, and current parity data stored on the first RAID data storage device to generate updated parity data; and
updating the current parity data with the updated parity data.

* * * * *